US012645740B2

(12) United States Patent
LeVell

(10) Patent No.: US 12,645,740 B2
(45) Date of Patent: Jun. 2, 2026

(54) QUANTIFIED EULER ANALYSIS

(71) Applicant: Mark LeVell, Los Gatos, CA (US)

(72) Inventor: Mark LeVell, Los Gatos, CA (US)

( * ) Notice: Subject to any disclaimer, the term of this patent is extended or adjusted under 35 U.S.C. 154(b) by 803 days.

(21) Appl. No.: 17/136,168

(22) Filed: Dec. 29, 2020

(65) Prior Publication Data

US 2021/0232634 A1      Jul. 29, 2021

Related U.S. Application Data

(63) Continuation of application No. 15/721,794, filed as application No. PCT/US2016/024809 on Mar. 29, 2016, now Pat. No. 10,878,034.

(60) Provisional application No. 62/140,085, filed on Mar. 30, 2015.

(51) Int. Cl.

| | |
|---|---|
| *G06F 16/00* | (2019.01) |
| *G06F 3/0484* | (2022.01) |
| *G06F 3/04845* | (2022.01) |
| *G06F 3/0486* | (2013.01) |
| *G06F 8/34* | (2018.01) |
| *G06F 16/248* | (2019.01) |
| *G06F 16/9032* | (2019.01) |
| *G06Q 30/02* | (2023.01) |
| *G06T 11/20* | (2006.01) |

(52) U.S. Cl.
CPC ...... *G06F 16/90328* (2019.01); *G06F 3/0484* (2013.01); *G06F 3/04845* (2013.01); *G06F 3/0486* (2013.01); *G06F 8/34* (2013.01); *G06F 16/248* (2019.01); *G06Q 30/02*

(2013.01); *G06T 11/206* (2013.01); *G06F 2203/04803* (2013.01); *G06F 2203/04806* (2013.01)

(58) Field of Classification Search
CPC .......................... G06F 16/90328; G06F 16/248
USPC .......................................... 707/722, 723, 753
See application file for complete search history.

(56) References Cited

U.S. PATENT DOCUMENTS

| | | | |
|---|---|---|---|
| 8,370,331 B2* | 2/2013 | Pontier | G06F 16/248 |
| | | | 707/723 |
| 2012/0259871 A1* | 10/2012 | Holmes | G06Q 30/0242 |
| | | | 707/753 |

OTHER PUBLICATIONS

"Generating and Drawing Area-Proportional Euler and Venn Diagrams"; Published 2007, by: Stirling Chow http://dspace.library.uvic.ca/bitstream/handle/1828/128/phdGradStudiesMay24.pdf?sequence=1&isAllowed=y (Year: 2007).*

(Continued)

*Primary Examiner* — Chelcie L Daye
(74) *Attorney, Agent, or Firm* — Brian J. Pangrle

(57) ABSTRACT

A method can include rendering a first closed curve to a display where the first closed curve represents a number of members of a dataset according to a first criterion; receiving a selection for a second criterion for the dataset; transmitting at least the second criterion via a network interface; responsive to the transmitting, via the network interface, receiving information as to at least the second criterion and the dataset; and rendering to the display, based at least in part on the information, a second closed curve that represents a number of members of the dataset according to the second criterion where the first and second closed curves overlap to an extent that depends on a number of common members thereof.

15 Claims, 61 Drawing Sheets

(56) References Cited

OTHER PUBLICATIONS

"Generating and Drawing Area-Proportional Euler and Venn Diagrams"; Published 2007; by: Shirling Chow (Year: 2007) https://dspace.library.uvic.ca/server/api/core/bitstreams/2723a827-dd43-4e72-8e38-c05005726fc5/content.*

* cited by examiner

310

510

610

710

1110

1310

Merge Circles

Circles to merge: TX and CA.

Please type a name for your Circle:

CA & TX

Merge     Cancel

San Diego (87k)

2610

2710

2810

2910

3110

3210

4410

5710

5720

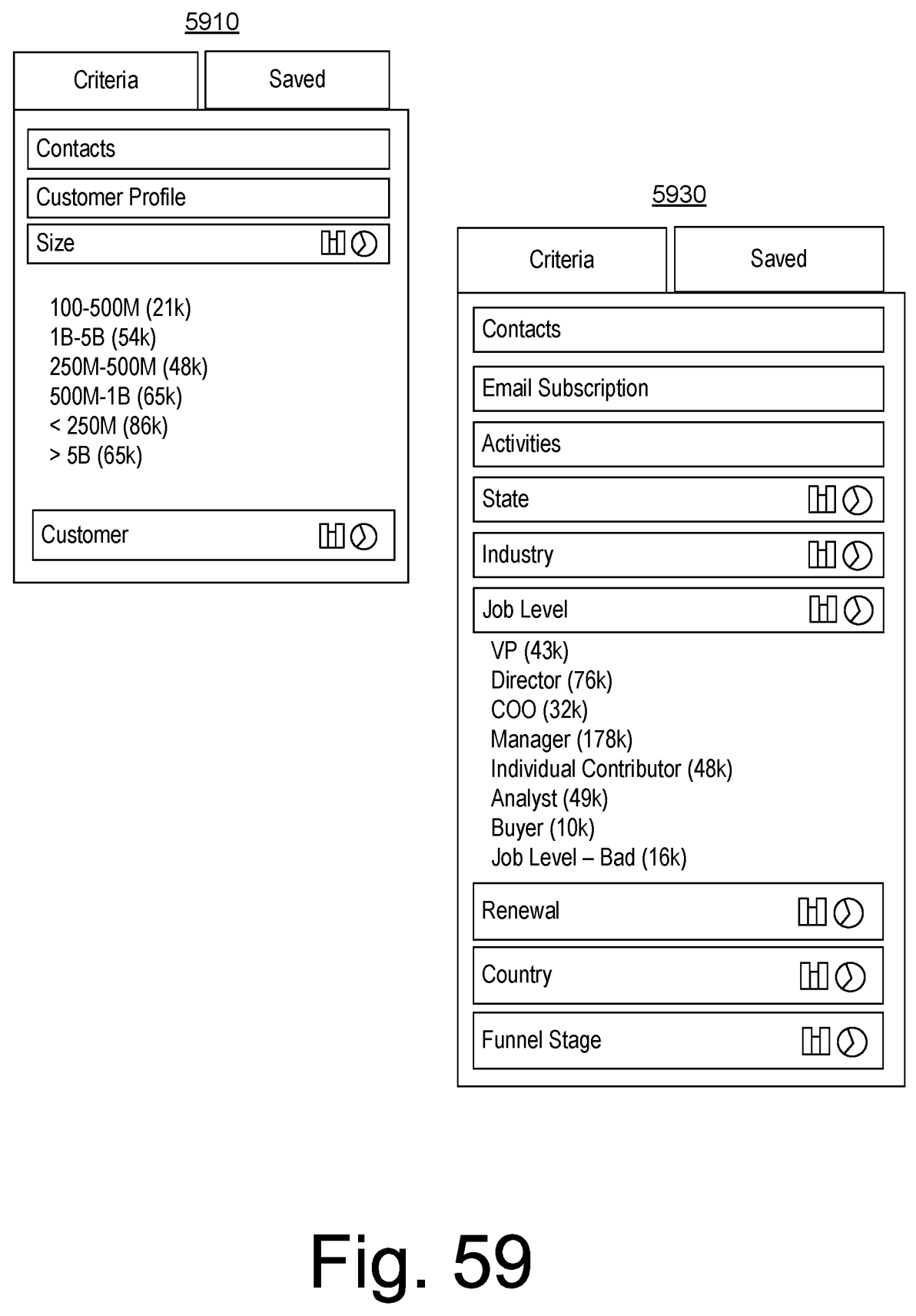

5910

| Criteria | Saved |
|---|---|

Contacts

Customer Profile

Size 100-500M (21k)
1B-5B (54k)
250M-500M (48k)
500M-1B (65k)
< 250M (86k)
> 5B (65k)

Customer

5930

| Criteria | Saved |
|---|---|

Contacts

Email Subscription

Activities

State

Industry

Job Level

VP (43k)
Director (76k)
COO (32k)
Manager (178k)
Individual Contributor (48k)
Analyst (49k)
Buyer (10k)
Job Level – Bad (16k)

Renewal

Country

Funnel Stage

Fig. 59

System 6100

QUANTIFIED EULER ANALYSIS

RELATED APPLICATION

This application is continuation application of a U.S. patent application having Ser. No. 15/721,794, filed 30 Sep. 2017 (issued as U.S. Pat. No. 10,878,034 on 29 Dec. 2020), which is a National Stage Patent Application of PCT International Patent Application No. PCT/US16/24809, filed 29 Mar. 2016 under 35 U.S.C. 371, which claims priority to and the benefit of a U.S. Provisional Application having Ser. No. 62/140,085, filed 30 Mar. 2015, wherein all of the foregoing applications are incorporated by reference herein.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

SUMMARY

A method can include rendering a first closed curve to a display where the first closed curve represents a number of members of a dataset according to a first criterion; receiving a selection for a second criterion for the dataset; transmitting at least the second criterion via a network interface; responsive to the transmitting, via the network interface, receiving information as to at least the second criterion and the dataset; and rendering to the display, based at least in part on the information, a second closed curve that represents a number of members of the dataset according to the second criterion where the first and second closed curves overlap to an extent that depends on a number of common members thereof. Various other methods, computers, systems, etc. are also disclosed.

BRIEF DESCRIPTION OF THE DRAWINGS

Features and advantages of the described implementations can be more readily understood by reference to the following description taken in conjunction with the accompanying drawings.

FIG. 13 is a diagram of an example of a graphical user interface;

FIG. 59 is a diagram of an example of a graphical user interface;

DETAILED DESCRIPTION

Figure 1:
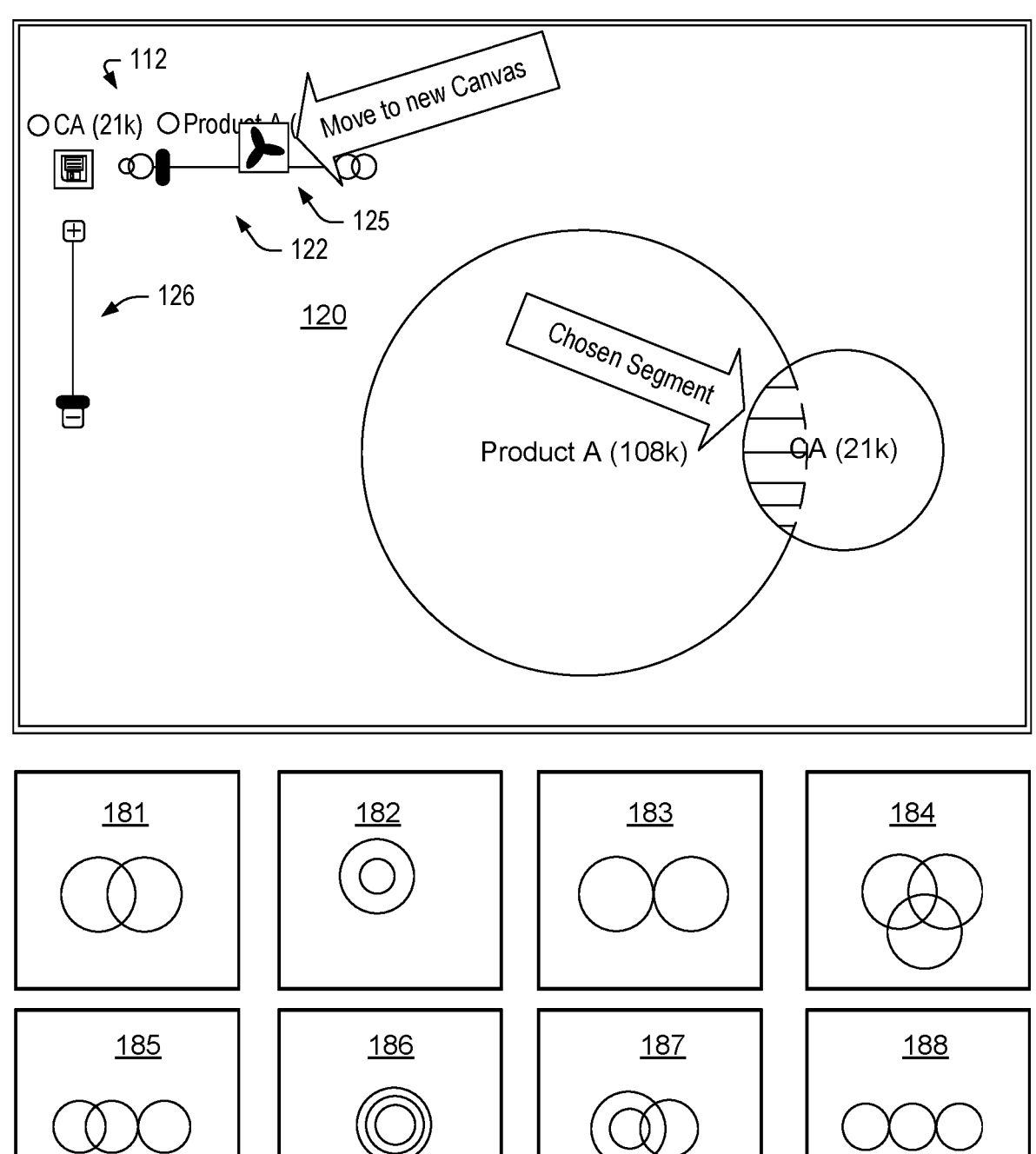
FIG. 1 is a diagram of an example of a graphical user interface.

The following description includes the best mode presently contemplated for practicing the described implementations. This description is not to be taken in a limiting sense, but rather is made merely for the purpose of describing general principles of the implementations. The scope of the described implementations should be ascertained with reference to the issued claims.

As an example, closed curves may be rendered to a display where such curves may illustrate syllogistic reasoning. As an example, in a plane, a closed curve may be defined as a curve with no endpoints that completely encloses an area. As an example, one or more closed curves may include and/or form one or more Euler diagrams. As to syllogistic reasoning, it may be defined as a form of deductive reasoning that can include, for example, a major premise, a minor premise, and a conclusion. As an example, consider the following: All humans are mortal, the major premise, I am a human, the minor premise, therefore, I am mortal, the conclusion. In such an example, a set of two closed curves may represent the major premise, an outer closed curve of mortal entities (e.g., members of meeting the criterion "mortal") and an inner closed curve of all humans (e.g., members meeting the criterion "human"); and another set of two closed curves may represent the minor premise, an outer closed curve of humans (e.g., members meeting the criterion "human") and an inner closed curve of the "I" in the "I am a human" (e.g., a closed curve with a single member). Thus, when taken together, the conclusion, "I am mortal", may be discerned and graphically represented by the closed curves.

As an example, a closed curve may divide a plane into two regions or "zones": an interior, which symbolically represents elements of a set (e.g., members of the set), and an exterior, which represents elements that are not elements of the set (e.g., not members of the set). As to logic, sizes or shapes of the closed curves do not add to a strict conclusion in syllogistic reasoning, rather the strict conclusion in syllogistic reasoning is derived from overlap. For example, spatial relationships between regions bounded by each curve (e.g., overlap, containment or neither) can correspond to set-theoretic relationships (e.g., intersection, subset and disjointness). For example, curves whose interior zones do not intersect represent disjoint sets; two curves whose interior zones intersect represent sets that have common elements (e.g., the zone inside both curves represents the set of elements common to both sets, which is the intersection of the sets); and a curve that is contained completely within the interior zone of another represents a subset of it. Euler diagrams may be considered as being in the domain of set theory (e.g., a branch of mathematics concerning logic).

As an example, one or more Euler diagrams may be rendered to a display operatively coupled to a computing device, for example, to represent sets and their relationships where each set can include at least one member. In such an example, the computing device may include instructions executable by one or more processors. For example, consider instructions executable to receive data and to process the data to generate information that can be rendered to a display as at least a portion of a graphical user interface (GUI). In such an example, one or more commands may be received by one or more processors of a computing device (e.g., via an input component or components) and one or more graphical representations of data and/or processed data may be rendered to the display.

As an example, a representation rendered to a display by a computing device may include one or more of an Euler diagram and a quantified Euler diagram (e.g., where a dimension or dimensions of a representation may be associated with a quantity or quantities).

As an example, a dimension may be a dimension in a coordinate system that includes one or more dimensions. For example, on a two-dimensional display, a Cartesian coordinate system may be defined by an x-axis and a y-axis (e.g., consider a pixel array). With respect to closed curves, a closed curve may be a circle, an ellipse, or another type of closed curve. As an example, a closed curve may be defined at least in part by a center, a focus, foci, etc., and, for example, one or more radii, distances, etc. For example, a closed curve may be a circle that is a set of points in a plane that are equidistant from a given point O where a distance r from the center is called the radius and where the point O is called the center. As an example, a closed curve may be an ellipse; a closed curve that is the locus of points in a plane, the sum of whose distances $r1$ and $r2$ from two fixed points $F1$ and $F2$ (the foci) separated by a distance of 2c is a given positive constant 2a.

As an example, a quantity may be represented by shading, color, etc., for example, consider a scale that represents quantity in an RGB scale, a greyscale, etc. As an example, a quantity may be represented by one or more dimensions and/or one or more graphical display parameters (e.g., color, intensity, shading, etc.).

As an example, a pie chart may be generated by plotting numeric values of a set of quantities as a set of adjacent circular wedges with arc lengths proportional to the total amount. In such an example, the wedges taken together can form an entire disk. Where one or more segments are separated from the disk center for emphasis, the pie chart may be referred to as an "exploded" pie chart. As an example, a bar chart or bar graph may be generated as a plot of a set of data such that the number of data elements falling within one or more categories is indicated using a rectangle whose height or width is a function of the number of elements.

As an example, a quantified Euler diagram can represent logic and quantity. For example, an overlapping area formed by two closed curves may represent members that belong to two sets (e.g., a set of one of the closed curves and a set of the other one of the closed curves) and the overlapping area may be dimensioned to represent the number of the members (e.g., a quantity). As an example, where the members are associated with one or more parameters, the overlapping area may be dimensioned at least in part with respect to the one or more parameters. In such an example, the one or more parameters may represent something other than membership in a set or sets of the two closed curves. For example, consider a closed curve of technical specialists with skills X and a closed curve of technical specialists with skills Y and an overlapping area of technical specialists with skills X and with skills Y. In such an example, the overlapping area may be rendered to a display with a size that relates to number of members in that overlapping area or, for example, the overlapping area may be rendered to a display with a size that relates to an average annual budget of the members in that overlapping area. In the latter, the closed curves may also be sized with respect to average annual budget.

As an example, a graphical user interface (GUI) may include a graphical control that is selectable to control a quantification parameter or quantification parameters. As mentioned, color may optionally be used, for example, in addition to size. In such an example, consider rendering closed curves to a display where size represents a number of members and where color represents a parameter value of a quantification parameter associated with members of a set, an intersection of sets, etc. (e.g., years of experience, years at a company, income, age, number of connections on LINKEDIN™, etc.).

As an example, a quantified Euler diagram can include "size as a representation of quantity" (e.g., a quality of diagrams such as pie charts and bar charts) and can include closed curves that represent logic (e.g., a quality of diagrams such as Venn diagrams and/or Euler diagrams). As an example, a quantified Euler diagram may include "size as a representation of quantity" as to one or more "overlaps" (e.g., areas that represent membership, logic, etc.).

As an example, a method can include enhancing an Euler diagram and/or a Venn diagram with quantitative information and rendering the enhanced diagram to a display (e.g., consider precisely quantified circles and/or precisely quantified overlaps). Such an enhanced diagram may be a quantified Euler diagram, which can be representative of precise quantities at closed curve level and at overlap level.

As an example, a method can include enabling easy and visual selection and utilization of sets of data. As an example, a system may assist database users, especially marketers, in the decision process surrounding selecting and utilizing subsets of data in a graphical manner.

As an example, quantitative information and logic may be represented via one or more quantified Euler diagrams. In such an example, a system may include circuitry that can calculate specific quantities for closed curve sizes and one or more overlaps. As an example, a system may include one or more user input mechanisms where graphical controls may be selected, adjusted, etc. For example, consider a touchscreen display where a user may drag and drop a closed curve to overlap another closed curve where such an action triggers an analysis that generates a quantified Euler diagram. As an example, a system can calculate overlaps for closed curves where, for example, users may combine closed curves, overlaps, etc., view the results of the combinations, select portions, use those selections, etc.

As an example, a database may be a structure that includes a collection of information (e.g., data), a collection of queries that can be submitted, and a collection of algorithms by which the structure responds to queries, searches the data, and returns the results. For example, consider the Structured Query Language (SQL) as a special-purpose programming language designed for managing data held in a relational database management system (RDBMS), or for stream processing in a relational data stream management system (RDSMS). In such an example, a user enters a query (e.g., text based) and results are returned, for example, as list. Such an approach does not inherently provide for visualization of size of sets or segments selected.

A standard SQL-driven RDBMS may be characterized as lacking an ability for quantification of areas of an Euler Circles (or Venn Diagram) that would enable a user to visualize relative sizes of sets and sizes of overlaps between the sets; lacking an ability to directly and visually select sets and combinations of sets of interest; lacking a scale function that would permit a user to change a ratio to which circles are or are not proportional to each other; lacking a scale function with a zoom function to allow "hard to see" overlaps and circles to be understood, selected and utilized; and lacking a user ability to directly transfer or move sets to one or more other programmatic areas for other purposes and especially other applications, etc.).

As an example, a system can include an ability for quantification of areas of an Euler Circles (or Venn Diagram) to enable a user to visualize relative sizes of sets and sizes of overlaps between the sets; include an ability to directly and visually select sets and combinations of sets of interest; include a scale function that permits a user to change a ratio to which circles are or are not proportional to each other; include a scale function with a zoom function to allow "hard to see" overlaps and circles to be understood, selected and utilized; and include a user ability to directly transfer or move sets to one or more other programmatic areas for other purposes and especially other applications, etc.).

As an example, a system can include a graphical user interface that allows a user to take a selected set or group of sets and transfer them to a new canvas creating a new set.

As an example, a system can allow users to drag database criteria directly into a workspace to have them represented as a unique design combination of Euler circles and Venn Diagrams to then select the portion of those overlaps that are desired to move those overlaps into other canvases for further selection and refinement and also to directly move the selected overlaps into segments to other applications for you through a simple drag-and-drop it interface As mentioned, Venn diagrams and Euler diagrams are logic diagrams intended to show relationships of sets and/or relationships of items within them (e.g., as in set theory and syllogistic reasoning). As an example, a quantified Euler diagram can include proportional representations of quantities (e.g., consider quantities represented via a bar chart or a pie chart). A quantified Euler diagram can "quantify" closed curves (e.g., circles, etc.) themselves and/or can "quantify" one or more overlaps between a plurality of closed curves (e.g., circles, etc.). As an example, a system can calculate proportionality of closed curves (e.g., circles, etc.) and overlaps.

As to Venn diagrams, consider: "A Venn diagram or set diagram is a diagram that shows all possible logical relations between a finite collection of different sets [1]."; and "In the mid-nineteenth century, John Venn (1834-1923), a Fellow of Cambridge University, devised a scheme for visualizing logical relationships . . . . " This is a depiction of a basic rule of logic-namely, that from the statements "all A is B" and "no C is B," it follows that "no C is A." The conclusion is evident when we look at the diagram's circles [2]."

As to Euler circles or Euler diagrams, which are logic diagrams, sizes of circles tend to be equivalent, except where when one set is fully contained within another and then one circle may be shown as generally smaller than the other, with no precision provided as to how much smaller; and when an overlapping set that is generally considered smaller than another may be represented as such, e.g., "France is a smaller set than Europe" but with no exact representation of the exact degree to which the set sizes correspond.

A formal working definition of an Euler diagram is presented below. Let $C=\{C1, C2, \ldots, Cn\}$ be a collection of finitely intersecting simple closed curves drawn in the plane. The collection C is said to be an Euler diagram if the intersection of X1, X2, . . . , Xn is connected, where each Xi is either int(Ci) (the interior of Ci) or is ext(Ci) (the exterior of Ci). If infinite intersections are allowed we refer to the diagrams as iEuler diagrams. Thus, an Euler diagram is like a Venn diagram except that intersections of curve interiors are allowed to be empty [3] [4].

As mentioned, a quantified Euler diagram can include "size as a representation of quantity" (e.g., as in pie charts and bar charts) and "overlaps as a representation of logic" (e.g., as in a Venn diagram and/or Euler diagram). As an example, "size as a representation of quantity" capability can apply to one or more "overlaps".

As an example, a system can include a scale mechanism (e.g., for a scale ratio) for "size as a representation of quantity" capability of the system. Such a mechanism may be set to a default state, be activated by a user (e.g., via a graphical user interface, etc.), controlled, etc.

The following documents are incorporated herein by reference: [1] "Wikipedia Venn Diagram," [Online]. Available: http:/en.wikipedia.org/wiki/Venn_diagram. [2] W. Dunham, The Mathematical Universe, 1996. [3] D.C.S.U.o.V. Frank Ruskey and Mark Weston, "A Survey of Venn Diagrams (Authors working version)," [Online]. Available: http://theory.cs.uvic.ca/venn/VennOth-erEJC.html. [4] D.C.S.U.o.V. Frank Ruskey and Mark Weston, "A Venn Diagram Survey (official version)," THE ELECTRONIC JOURNAL OF COMBINATORICS, vol. DS #5, June 2005. [5] "Wikipedia Euler Diagrams," [Online]. Available: http://en.wikipedia.org/wiki/Euler_dia-gram. [6] "Wolfram Alpha Venn Diagram," [Online]. Available: http://www.wolframalpha.com/input/?i=venn+diagram. [7] "Wolfram Math Word Venn Diagram," [Online]. Available: http://mathworld.wolfram.com/Venn-Diagram.html.

As an example, a graphical user interface (GUI) can include a canvas or canvases. As an example, a canvas can be a container that includes various drawing elements (lines, shapes, text, frames containing other elements, etc.). As an example, a canvas can be a scene graph that arranges logical representations of a graphical scene that can include graphical controls. As an example, a canvas can be a user interface where graphical controls (e.g., graphical representations of selectable elements, items, etc.) can allow for user interactions, for example, via touch, voice, stylus, mouse, touch-pad, etc. As an example, As an example, a dashboard can include one or more canvases. As an example, a canvas can be saved. As an example, a canvas can be rendered in a workspace. For example, a workspace can include various elements that enable segmentation of information in one or more databases. For example, consider segmenting information in a database and performing one or more operations such as, for example, normalization, export, etc.

As an example, a workspace can include distinct areas. For example, consider a left side, where criteria and saved items are located and a right side where one or more canvases are displayed and operated upon (e.g., via various interactions).

As an example, a workspace can be implemented using a browser application. In such an example, various features of the browser application may allow for interacting with browser zoom settings, screen sizes, screen resolutions, etc. As an example, a browser application may include a zoom control, for example, by holding down a control (ctrl) key and using a mouse scroll-wheel or, for example, a browser menu can allow for adjustment of zoom. As an example, a higher zoom may allow a user to see more criteria at a time in a criteria area of a workspace while a lower zoom may make words bigger and easier to read. As an example, an application may be a mobile application such as an application that can execute in an operating system environment of a smart phone (e.g., ANDROID® OS, iOS® OS, etc.).

As an example, in a workspace, a canvas can be represented, for example, as a tab. As mentioned, a canvas can be saved and, for example, loaded from storage (e.g., stored in a folder of a file system and restored from the folder of the file system).

FIG. 1 shows an example of a graphical user interface 110 that includes information 112, a canvas 120, a scale control 122 and a zoom control 126. As an example, a graphical icon 125 may be movable and represent information that can be rendered to the canvas 120 via representations such as circles. For example, the graphical icon 125 can represent data for a set CA and a set Product A where the set CA includes 21,000 members and where the set Product A includes 108,000 members (see, e.g., information 112). As shown, circles that represent sets can overlap to form a segment where the segment can be selectable. For example, a user may touch a touchscreen at the overlap area of the two circles to select the segment or a user may navigate a cursor via a pointing device to select the segment (e.g., via a click, a hover, etc.). FIG. 1 also shows some examples of circles 181, 182, 183, 184, 185, 186, 187 and 188 where the example 181 is akin to the example in the canvas 120, where the example 182 includes a circle within a circle where one is smaller (e.g., fewer members), where the example 183 corresponds to two circles without overlap, wherein the example 184 corresponds to three circles that overlap each other at least in part, where the example 185 corresponds to three circles where two overlap and where one does not (e.g., noting that a variation can include overlap of two circles with a common circle where the two circles do not overlap), where the example 186 shows three circles from a small size to a larger size where two of the circles are within the larger sized circle (e.g., noting that the overlap of circles within circles can differ such as in one or more other examples), where the example 187 shows a circle within a circle and another circle that overlaps each of these circles, and where the example 188 corresponds to three circles without overlap.

In the example of FIG. 1, the overlapping circles form three segments that may be selected. For example, a segment of the set Product A that does not include members meeting one or more criteria for the set CA, a segment of members of the sets Product A and CA meeting common criteria, and a segment of the set CA that does not include members meeting one or more criteria for the set Product A. Thus, while the example of FIG. 1 shows a particular segment being selected or chosen, one or more of the aforementioned three segments may be chosen.

As an example, a set can be a portion of a dataset. For example, a dataset can include information that can be represented as one or more sets. As an example, where sets overlap, they can define a segment or, as explained with respect to FIG. 1, segments.

As an example, additional relationships such as, for example, parent and child relationships may be established where a series of operations may be performed. As an example, consider successive refinement of data in one or more datasets using one or more types of graphical representations of such data. As an example, where a set is a segment and where another set is a segment, segments can overlap to define a yet another segment, which may be a new segment. As an example, a segment can be a set. As an example, where a set or sets are referred to, these may be referred to as a segment or segments, which may be of one or more than one dataset.

In the example of FIG. 1, the scale control 122 is effectively "off" and the zoom control 126 is at a lowest level of zoom, which may be "no zoom". As shown, the scale control 122 and the zoom control 126 can be implemented as slider controls where a slider bar is movable to adjust scale or and where a slider bar is movable to adjust zoom.

Figure 2:
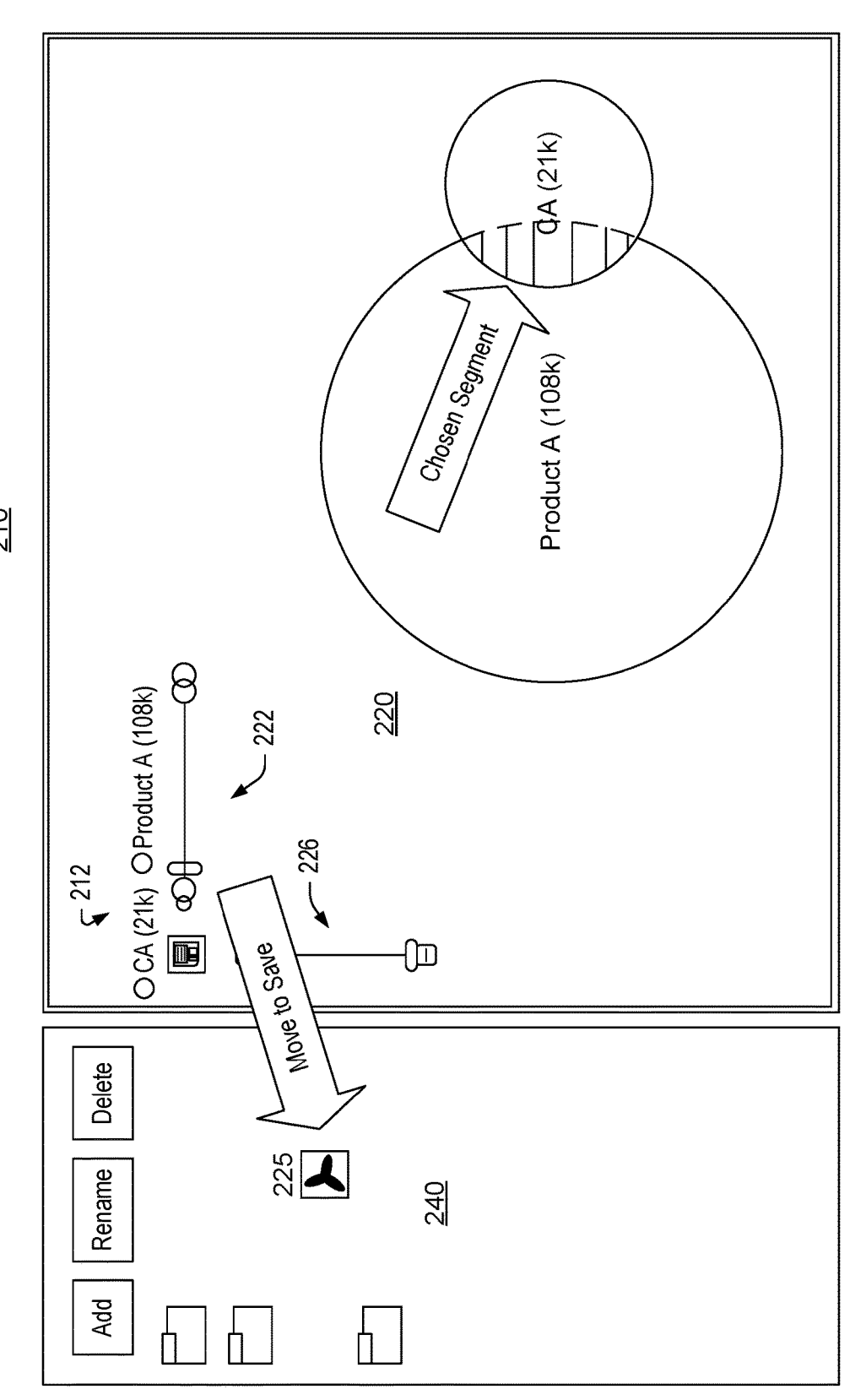
FIG. 2 is a diagram of an example of a graphical user interface.

FIG. 2 shows an example of a workspace GUI 210 with a canvas 220 and a storage area 240. As shown, the canvas 220 includes information 212, a scale control 222 and a zoom control 226. As shown, a graphical icon 225 is movable to the storage area 240, for example, to save the canvas 220, which includes various rendering of information. As an example, the canvas 220 may be stored to a folder and restored from the folder. As an example, the storage area 240 may be represented as a series of folders, which may correspond to folders of a file system (e.g., consider a file system associated with an operating system such as one or more of a LINUX® OS, a WINDOWS® OS, an iOS® OS, an ANDROID® OS, a FIRE® OS, etc.). As an example, input received locally may be communicated via a network to one or more remote machines that act to store information in one or more remote file systems (e.g., remote database, etc.). For example, a user may have a user account where information may be stored with respect to a storage space associated with the user account.

Figure 3:
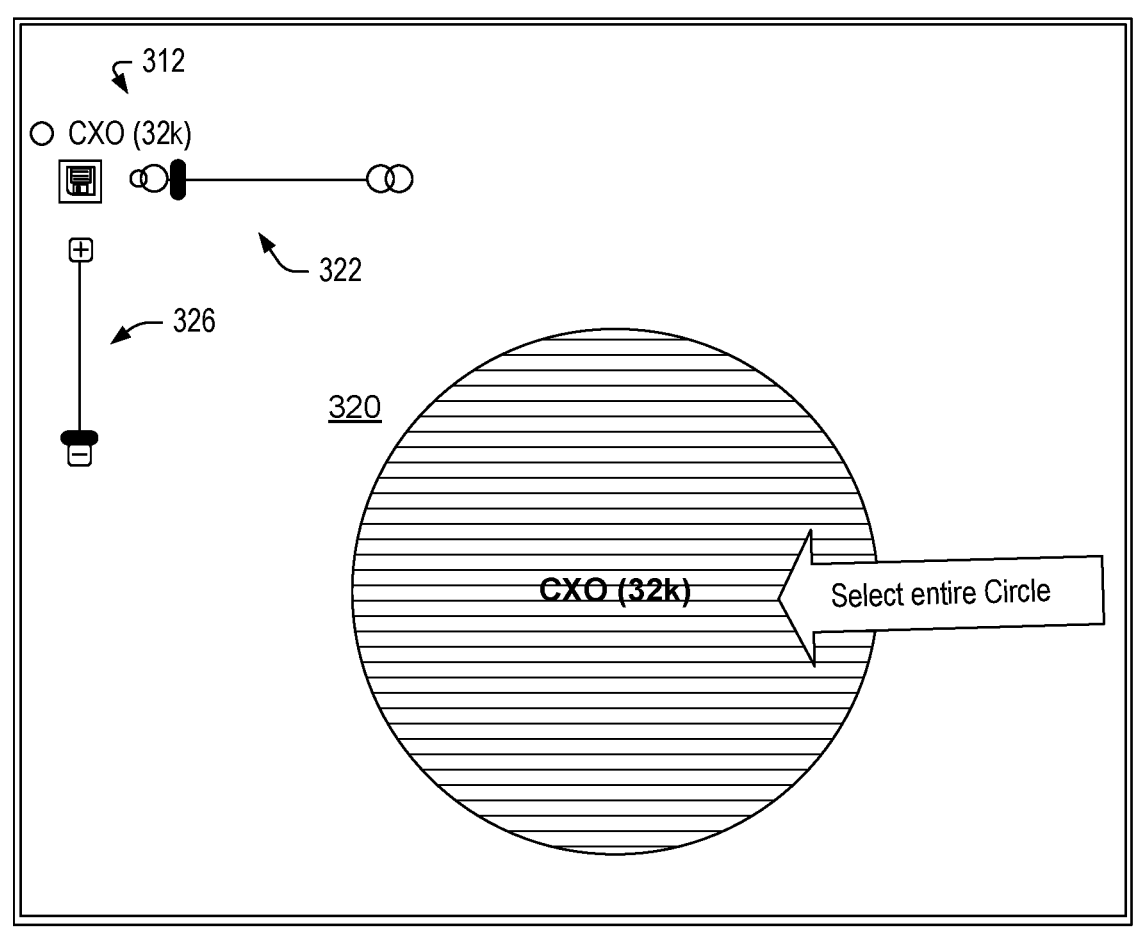
FIG. 3 is a diagram of an example of a graphical user interface.

FIG. 3 shows an example of a GUI 310 that includes information 312, a canvas 320, a scale control 322 and a zoom control 326. As shown in the canvas 320, a circle that represents a set CXO includes 32,000 members and can be selected, as may be indicated by color, hatching, etc.

Figure 4:
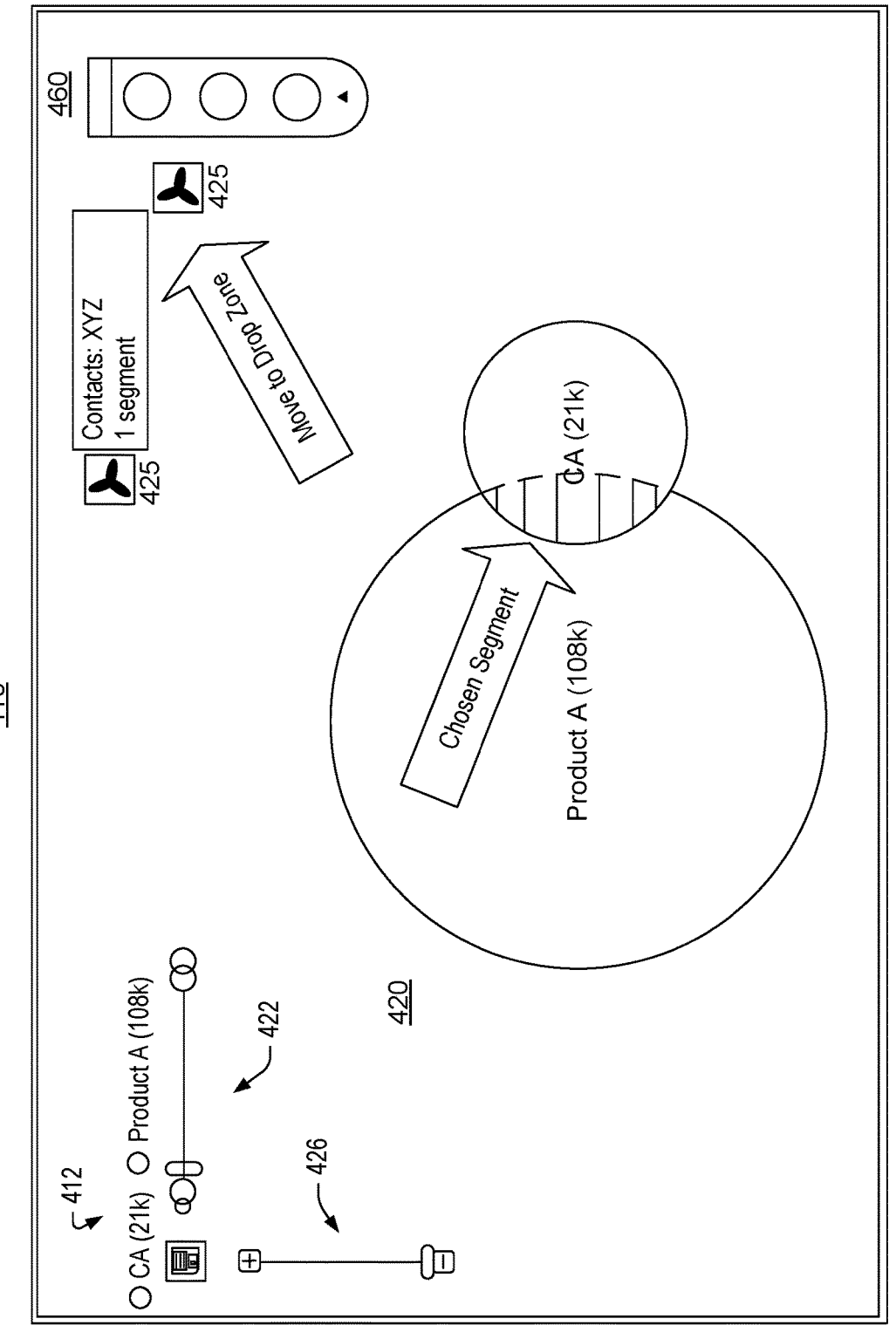
FIG. 4 is a diagram of an example of a graphical user interface.

FIG. 4 shows an example of a GUI 410 that includes information 412, a canvas 420, a scale control 422 and a zoom control 426. As shown, a segment is selected and can be represented by a graphical icon 425. A window can display information about the selected segment. As an example, the graphical icon 425 may be moved to an output graphic 460 where the output graphic 460 can include individual icons that represent applications. For example, consider a spreadsheet application such as, for example, the EXCEL® spreadsheet application of Microsoft Corporation (Redmond, Washington). As another example, consider the ELOQUA® application (e.g., marketing automation platform for managing sales and marketing leads across an enterprise) of Oracle Corporation (Redwood City, California).

As an example, by moving a graphical icon or other graphical element that represents information to an application of an output graphic, a method can include formatting of the information to a file format, etc. that is suitable for input to the application. For example, where an application is a spreadsheet application, computer-executable instructions can include formatting information to a file in a file format that can be input to the spreadsheet application. As an example, an add-on may be implemented where a proprietary format (e.g., file format, etc.) may be utilized by an application. As an example, a box may be rendered to a display with various options as to formats. For example, consider various formats of the EXCEL® spreadsheet application.

Figure 5:
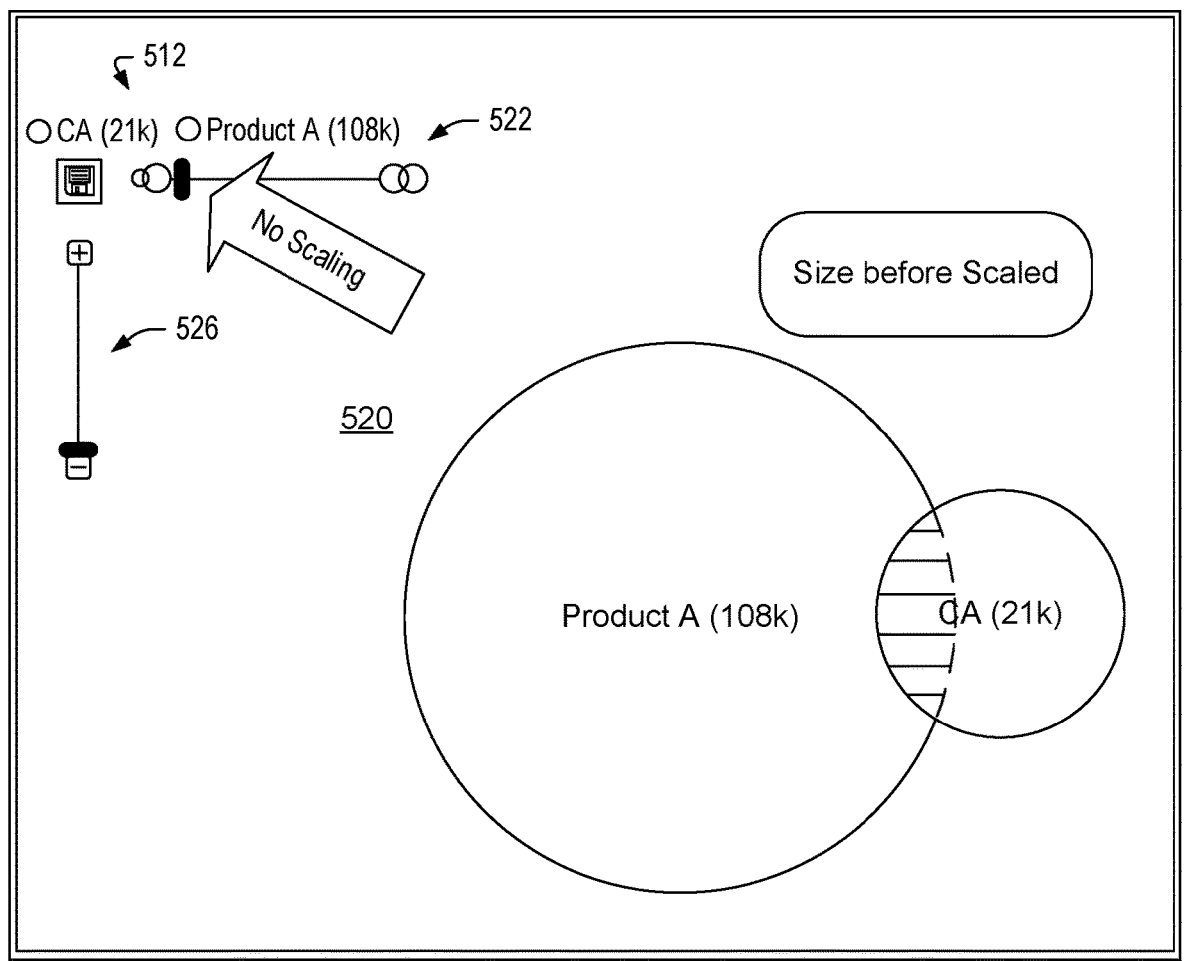
FIG. 5 is a diagram of an example of a graphical user interface.

FIG. 5 shows an example of a GUI 510 that includes information 512, a canvas 520, a scale control 522 and a zoom control 526. As shown, the scale control 522 is at "no scaling", where a graphic shows circles that are of unequal size at one end of the scale control 522 and where another graphic shows circles that are of approximately equal size at another end of the scale control 522. The canvas 520 shows circles with a "size before scaled".

Figure 6:
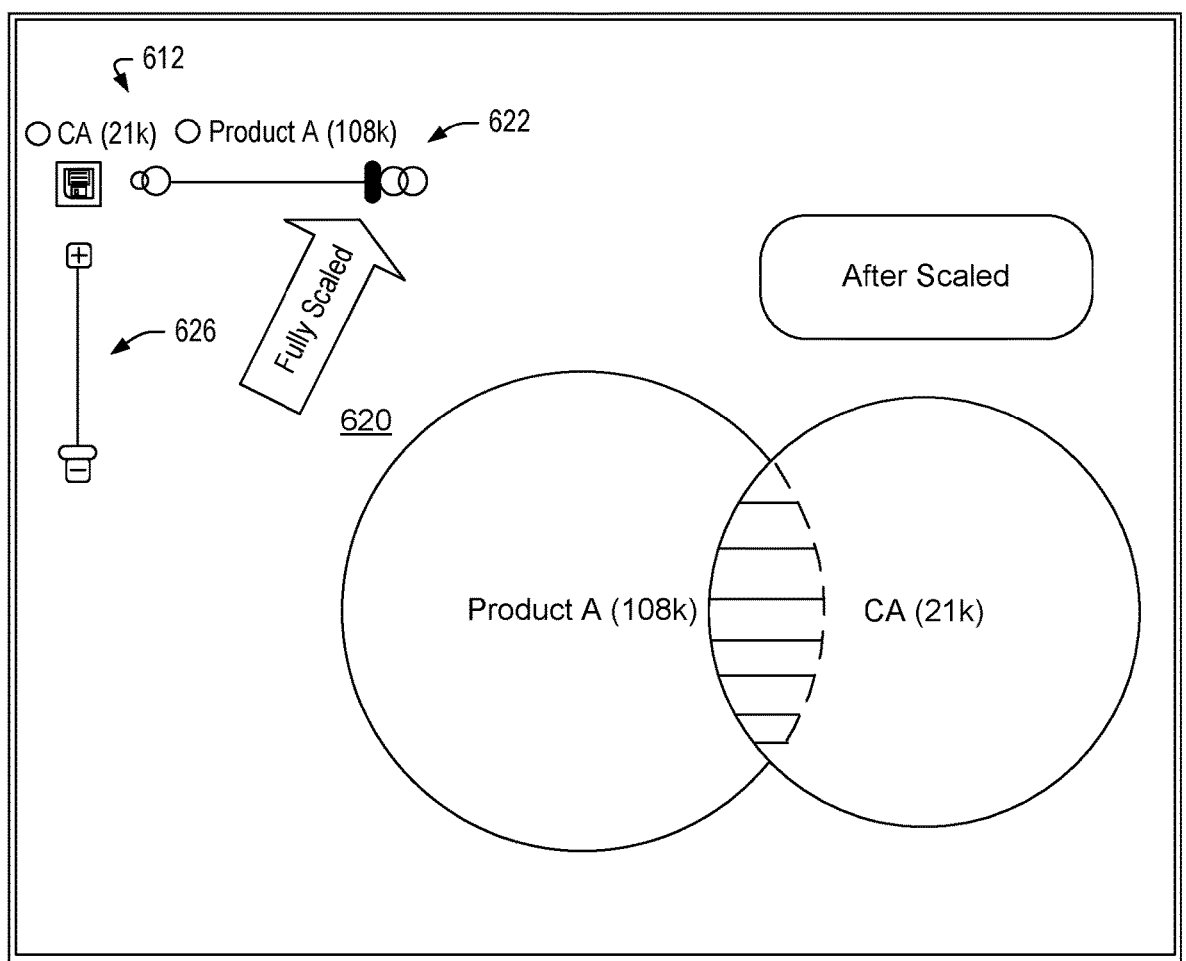
FIG. 6 is a diagram of an example of a graphical user interface.

FIG. 6 shows an example of a GUI 610 that includes information 612, a canvas 620, a scale control 622 and a zoom control 626. As shown, the scale control 622 is at "fully scaled", where a graphic shows circles that are of unequal size at one end of the scale control 622 and where another graphic shows circles that are of approximately equal size at another end of the scale control 622. The canvas 620 shows circles with a size "after scaled".

Figure 7:
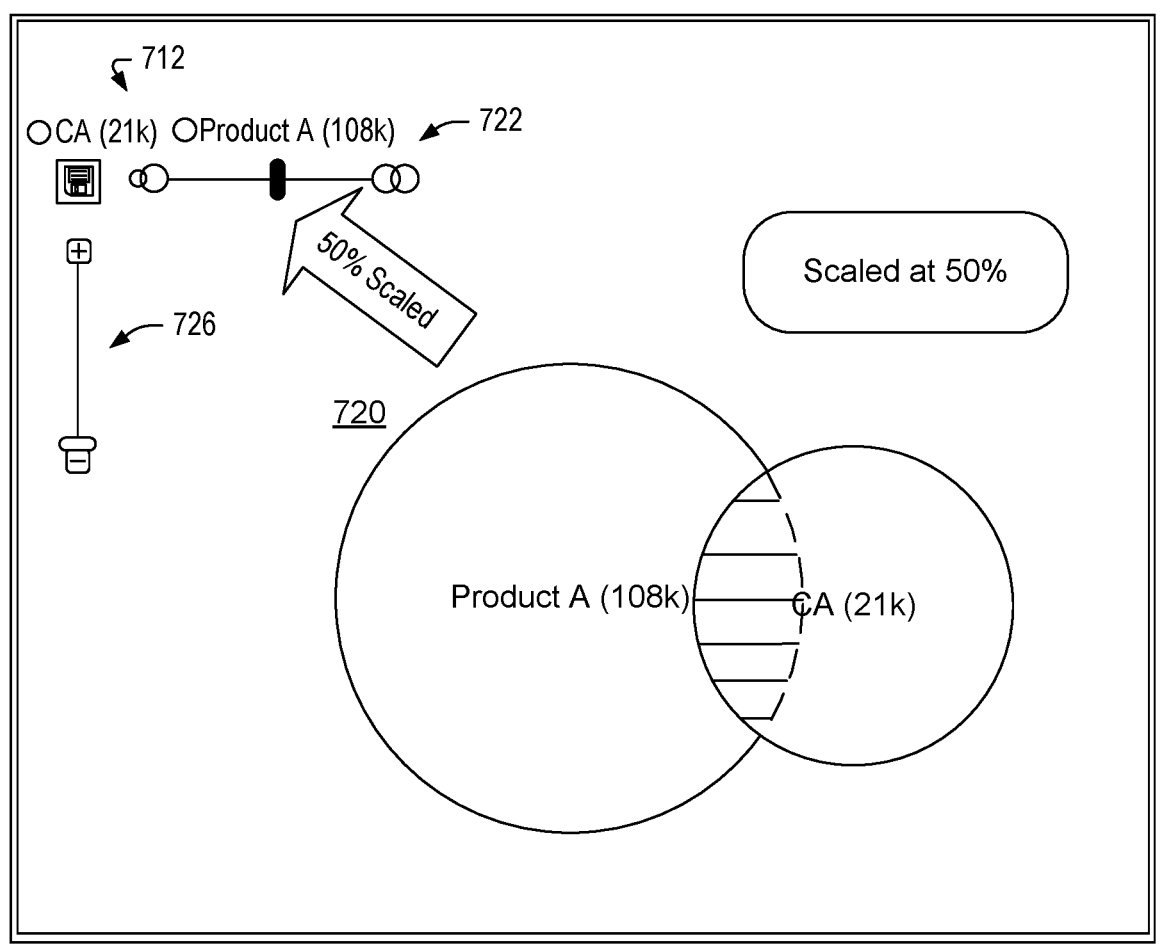
FIG. 7 is a diagram of an example of a graphical user interface.

FIG. 7 shows an example of a GUI 710 that includes information 712, a canvas 720, a scale control 722 and a zoom control 726. As shown, the scale control 722 is at approximately "50% scaled", where a graphic shows circles that are of unequal size at one end of the scale control 722 and where another graphic shows circles that are of approximately equal size at another end of the scale control 722. The canvas 720 shows circles with a size "scaled at 50%". As an example, the canvas 720 can include a graphic that indicates a numerical value as to an amount of scaling (e.g., "scaled at 50%").

Figure 8:
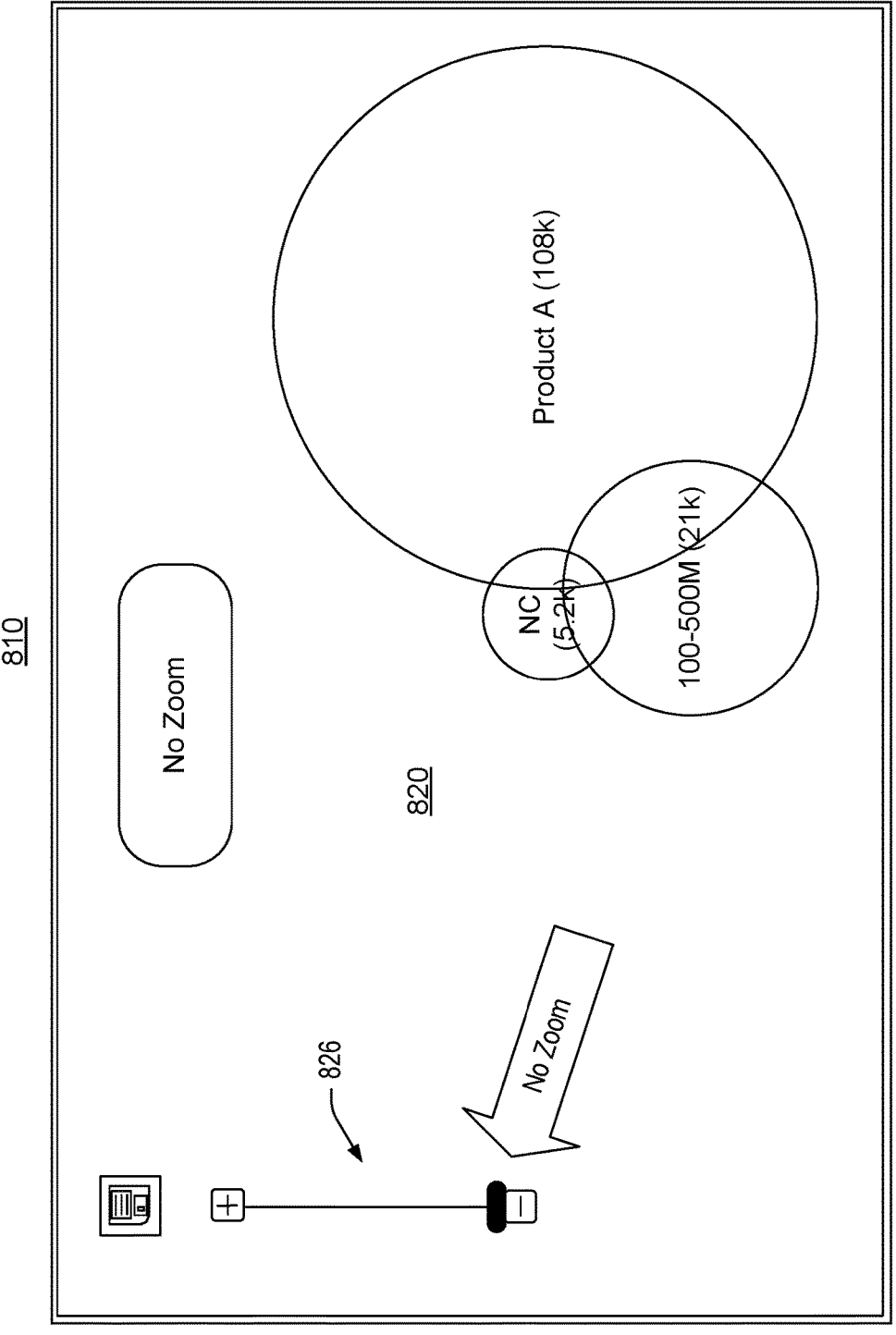
FIG. 8 is a diagram of an example of a graphical user interface.

FIG. 8 shows an example of a GUI 810 that includes a canvas 820 and a zoom control 826. As shown, the zoom control 826 is at "no zoom". The canvas 820 shows circles with a size corresponding to "no zoom".

Figure 9:
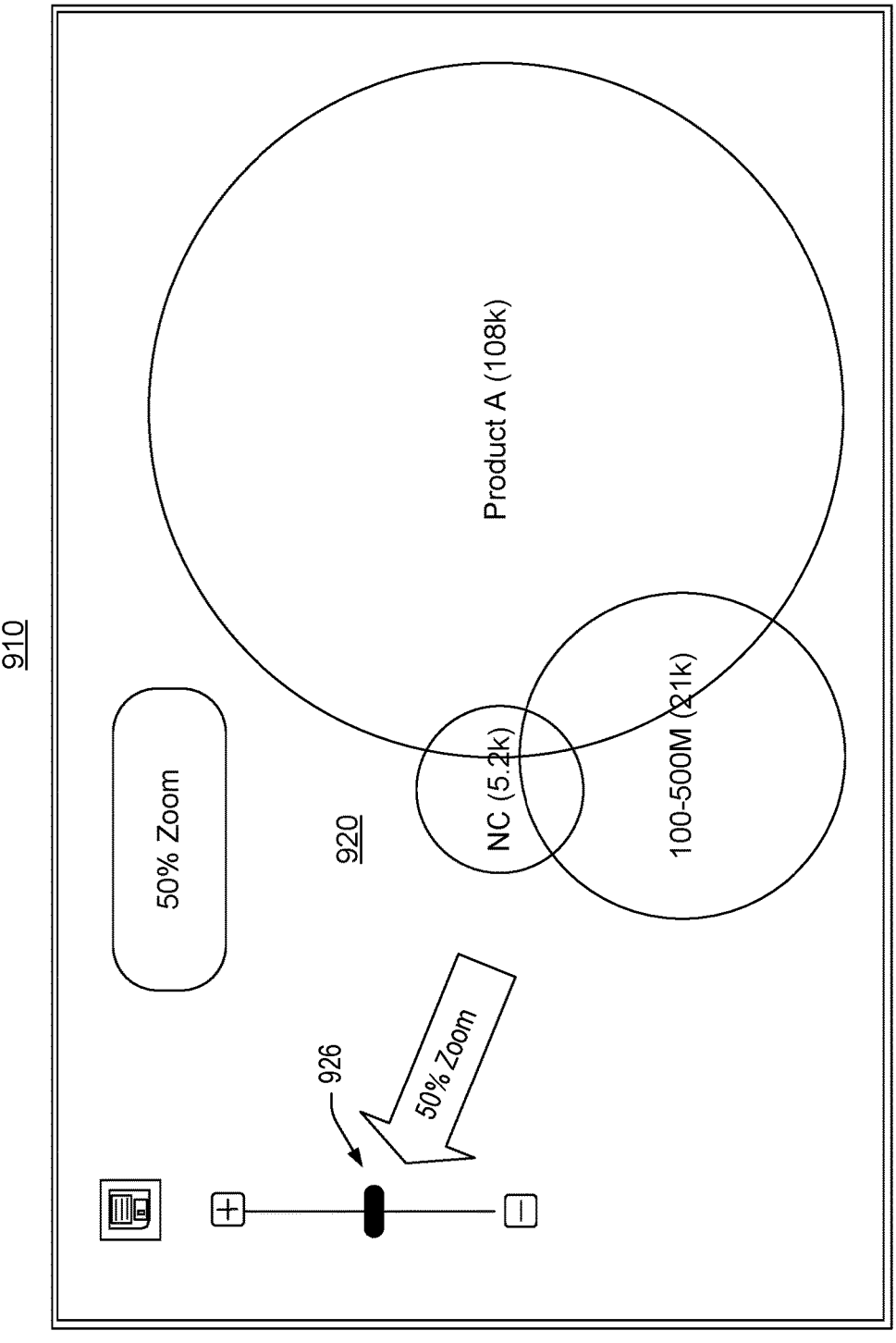
FIG. 9 is a diagram of an example of a graphical user interface.

FIG. 9 shows an example of a GUI 910 that includes a canvas 920 and a zoom control 926. As shown, the zoom control 926 is at approximately "50% zoom". The canvas 920 shows circles with a size corresponding to "50% zoom". As an example, the canvas 920 can include a graphic that indicates a numerical value as to an amount of zoom or zooming (e.g., "50% zoom").

Figure 10:
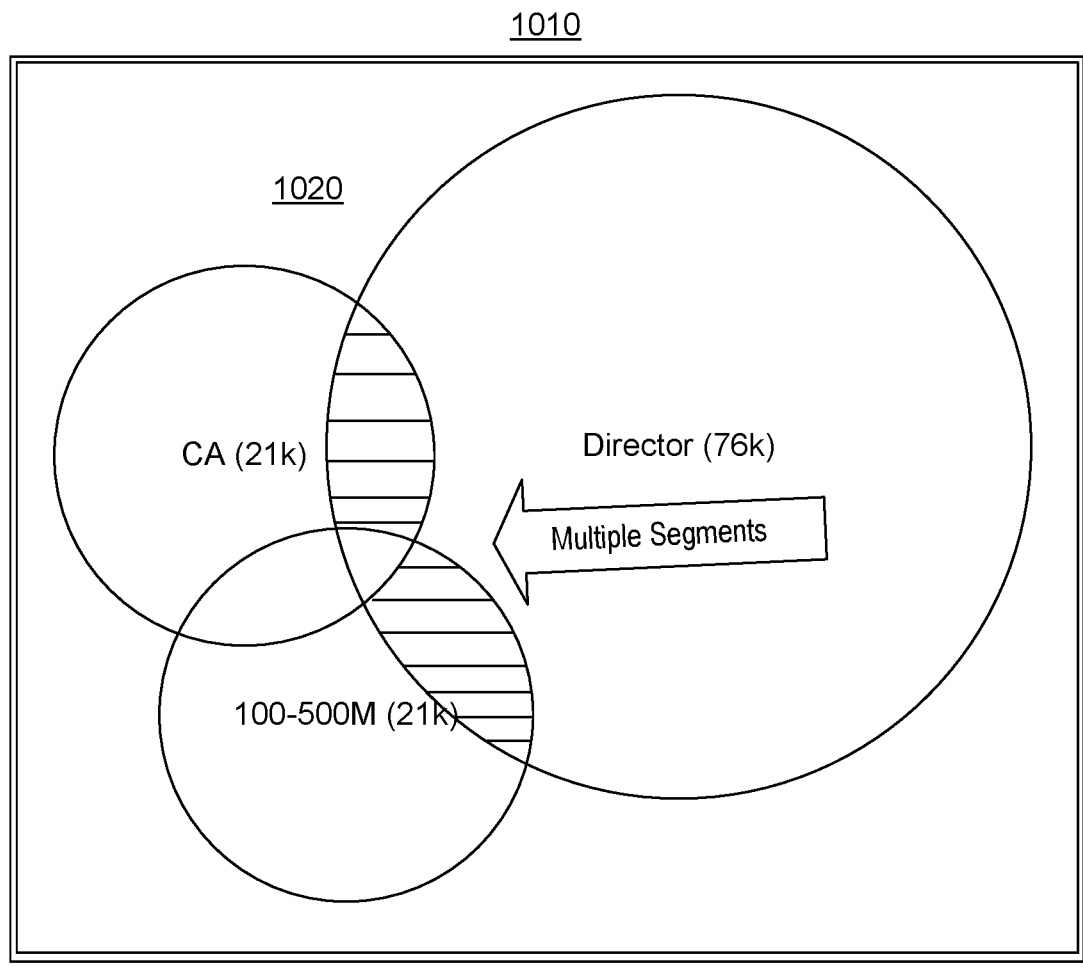
FIG. 10 is a diagram of an example of a graphical user interface.

FIG. 10 shows an example of a GUI 1010 that includes a canvas 1020 where three circles represent information and intersect to define segments (e.g., multiple segments).

Figure 11:
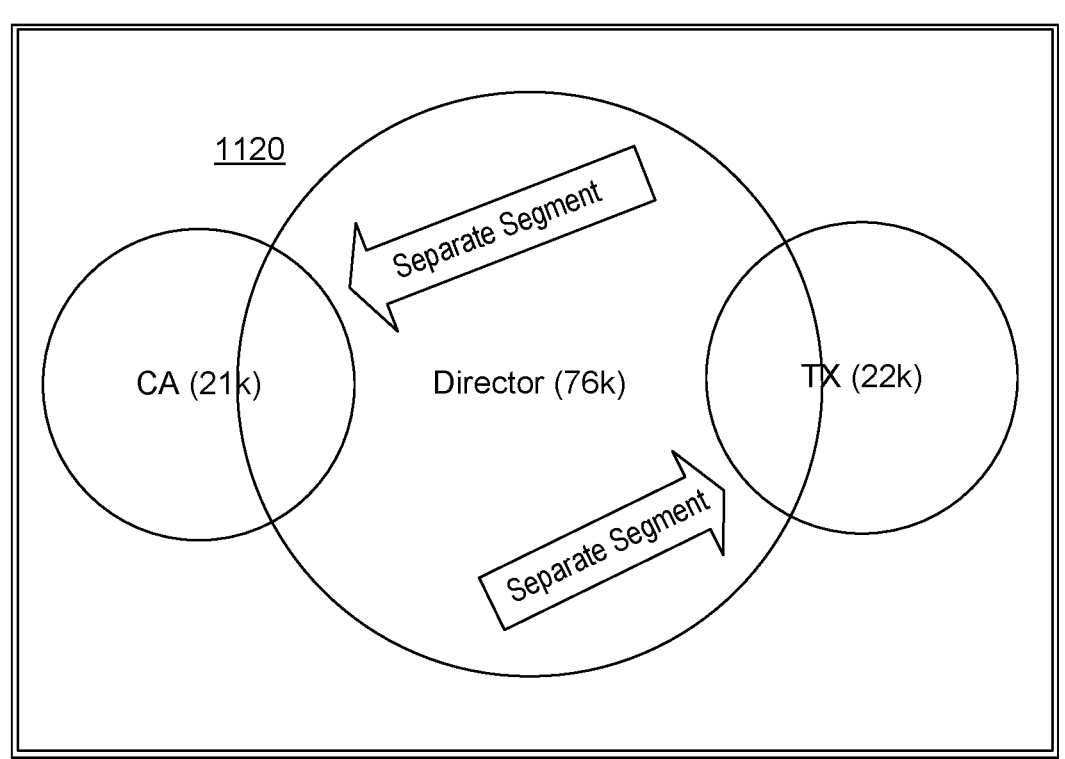
FIG. 11 is a diagram of an example of a graphical user interface.

FIG. 11 shows an example of a GUI 1110 that includes a canvas 1120 that includes three circles where intersection between two of the circles define a first segment and where intersection between two of the circles define a second segment where the first segment is separate from the second segment.

Figure 12:
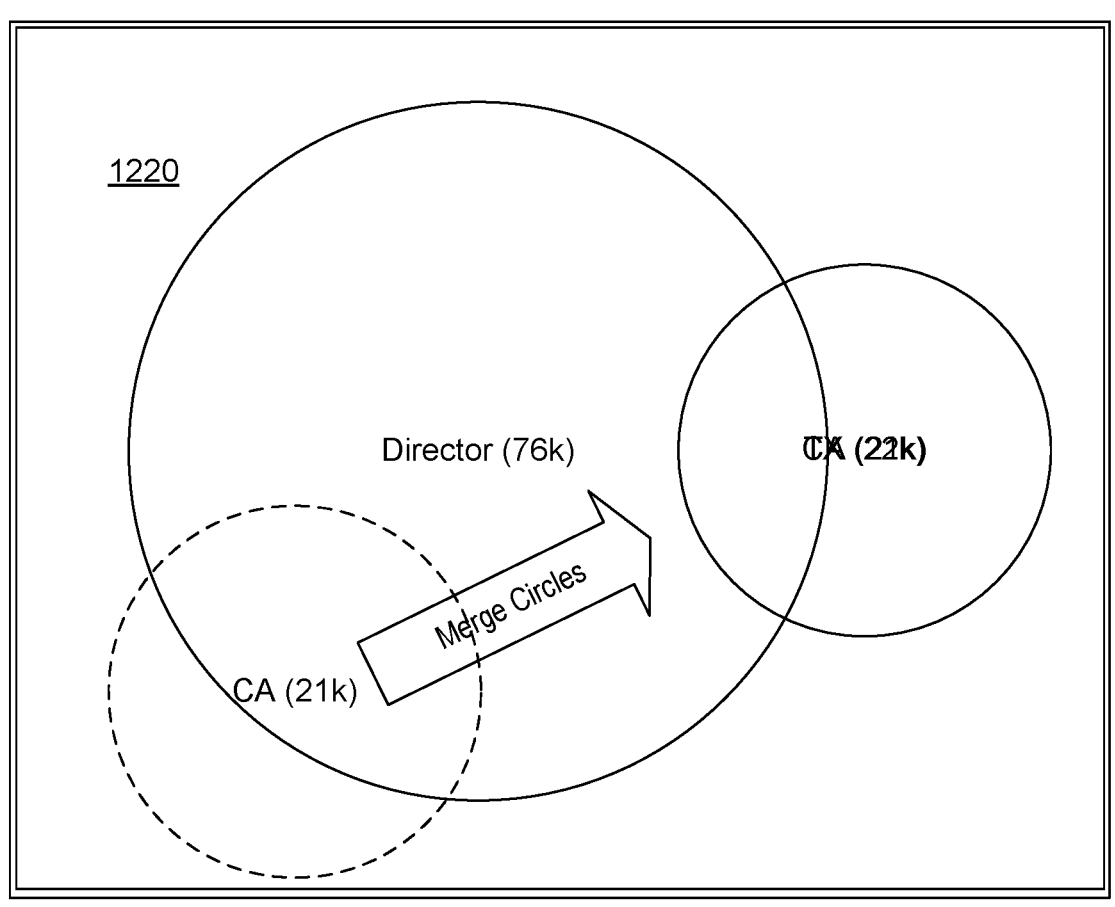
FIG. 12 is a diagram of an example of a graphical user interface.

FIG. 12 shows an example of a GUI 1210 that includes a canvas 1220 that includes three circles where two of the circles overlap and define an intersection with the other circle. Such an arrangement can define combined segments. As an example, a method can include merging circles, which involves merging sets (e.g., combining members of sets).

Figure 13:
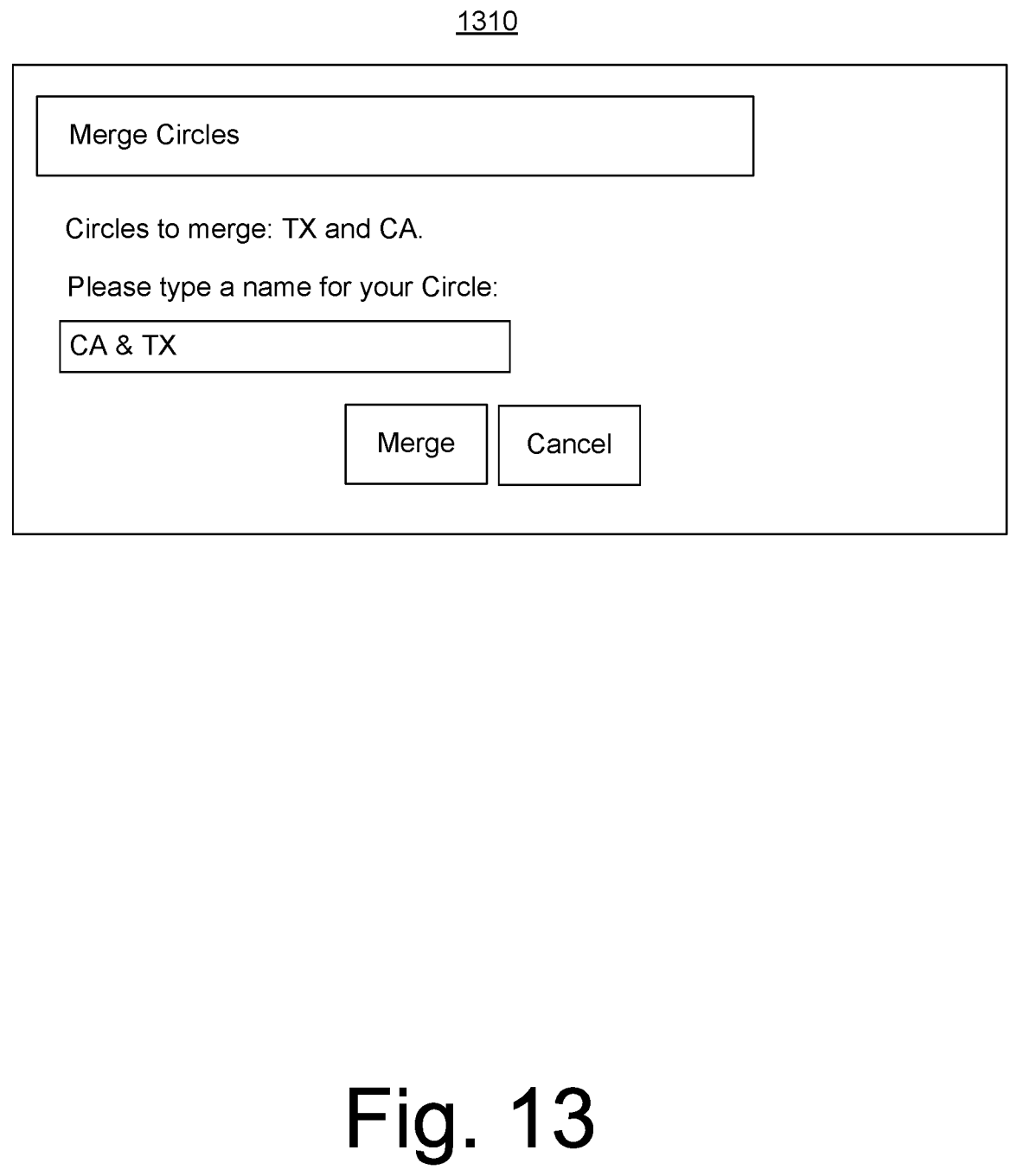

FIG. 13 shows an example of a GUI 1310 that include a graphical control window with fields and control buttons. As shown, text may be entered into the fields to provide a name for merged circles. In such an example, the named merged circles can form a set that can be stored, exported, further analyzed, etc.

Figure 14:
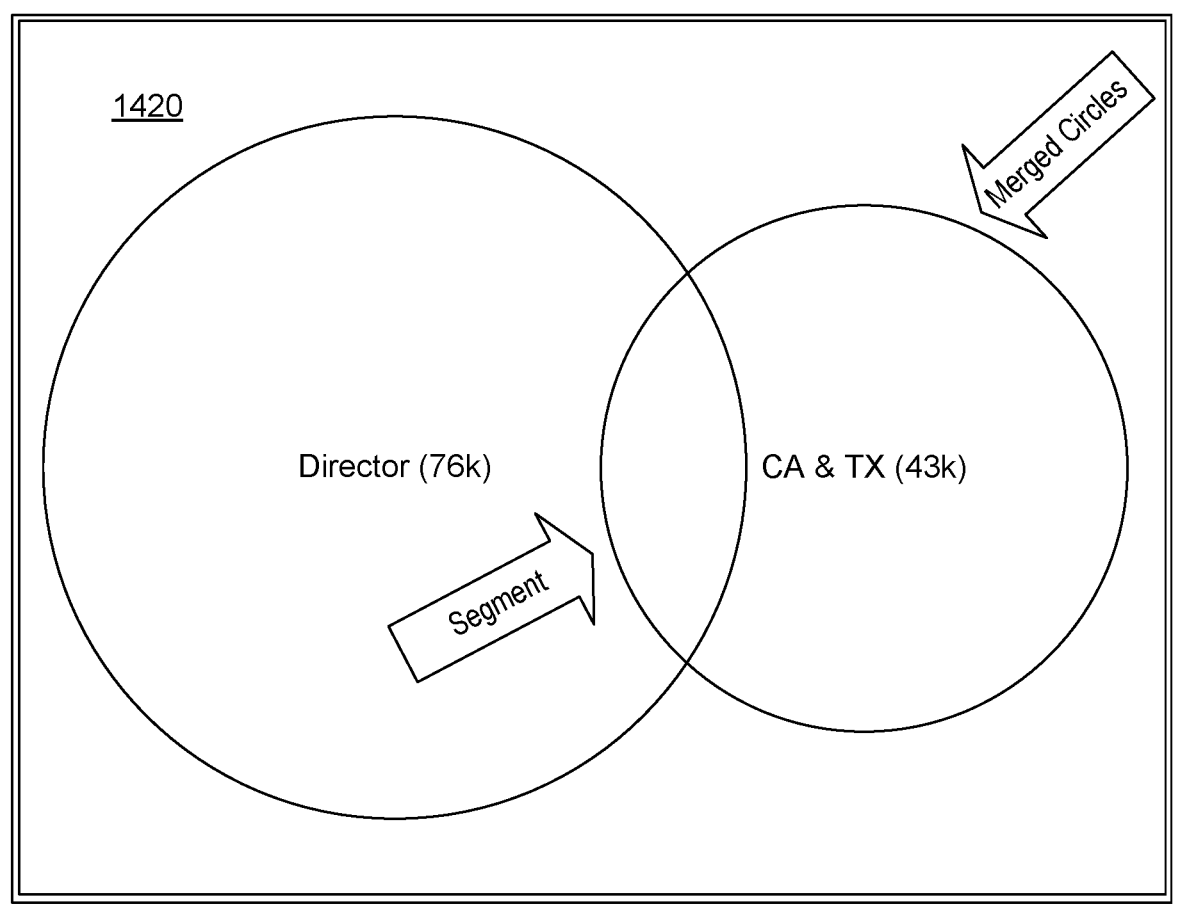
FIG. 14 is a diagram of an example of a graphical user interface.

FIG. 14 shows an example of a GUI 1410 that includes a canvas 1420 that includes a circle for a set Director and a circle for a merged set CA & TX where the two circles intersect to define a segment; noting that three segments can be defined by the circles shown in FIG. 14.

Figure 15:
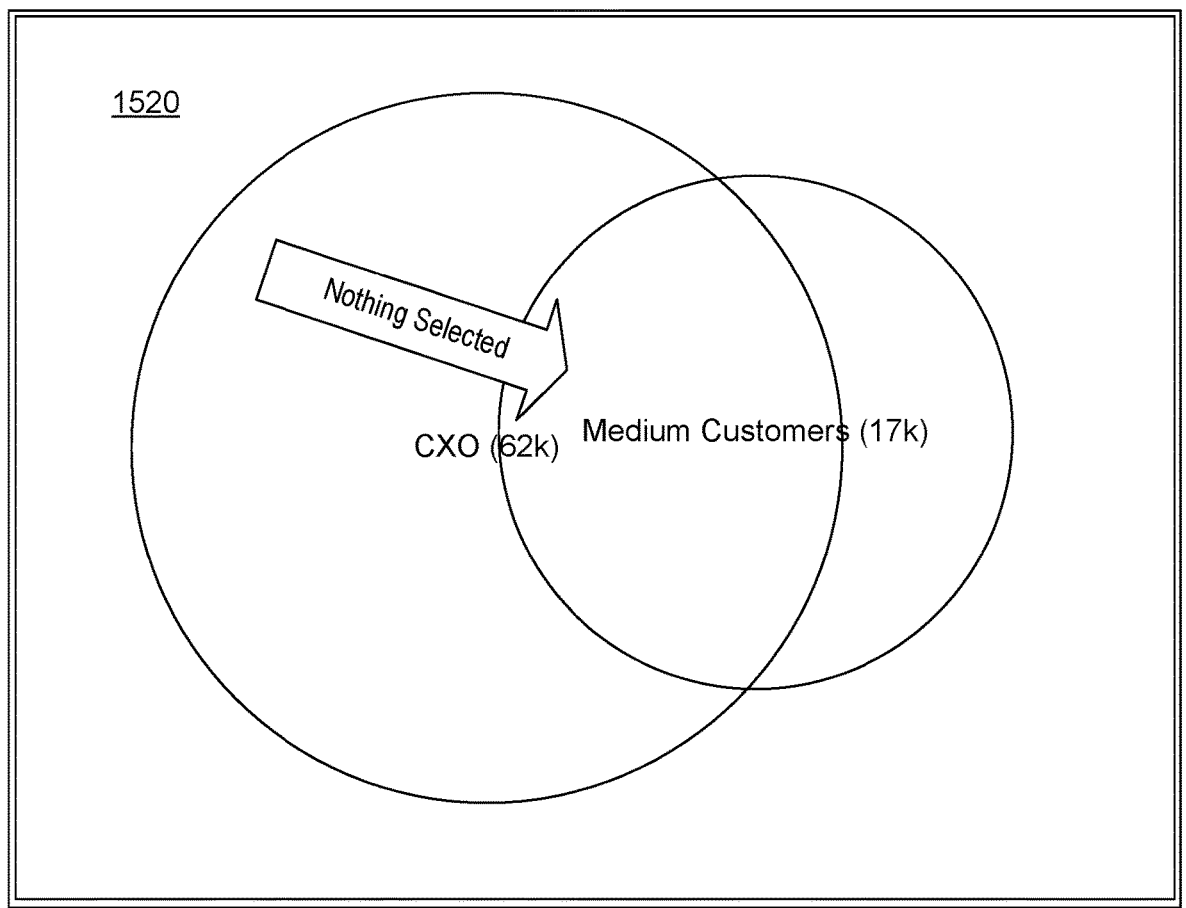
FIG. 15 is a diagram of an example of a graphical user interface.

FIG. 15 shows an example of a GUI 1510 that includes a canvas 1520 where two circles overlap yet where no segment is selected.

Figure 16:
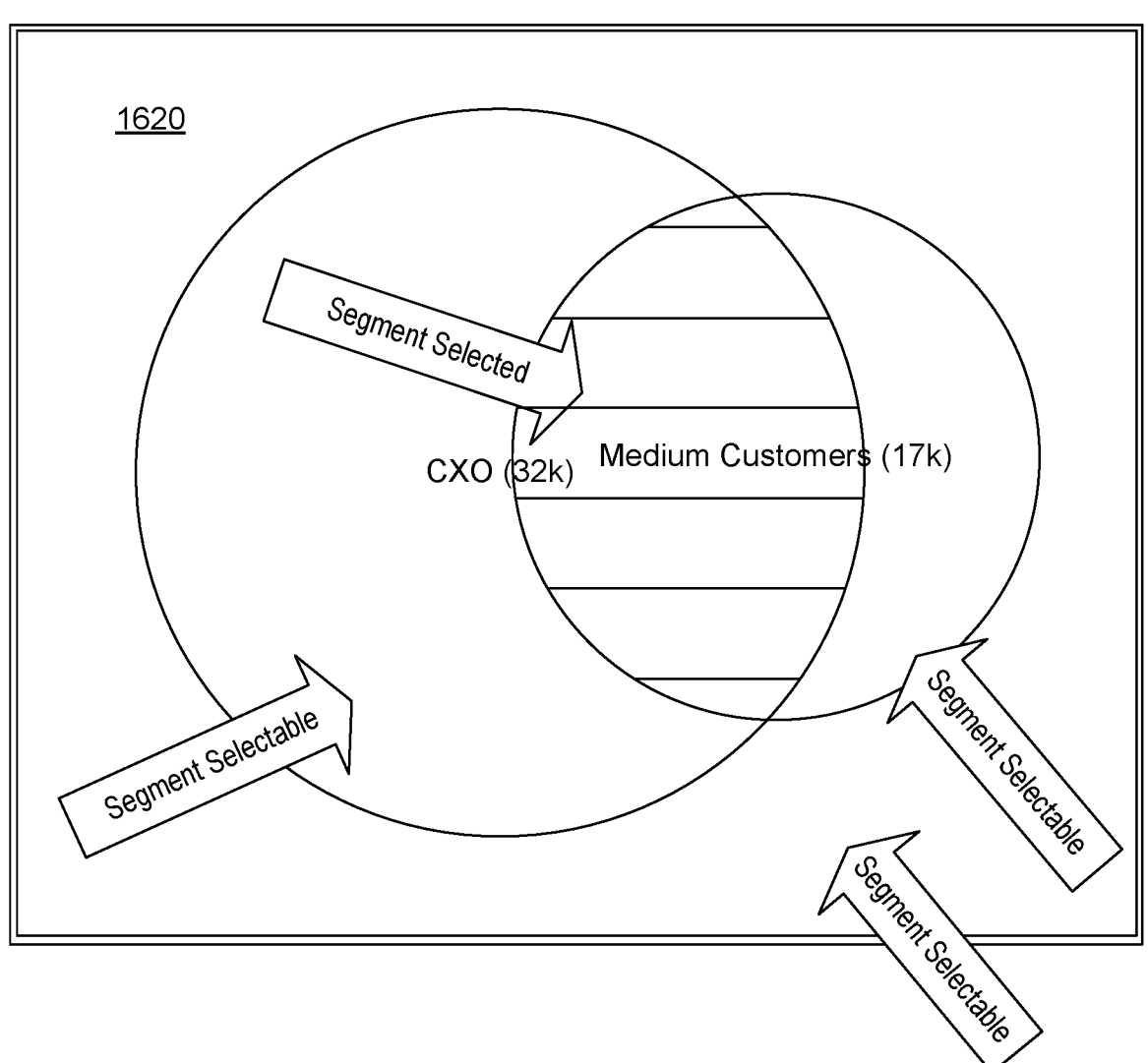
FIG. 16 is a diagram of an example of a graphical user interface.

FIG. 16 shows an example of a GUI 1610 that includes a canvas 1620 where two circles overlap and where a segment is selected as indicated by indicia in the intersecting/overlapping portion. Further, FIG. 16 shows two selectable segments. As an example, one or more of the segments in the example of FIG. 16 may be selected. As an example, a space outside of the circles may be selected as a selectable segment, which can be members that do not correspond to those members of the one or more selectable segments corresponding to the circles or overlap of the circles.

Figure 17:
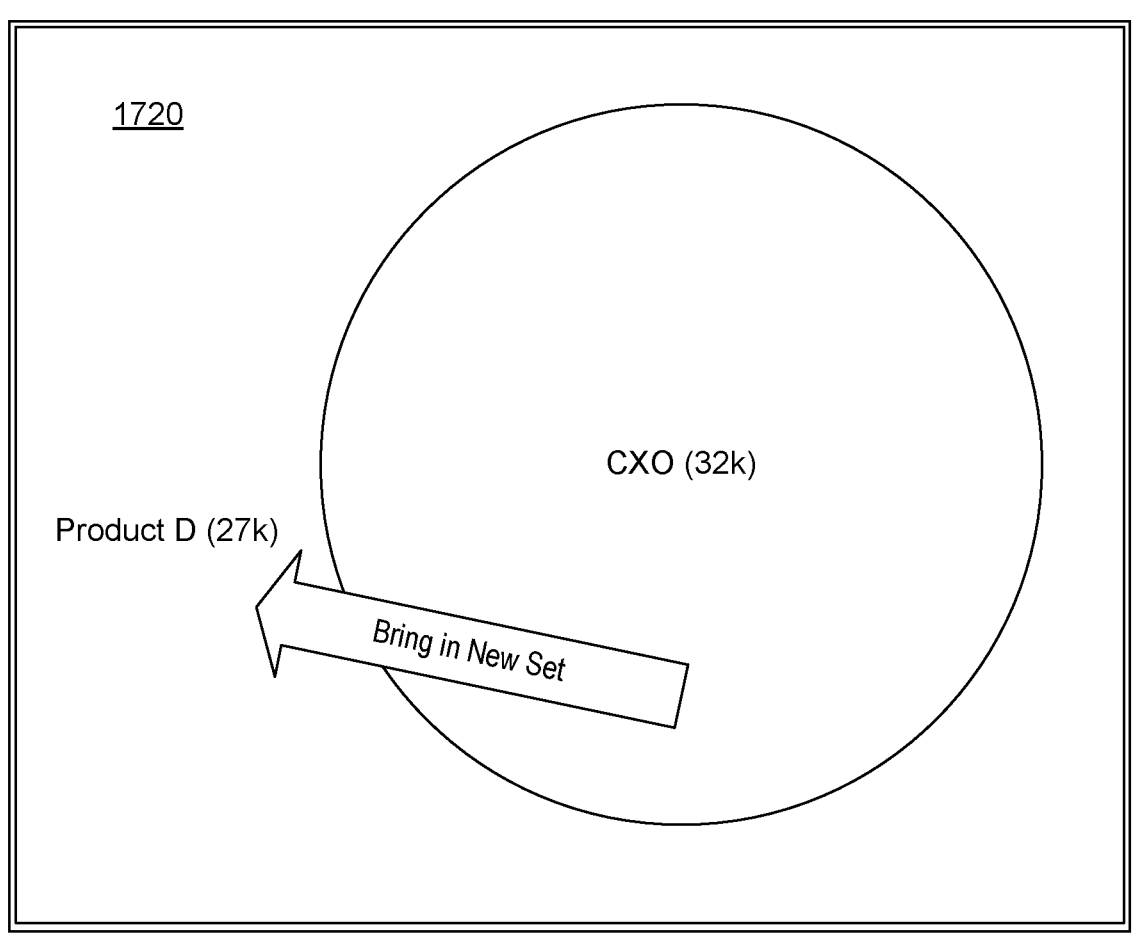
FIG. 17 is a diagram of an example of a graphical user interface.

FIG. 17 shows an example of a GUI 1710 that includes a canvas 1720 where a circle represents a set CXO and where an additional set Product D is being introduced in proximity to the circle that represents the set CXO. As shown, the set Product D may be represented as text that can be dragged and dropped in the canvas 1720 to trigger an analysis that causes an updating of the GUI 1710, for example, to render a representation of logic as to the sets CXO and Product D.

Figure 18:
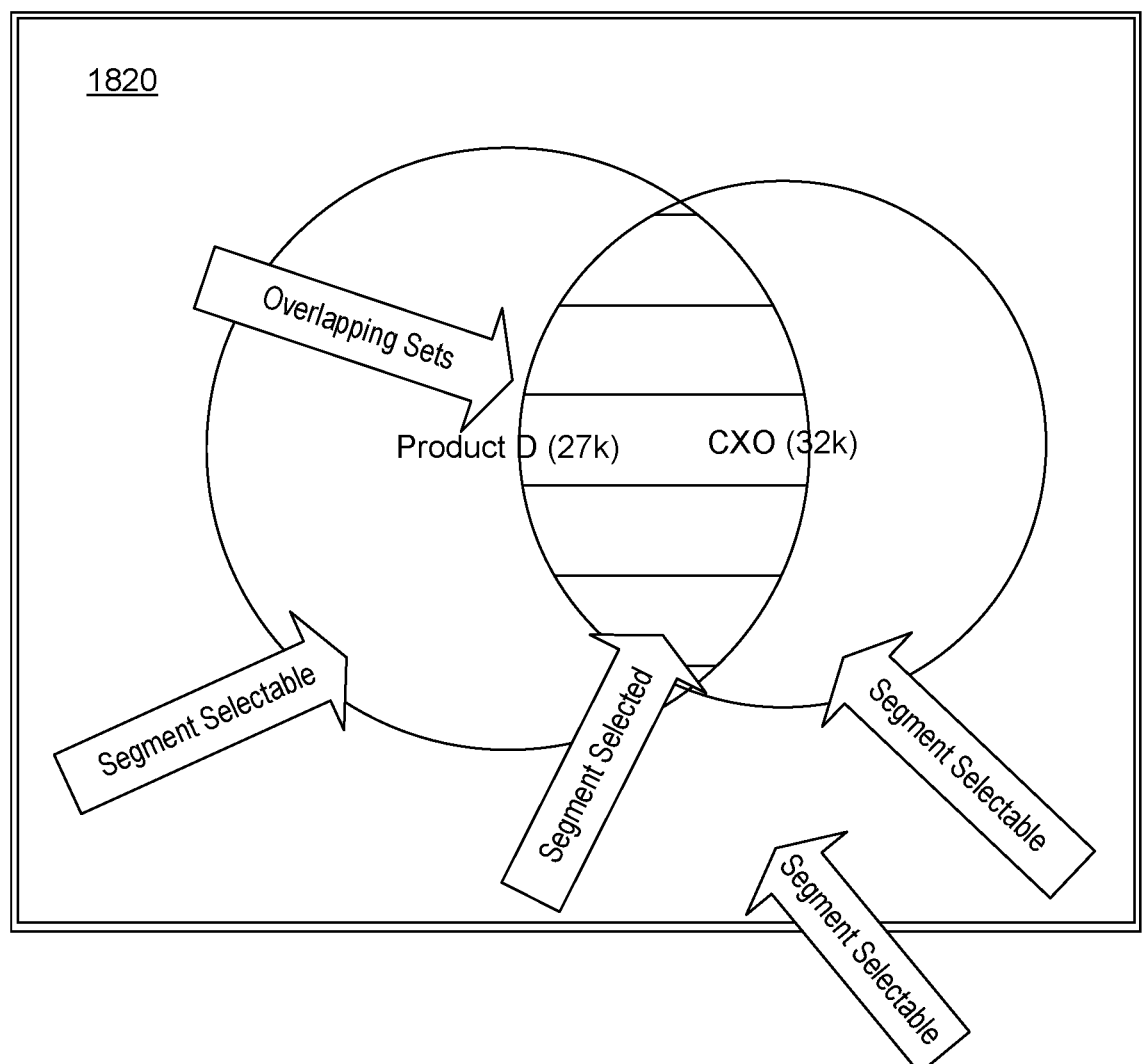
FIG. 18 is a diagram of an example of a graphical user interface.

FIG. 18 shows an example of a GUI 1810 that includes a canvas 1820 where overlapping sets, which can be segments themselves, define yet at least one new segment, which can be highlighted on a canvas. As shown in the example of FIG. 18, three selectable segments are rendered via the GUI 1810 to a display. As mentioned with respect to the example of FIG. 17, dragging and dropping a graphical element that represents a set can trigger an application to perform calculations as to graphical elements of a GUI such that a logic-based representation of sets can be rendered where one or more segments can be themselves selectable graphical elements that upon selection cause the application to perform one or more actions (e.g., highlighting, rendering a number that corresponds to a number of members of a segment, etc.).

Figure 19:
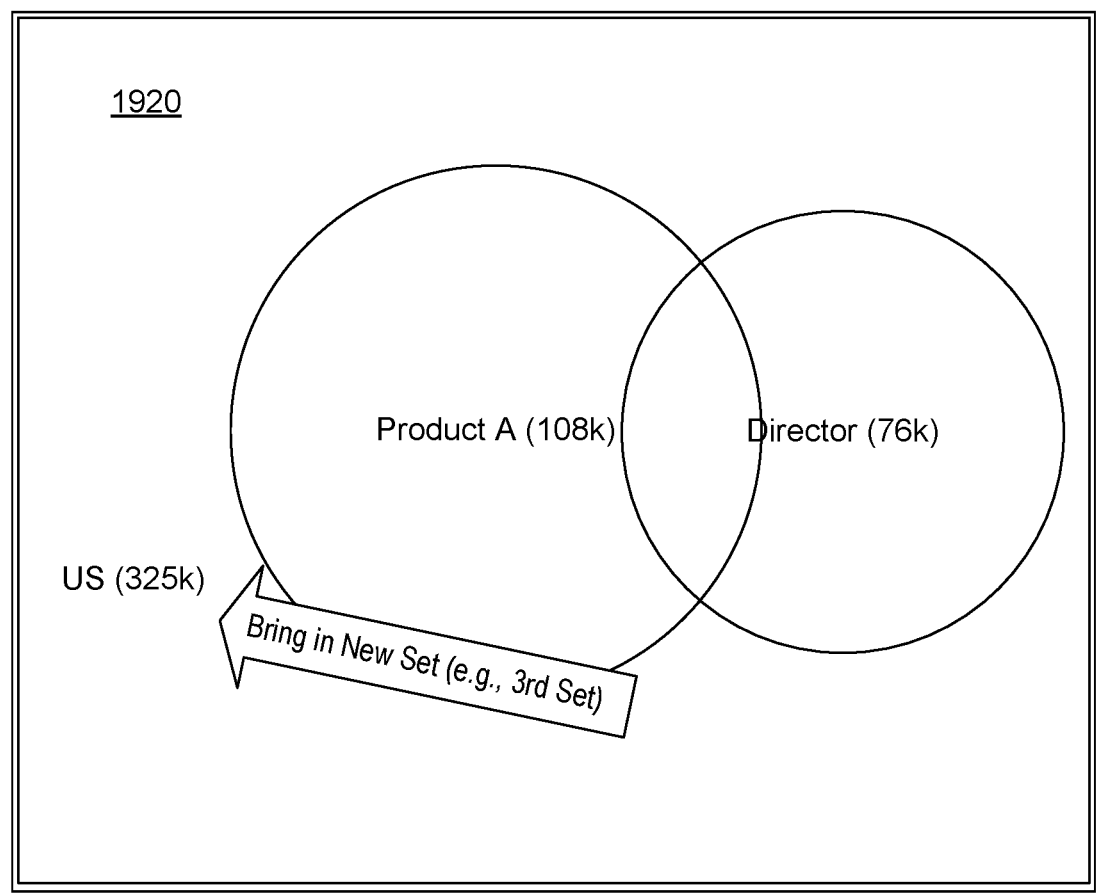
FIG. 19 is a diagram of an example of a graphical user interface.

FIG. 19 shows an example of a GUI 1910 that includes a canvas 1920 with two segments where a third segment is being introduced via dragging and dropping text as a graphical element. As mentioned a segment can be a set; thus, the canvas 1920 can be described as showing two sets that overlap where a third set is being introduced. As an example, the text "US (325 k)" may be generated upon selection of a file that may be in a folder in a storage area of a GUI where the file can be selected and a drag and drop operation performed that causes generation of the text as a movable (drag and droppable) graphical element. In such an example, upon dropping (e.g., release of a button, lift of a stylus, lift of a finger, etc.), an application can perform calculations that determine how circles and/or other graphical elements are to be rendered in a GUI to a display.

Figure 20:
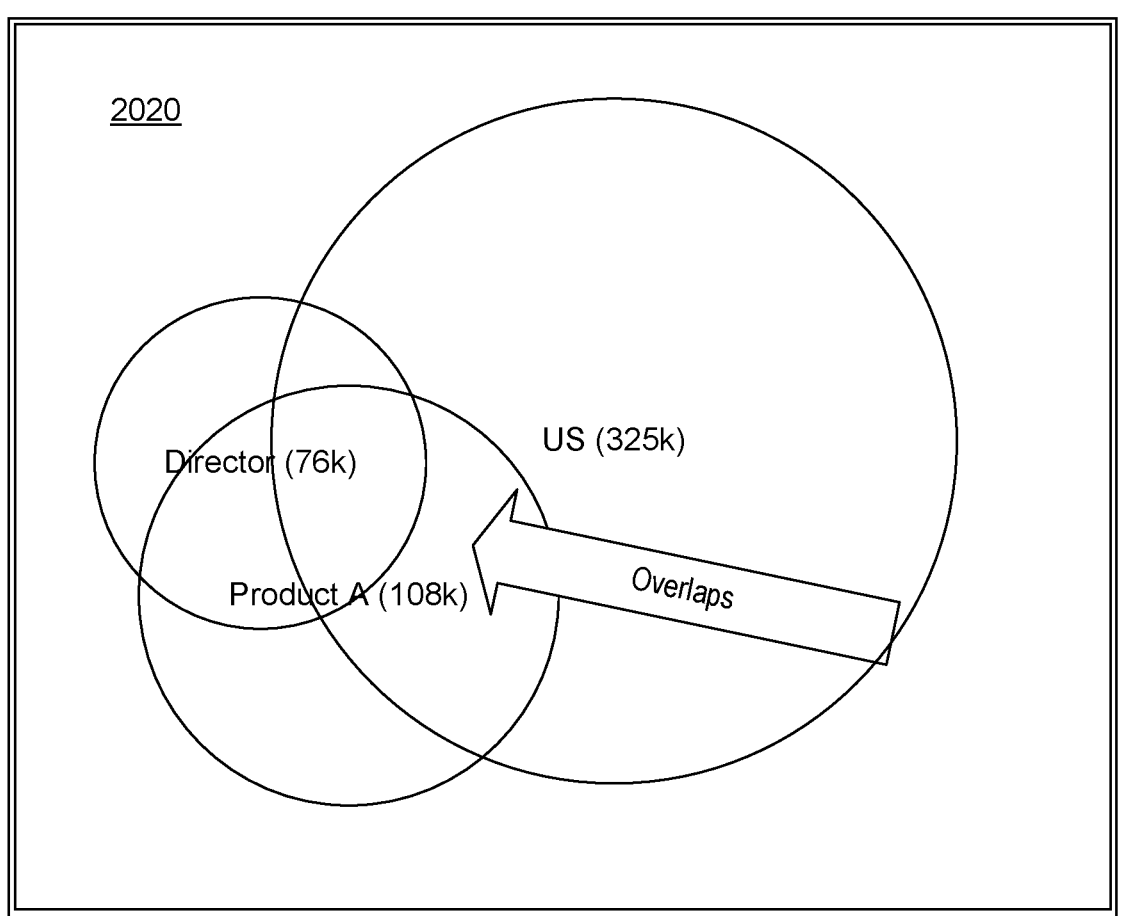
FIG. 20 is a diagram of an example of a graphical user interface.

FIG. 20 shows an example of a GUI 2010 that includes a canvas 2020 where three sets overlap. As an example, an application may operate on two circles or three circles. As an example, an application may allow for operations on a first group of circles (e.g., group of two or three) and then selecting a segment in the first group for further operations with one or more additional circles where the selected segment itself becomes a circle to be logically overlapped, etc. with the one or more additional circles, which may number one or two such that another group of two or three circles is rendered in a GUI to a display.

Figure 21:
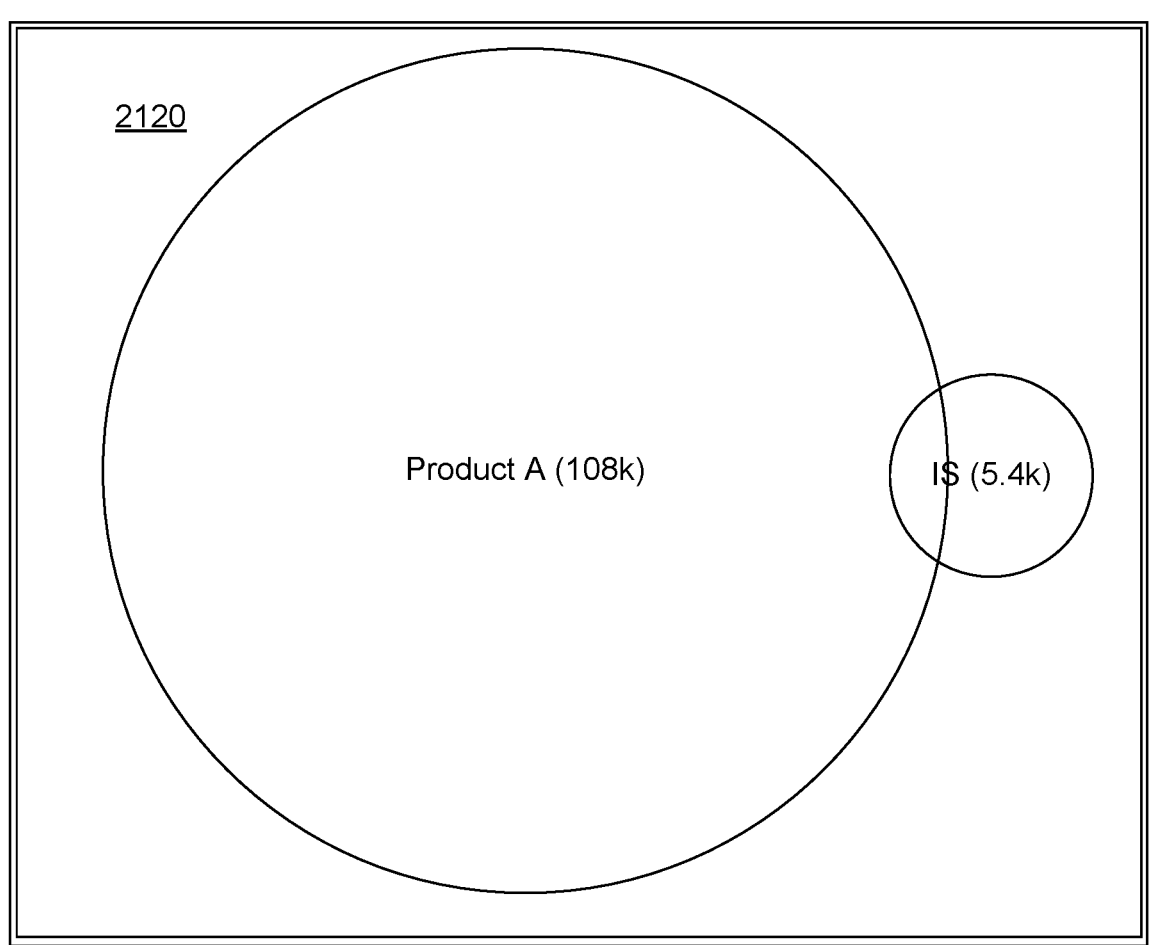
FIG. 21 is a diagram of an example of a graphical user interface.

FIG. 21 shows an example of a GUI 2110 that includes a canvas 2120 where a set Product A includes 108,000 members and where a set IS includes 5,400 members.

Figure 22:
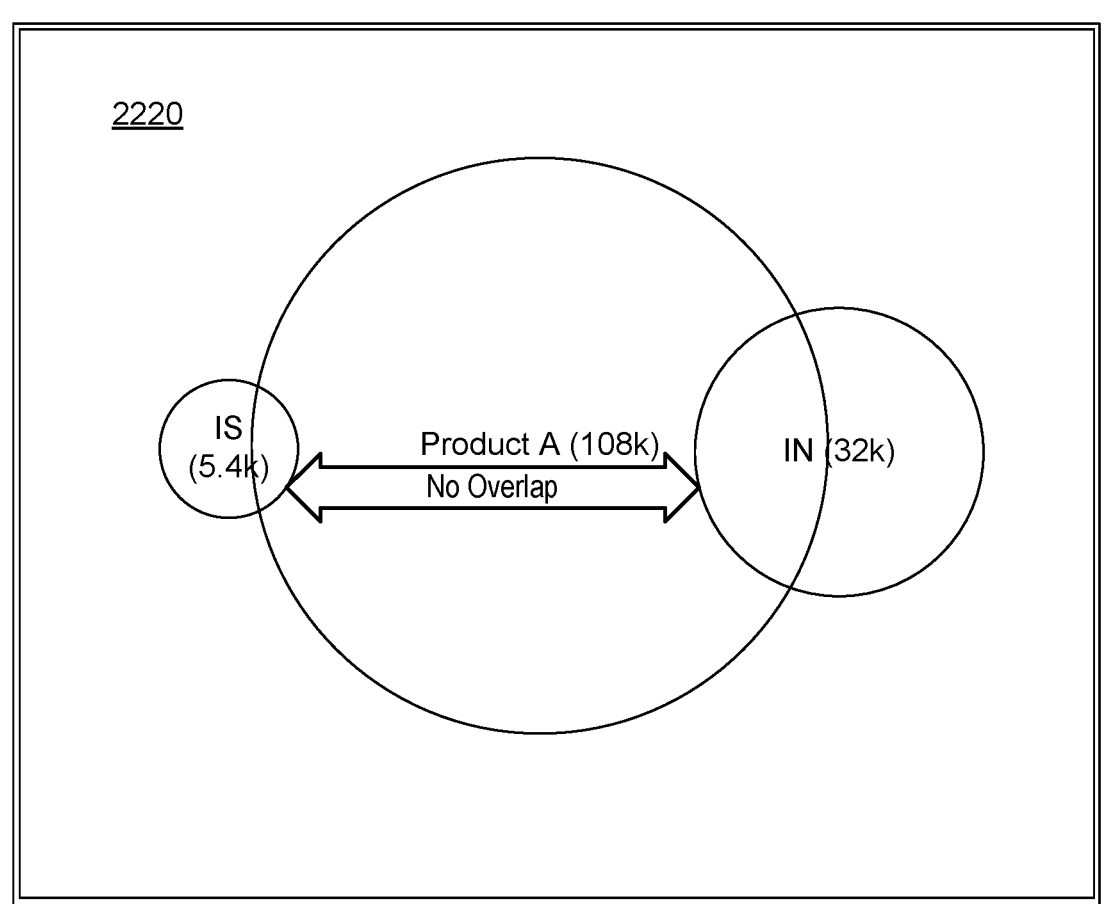
FIG. 22 is a diagram of an example of a graphical user interface.

FIG. 22 shows an example of a GUI 2210 that includes a canvas 2220 where a set Product A, a set IS and a set IN are shown; however, where there is no overlap between the set IS and the set IN.

Figure 23:
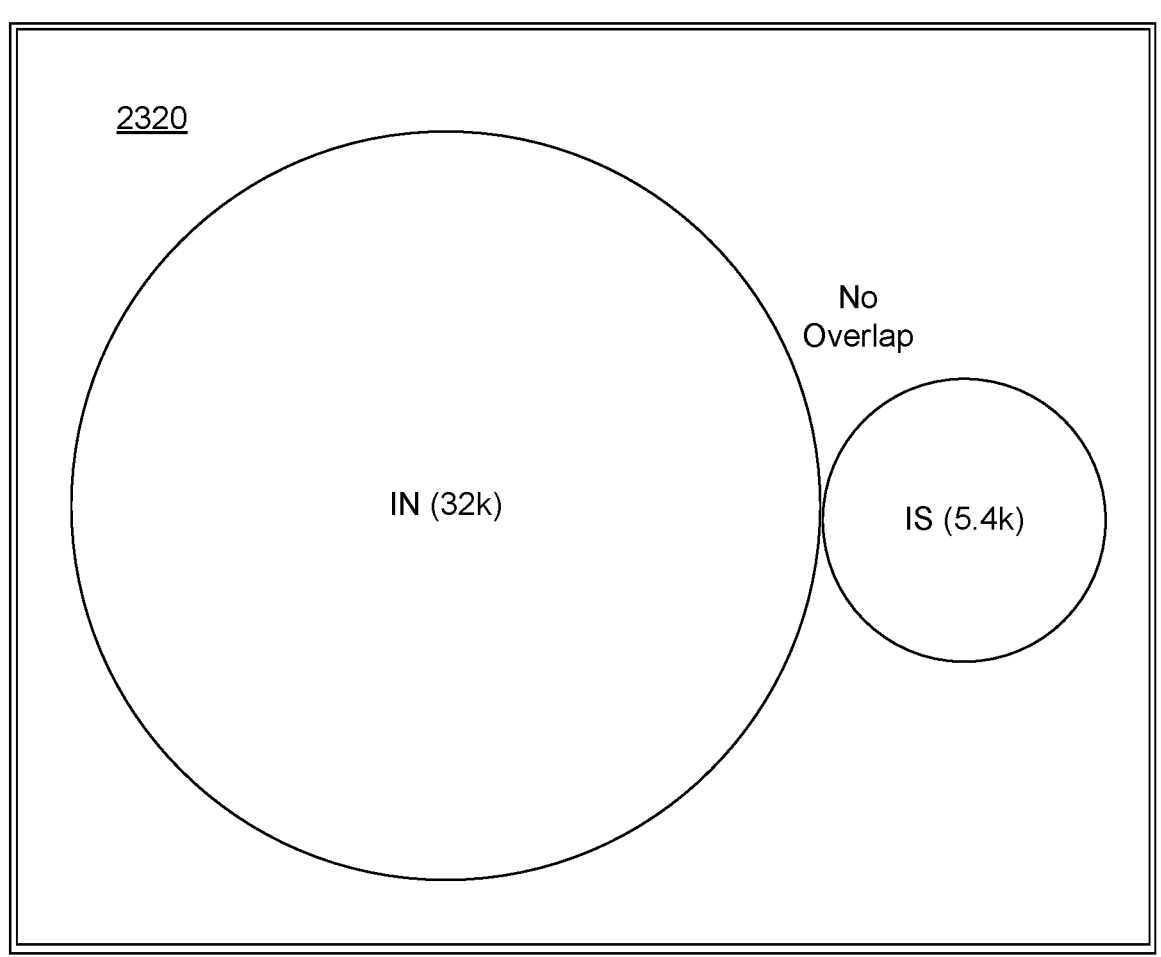
FIG. 23 is a diagram of an example of a graphical user interface.

FIG. 23 shows an example of a GUI 2310 that includes a canvas 2320 where a set IN is shown adjacent to a set IS where overlap does not exist between the two sets (e.g., according to criteria applied to members of the sets).

Figure 24:
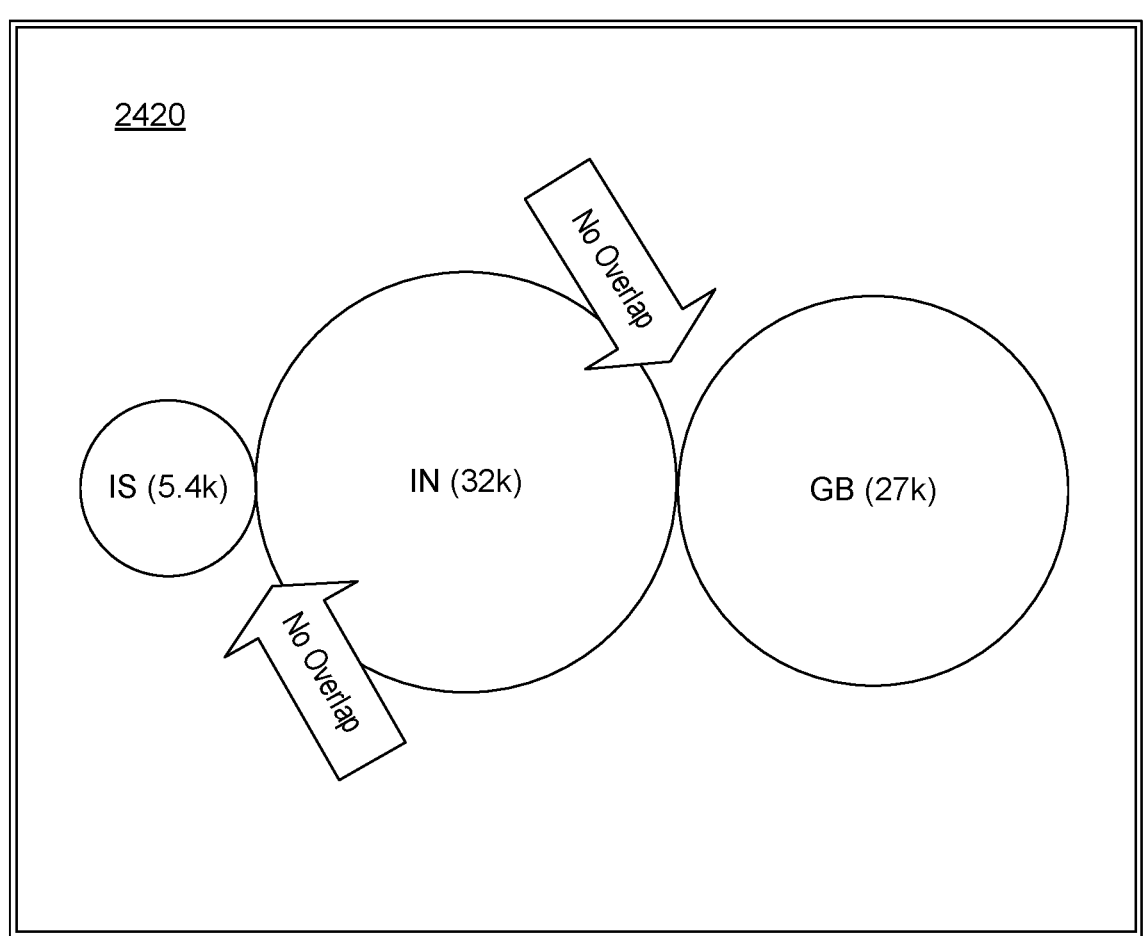
FIG. 24 is a diagram of an example of a graphical user interface.

FIG. 24 shows an example of a GUI 2410 that includes a canvas 2420 where a set IS, a set IN and a set GB are shown where overlap does not exist between the three sets.

Figure 25:
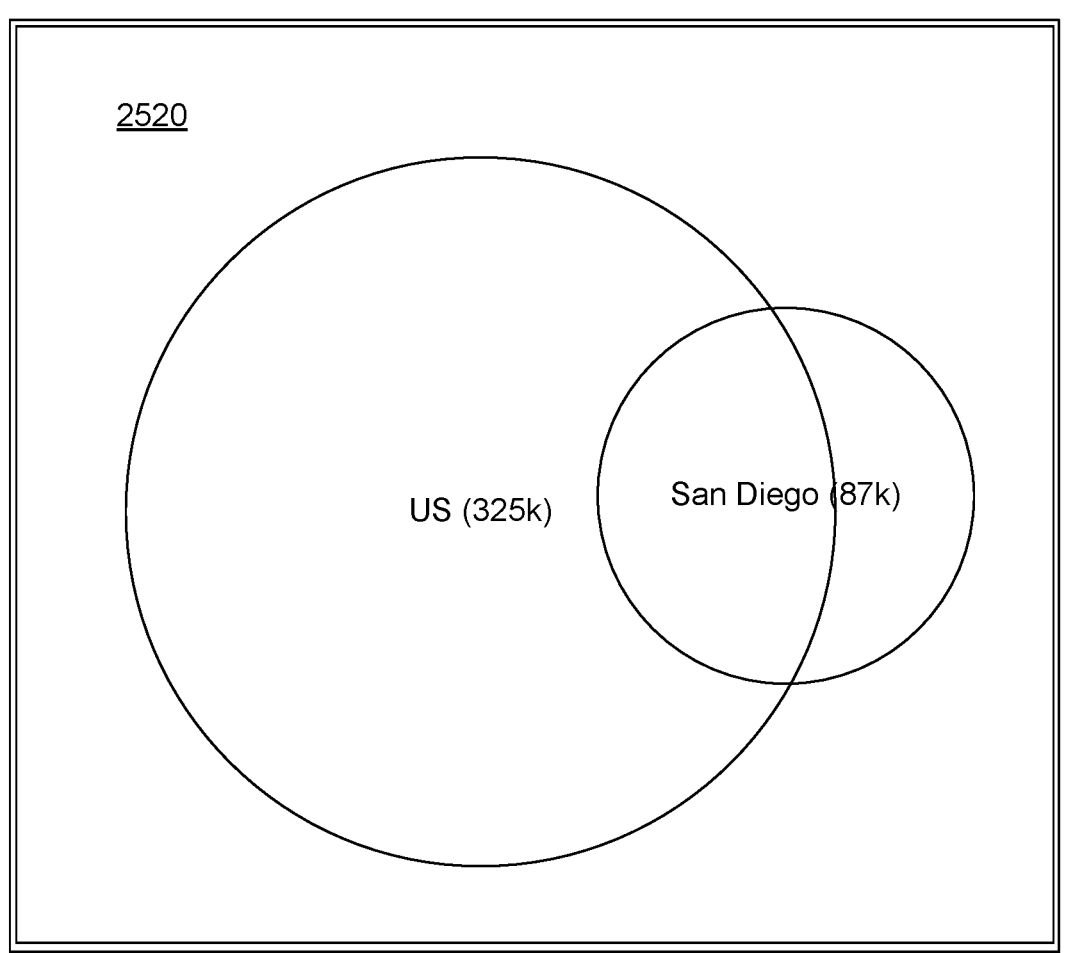
FIG. 25 is a diagram of an example of a graphical user interface.

FIG. 25 shows an example of a GUI 2510 that includes a canvas 2520 where overlap exists between a set US and a set San Diego (e.g., a city in the US).

Figure 26:
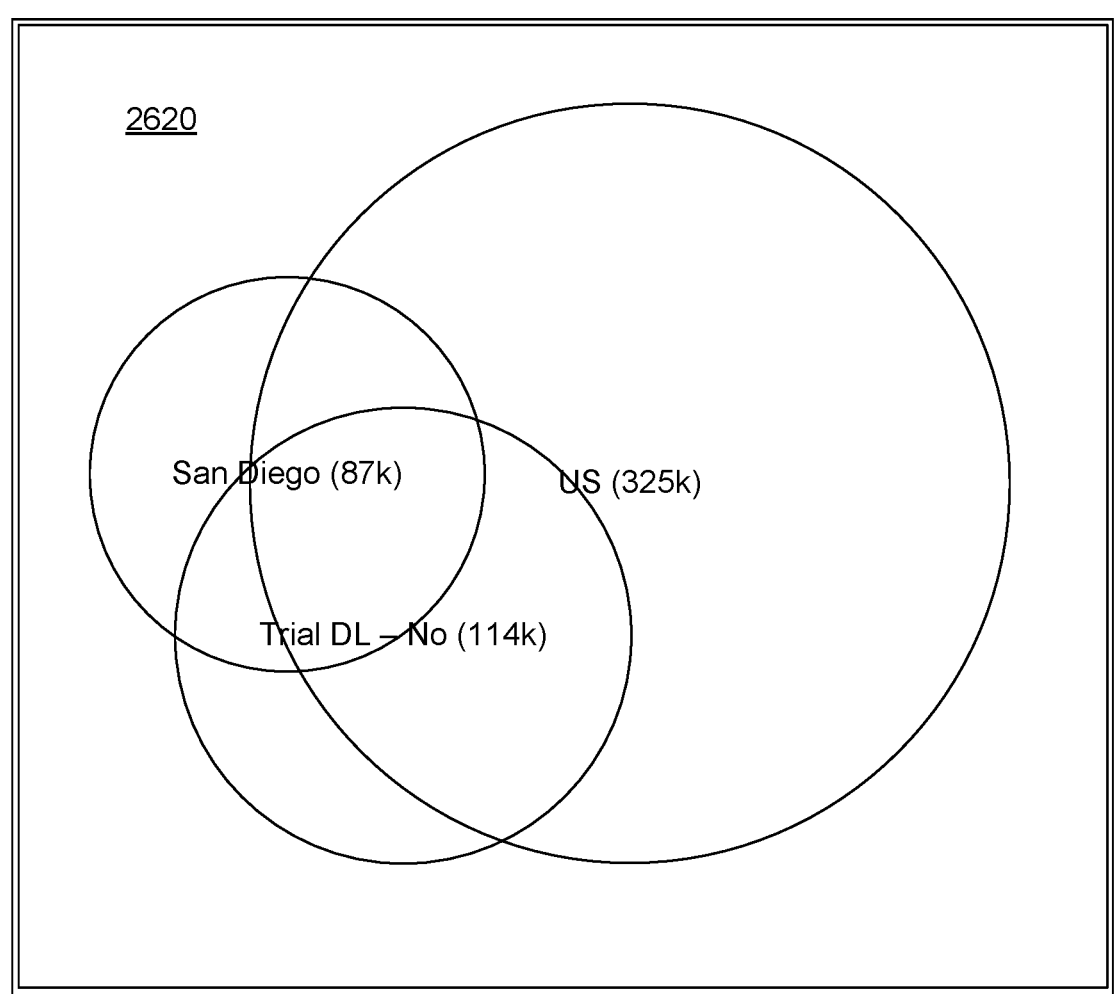
FIG. 26 is a diagram of an example of a graphical user interface.

FIG. 26 shows an example of a GUI 2610 that includes a canvas 2620 that includes a set US, a set San Diego and a set Trial DL-No. As shown, overlap exists between the sets.

Figure 27:
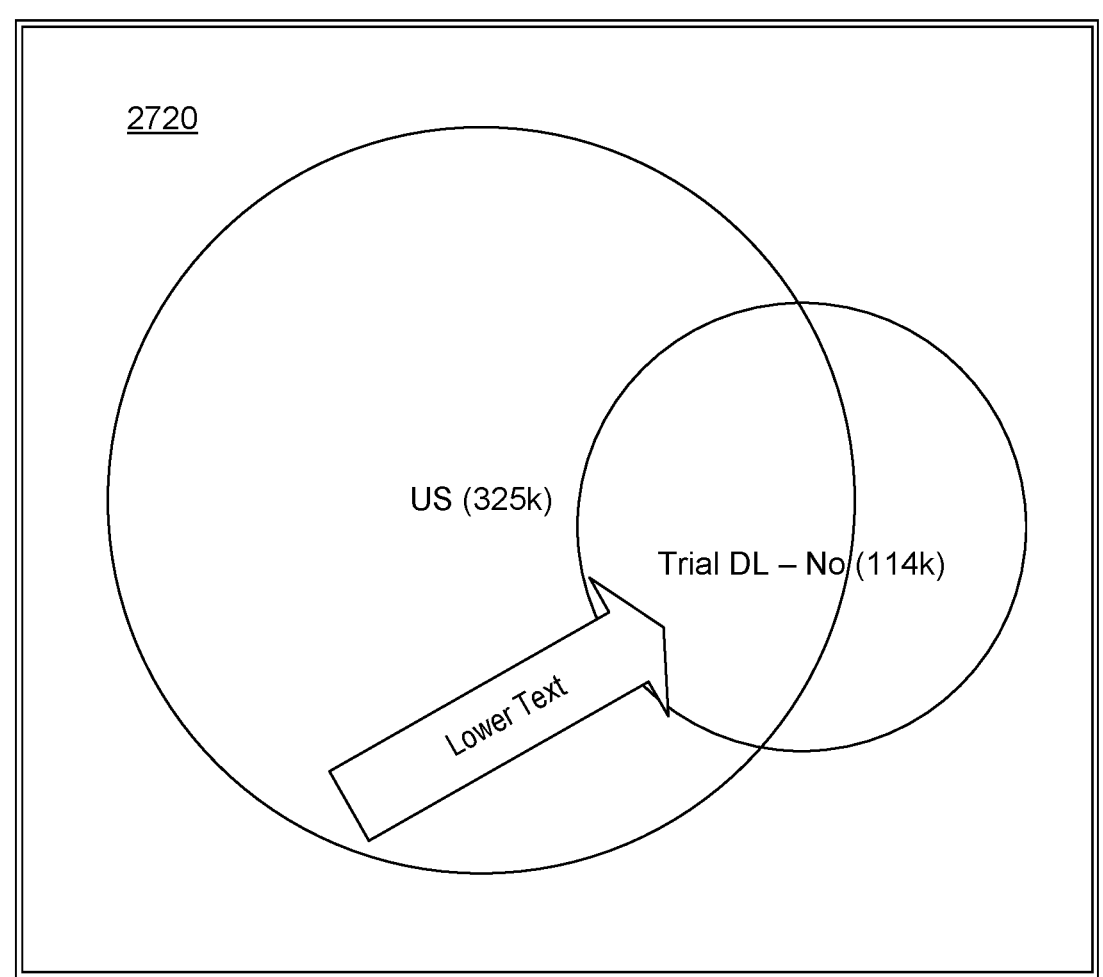
FIG. 27 is a diagram of an example of a graphical user interface.

FIG. 27 shows an example of a GUI 2710 that includes a canvas 2720 where a set US include label text and a set Trial DL-No includes label text that can be adjusted, for example, to be adjusted by lowering it with respect to existing text such as the text "US (325 k)" of the US set.

Figure 28:
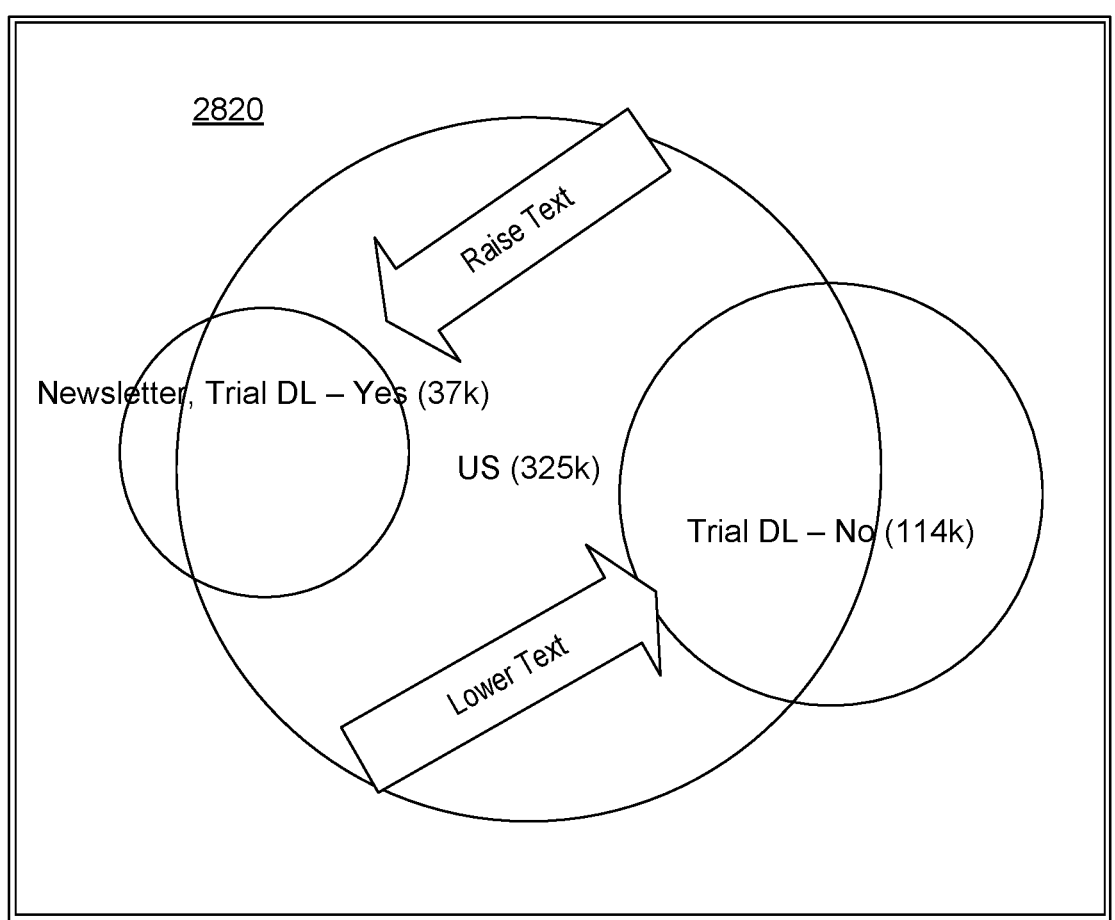
FIG. 28 is a diagram of an example of a graphical user interface.

FIG. 28 shows an example of a GUI 2810 that includes a canvas 2820 where label text can be adjusted, for example, to be adjusted by raising it with respect to other label text. Such a method can enhance legibility of text that can be or include label text. For example, a method can include automatically adjusting label text of one set with respect to label text of another set (e.g., by raising, lowering, etc.).

Figure 29:
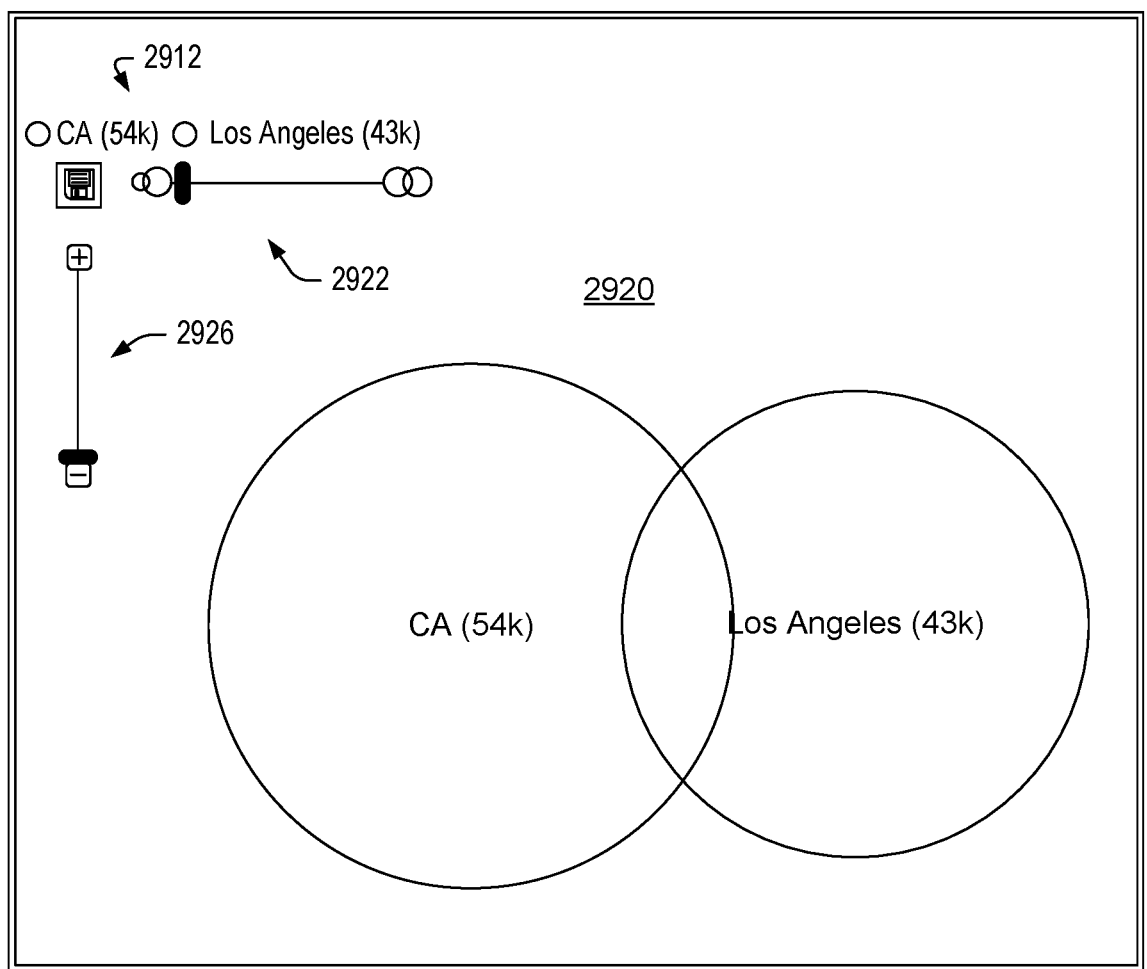
FIG. 29 is a diagram of an example of a graphical user interface.

FIG. 29 shows an example of a GUI 2910 that includes information 2912, a canvas 2920, a scale control 2922 and a zoom control 2926. The canvas 2920 includes circles that represent a segment CA and a segment Los Angeles (e.g., a city in the state of California).

Figure 30:
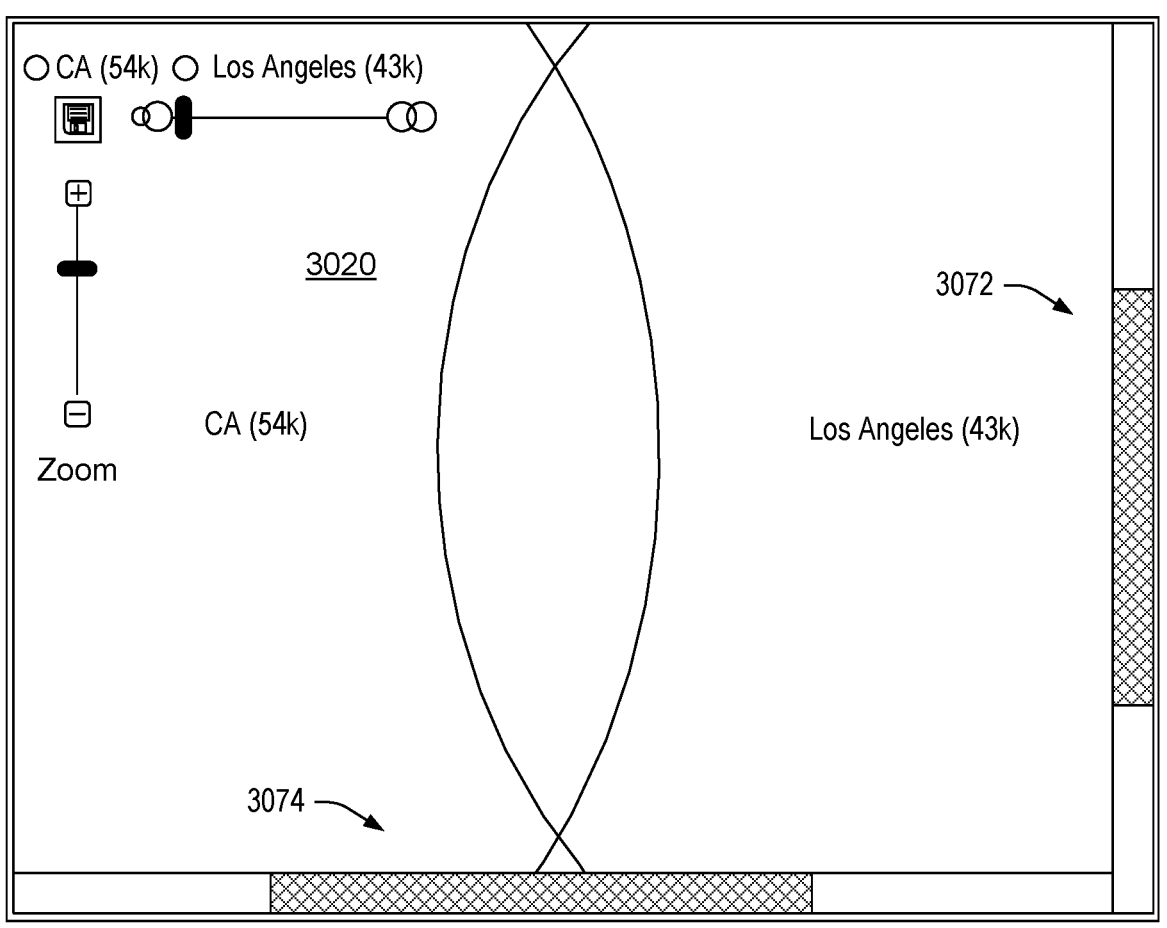
FIG. 30 is a diagram of an example of a graphical user interface.

FIG. 30 shows an example of a GUI 3010 that includes information 3012, a canvas 3020, a scale control 3022 and a zoom control 3026. The canvas 3020 is zoomed per the zoom control 3026. In such an example, one or more scrollbars 3072 and 3074 can be rendered to the GUI 3010.

Figure 31:
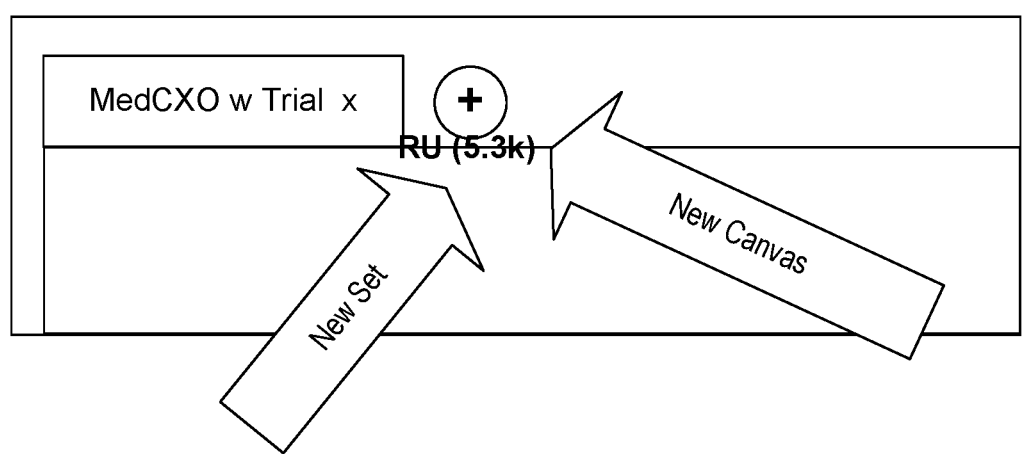
FIG. 31 is a diagram of an example of a graphical user interface.

FIG. 31 shows an example of a GUI 3110 that includes a graphical control that can be actuated to add a new canvas (e.g., a new set in a new canvas). For example, consider a method that includes selecting a file in a storage area by clicking on a graphical element that represents the file where the file has a file name "RU" and then performing a drag operation such that a text graphical element is generated that can be positioned on top of the graphical control to add a new canvas. For example, an application can track cursor position and when that cursor position is within an specified area that corresponds to the graphical control, the application can generate a new canvas that can be rendered to a GUI on a display.

Figure 32:
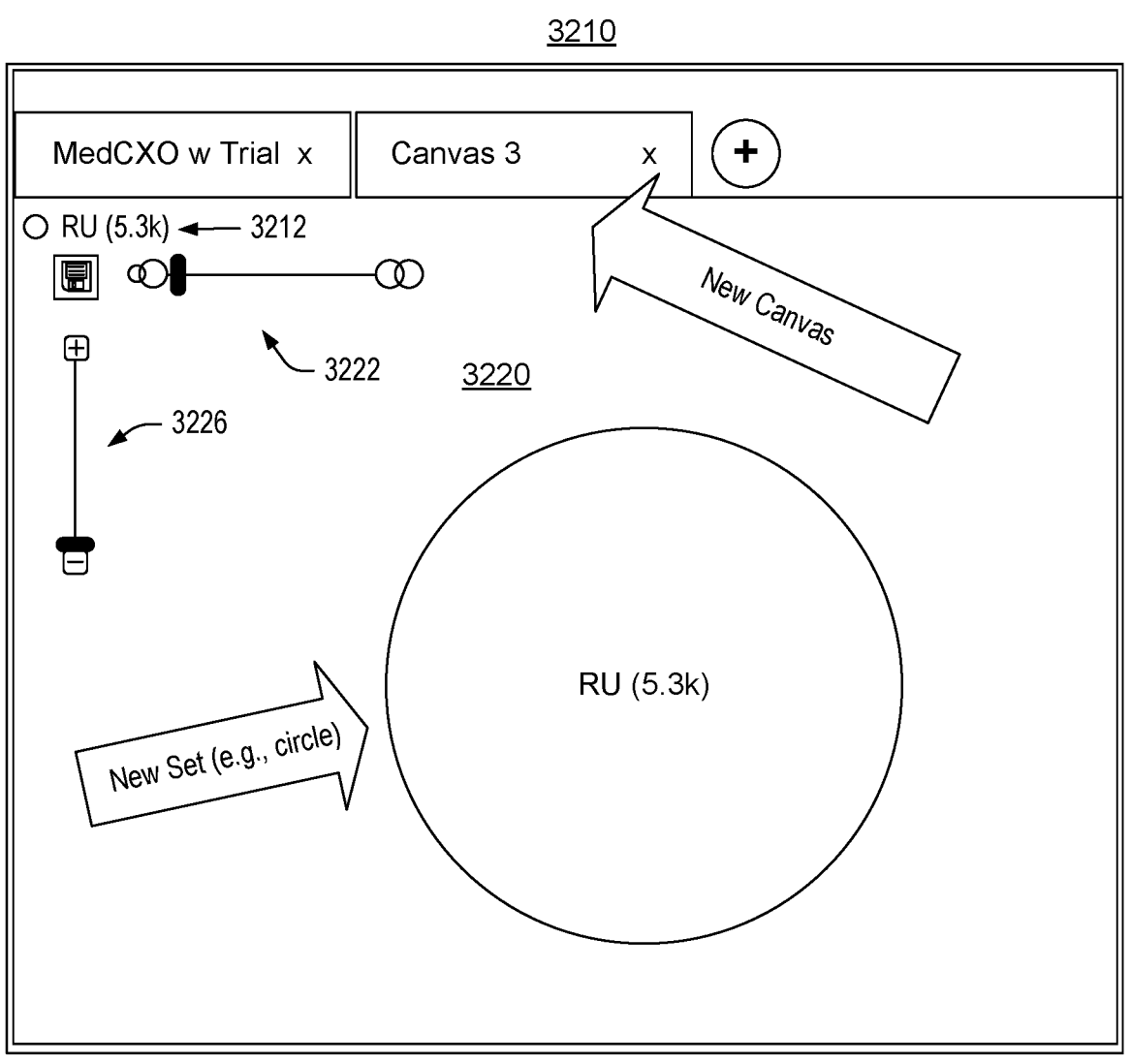
FIG. 32 is a diagram of an example of a graphical user interface.

FIG. 32 shows an example of a GUI 3210 that includes information 3212, a canvas 3220, a scale control 3222 and a zoom control 3226. The canvas 3220 includes a new circle that corresponds to a new canvas (see, e.g., tab generated via actuation of the graphical control to add a new segment). The GUI 3210 may be generated by an application responsive to a drag and drop action as described with respect to the example of FIG. 31.

Figure 33:
FIG. 33 is a diagram of an example of a graphical user interface.
Figure 33:
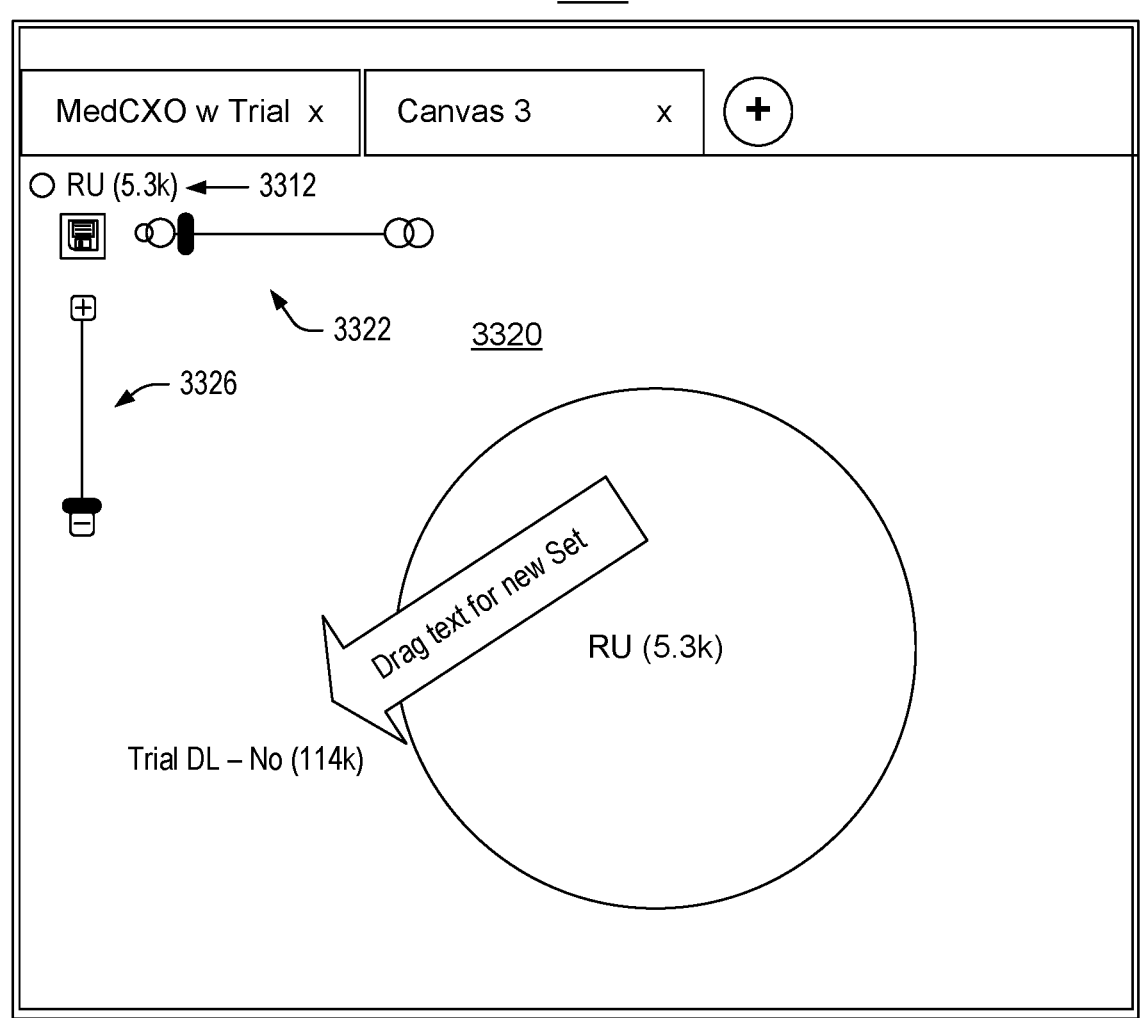

FIG. 33 shows an example of a GUI 3310 that includes information 3312, a canvas 3320, a scale control 3322 and a zoom control 3326. In the example of FIG. 33, the canvas 3320 includes a circle that represents a set RU where text can be selected and moved onto the canvas 3320 to generate another circle that represents a set Trial DL-No.

Figure 34:
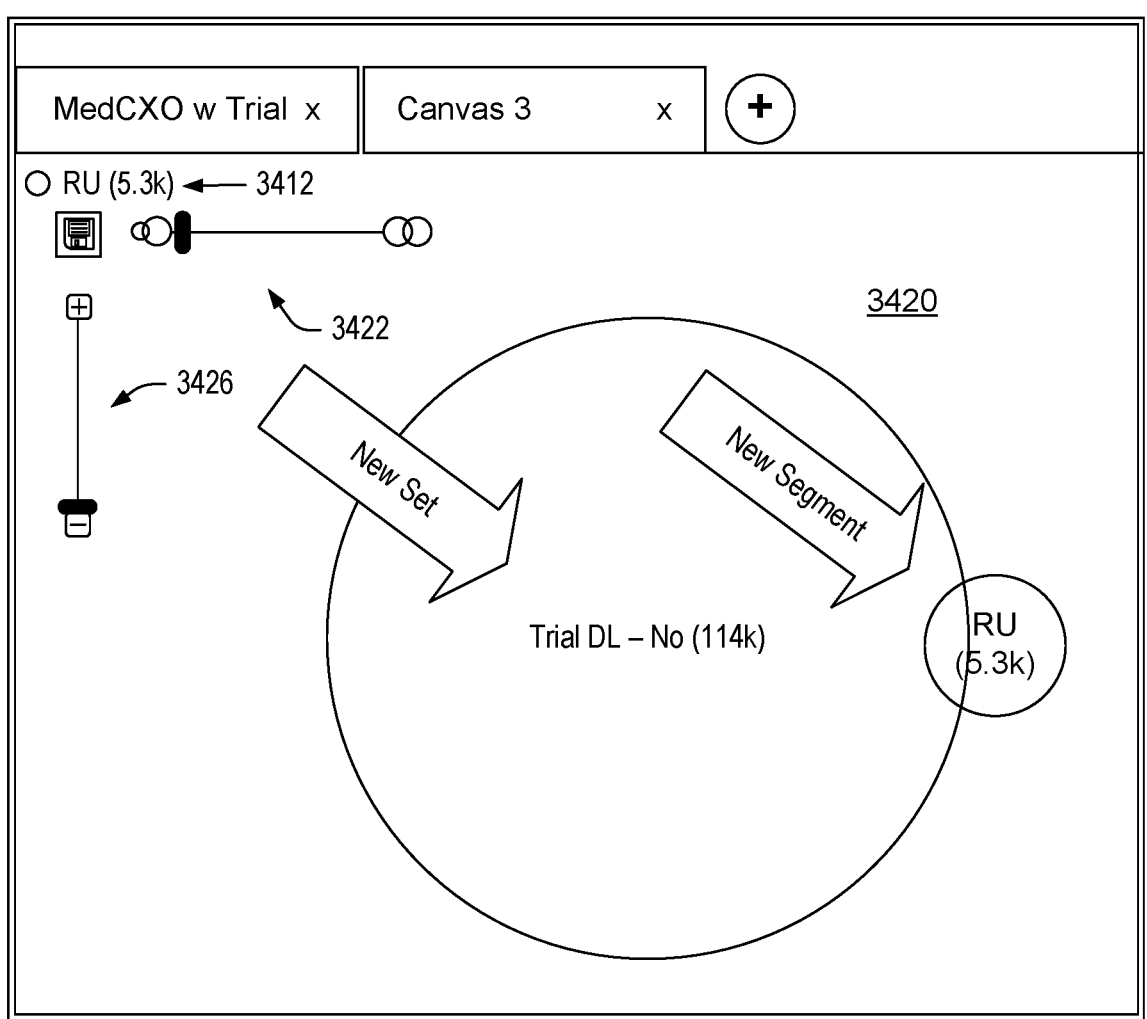
FIG. 34 is a diagram of an example of a graphical user interface.

FIG. 34 shows an example of a GUI 3410 that includes information 3412, a canvas 3420, a scale control 3422 and a zoom control 3426. In the example of FIG. 34, a new segment (e.g., a new set) is represented as a circle in the canvas 3420, for example, via a drag action such as that illustrated in the example of FIG. 33. In the example of FIG. 34, three selectable segments exist for the circles given the overlap therebetween.

Figure 35:
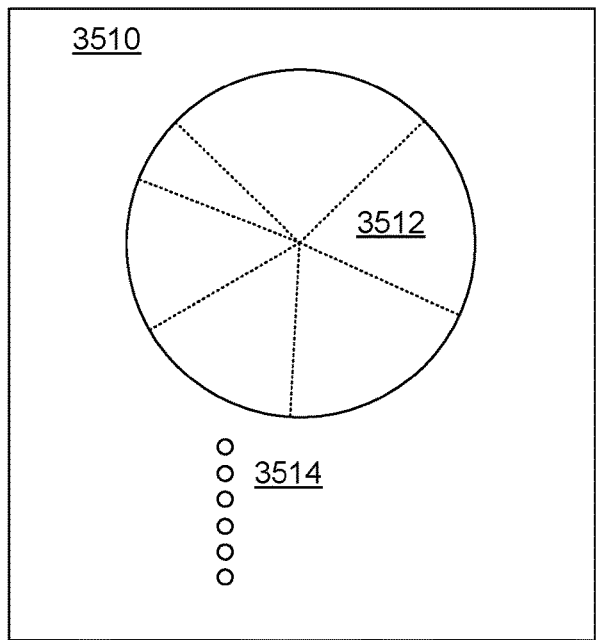
FIG. 35 is a diagram of an example of a graphical user interface.
Figure 35:
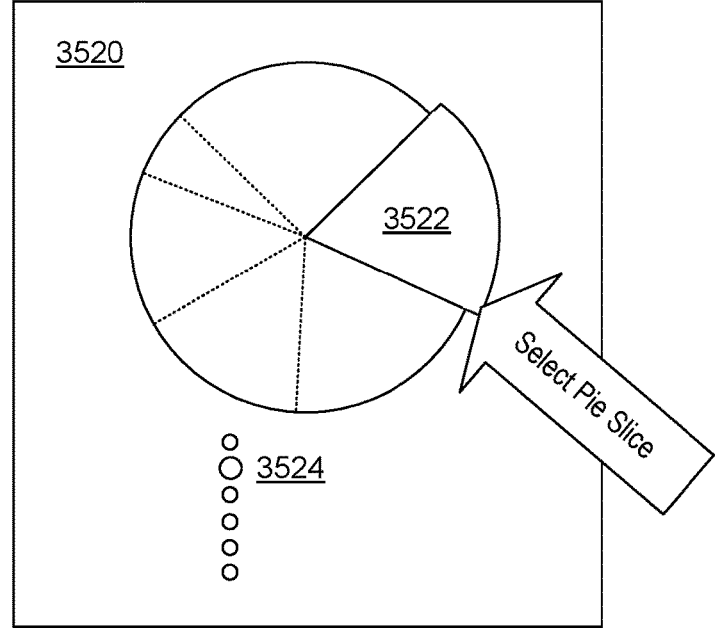

FIG. 35 shows an example of selecting a segment of a set, which can correspond to one or more criteria. For example, consider an example where a criteria area of a workspace includes various contact-based criteria such as, for example, one or more of opt-in, subscription, email, etc. As an example, as to email, criteria can include corporate and generic. As an example, a pie chart graphic can be generated for a dataset that includes a set as to corporate email and generic email, for example, based on domain name, etc.

As an example, where a pie chart graphic exists in a criteria area of a workspace, the pie chart graphic may be selected and moved (e.g., dragged and dropped) to a canvas of the workspace (e.g., a canvas area). In such an example, a window can be generated where the window includes an enlarged pie chart with, for example, individual criterion corresponding to pieces (e.g., slices) of the enlarged pie. For example, where two criteria exist, a pie chart can appear with two slices where each slice can represent a number of members of a dataset that meet a corresponding criterion. For example, where 50% of members meet one criterion and 50% of members met another criterion, where the criteria are exclusive, the pie chart can appear in two colors and evenly divide by two slices of equal size. In such an example, a slice of the piece chart may be selected and moved (e.g., dragged and dropped) onto a canvas such that a circle is generated and rendered in the canvas where the circle represents the number of members in that slice of the pie chart.

In the foregoing example, while a pie chart is mentioned, as an example, a GUI may include a bar chart and/or one or more other types of graphical representations of information that may be segregated into groups (e.g., sets, segments, etc.).

As an example, a method can allow for adding criteria values to a canvas. For example, a pie chart graphical icon or a bar chart graphical icon can be selected where a corresponding structure is generated in a window as rendered to a display such that a user can see a pie chart or a bar chart of various values for corresponding criteria. As an example, a filter may cut-off values that are small, for example, below about 10 percent, below about 5 percent, below about 1 percent of a total number of members value. In such an example, a user may select one or more elements of a chart and drag those one or more elements onto the canvas, which, in turn, can cause generation and rendering of one or more corresponding circles.

Referring again to FIG. 35, an example pie chart graphic 3510 is shown with a slice 3512 and a corresponding graphical moniker 3514. As an example, upon selection of the slice 3512, a computer or computing system can include receiving an instruction to render a revised or updated pie chart graphic 3520 where, for example, the slice 3512 is enlarged as an enlarged slice 3522 and where the moniker 3514 is enlarged as an enlarged moniker 3524. In such an example, a user may visually be aware of a set and corresponding criterion selected. As an example, the graphical monikers 3514 and 3524 can include text labels, for example, to indicate a type or name of a criterion.

Figure 36:
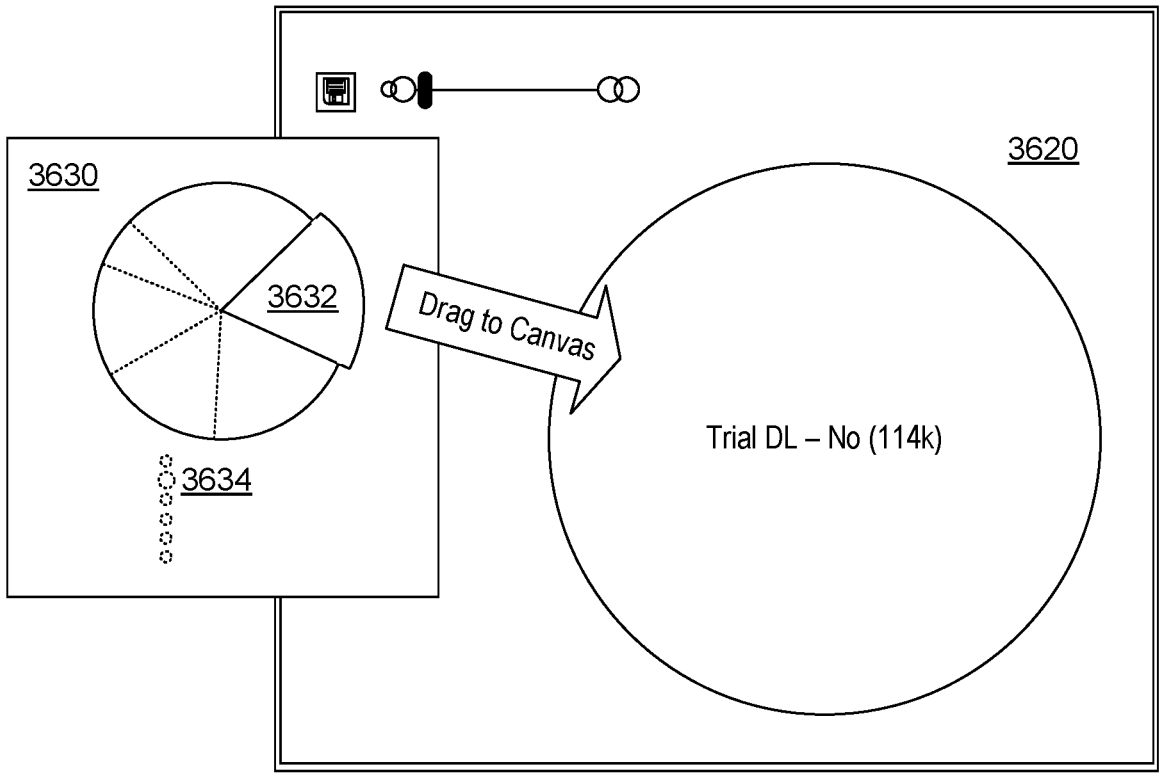
FIG. 36 is a diagram of an example of a graphical user interface.

FIG. 36 shows an example of a canvas 3620 and an example of a window 3630 where a slice 3632 of a pie chart is selected as may also be indicated by a graphical moniker 3634. In such an example, the slice 3632 can be moved onto the canvas 3620 such that a circle is generated that corresponds to member of a dataset that meet a criterion represented by the slice 3632.

Figure 37:
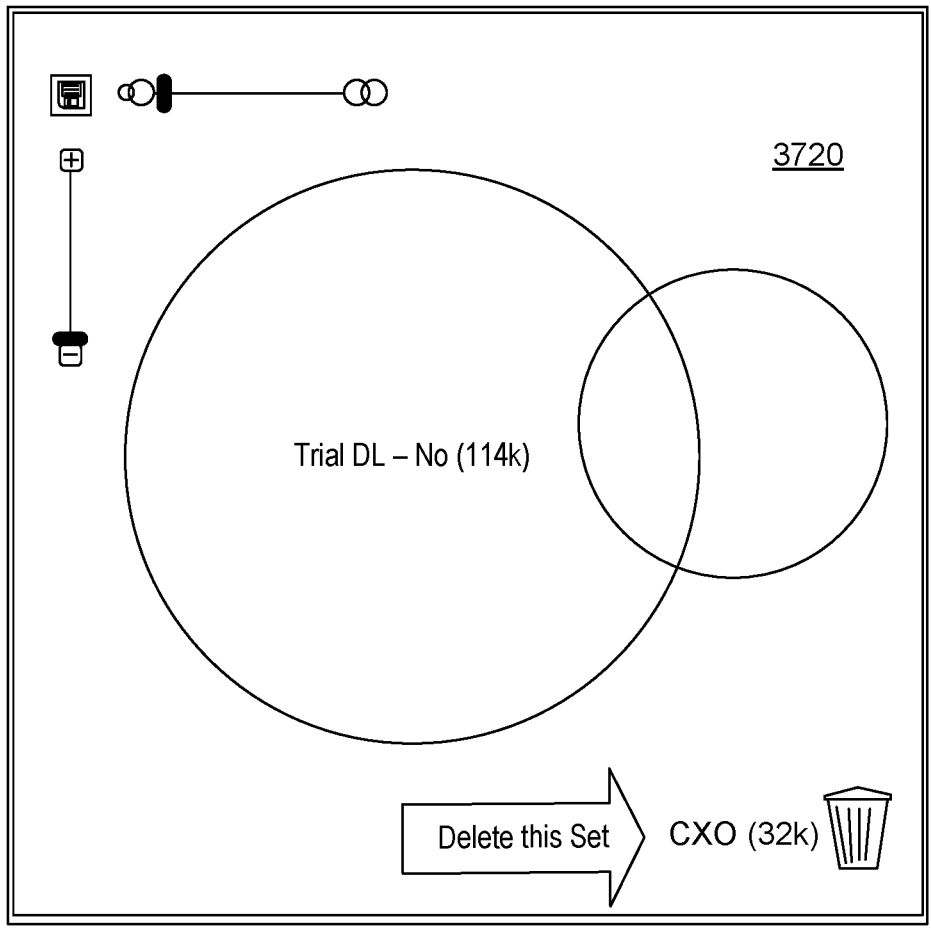
FIG. 37 is a diagram of an example of a graphical user interface.

FIG. 37 shows an example of a canvas 3720 where a deletion operation may be performed to delete a set (e.g., delete this circle CXO (32 k)). For example, a trashcan icon may be rendered as part of a GUI to a display where a graphical element that represents a set may be dragged and dropped to a position of the trashcan icon to cause an application to delete or stage a set for deletion from a canvas. As an example, a method can include dragging and dropping a circle to a trashcan icon to delete the circle from a canvas. In such an example, the circle may "disappear" and be transformed to a text graphical element that can be dragged and dropped onto a trashcan icon or other graphical element associated with a delete action.

Figure 38:
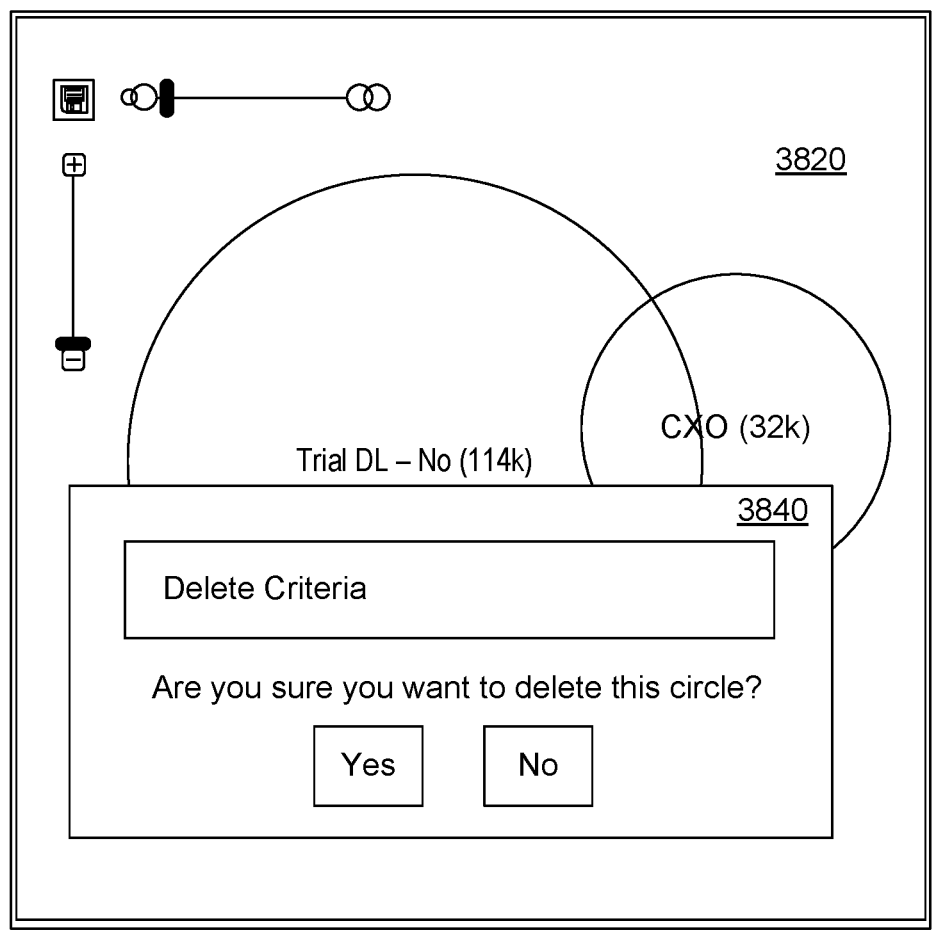
FIG. 38 is a diagram of an example of a graphical user interface.

FIG. 38 shows an example of a canvas 3820 where a pop-up window 3840 is rendered that includes information and graphical controls, for example, to delete one or more criteria (e.g., delete a circle, etc.).

Figure 39:
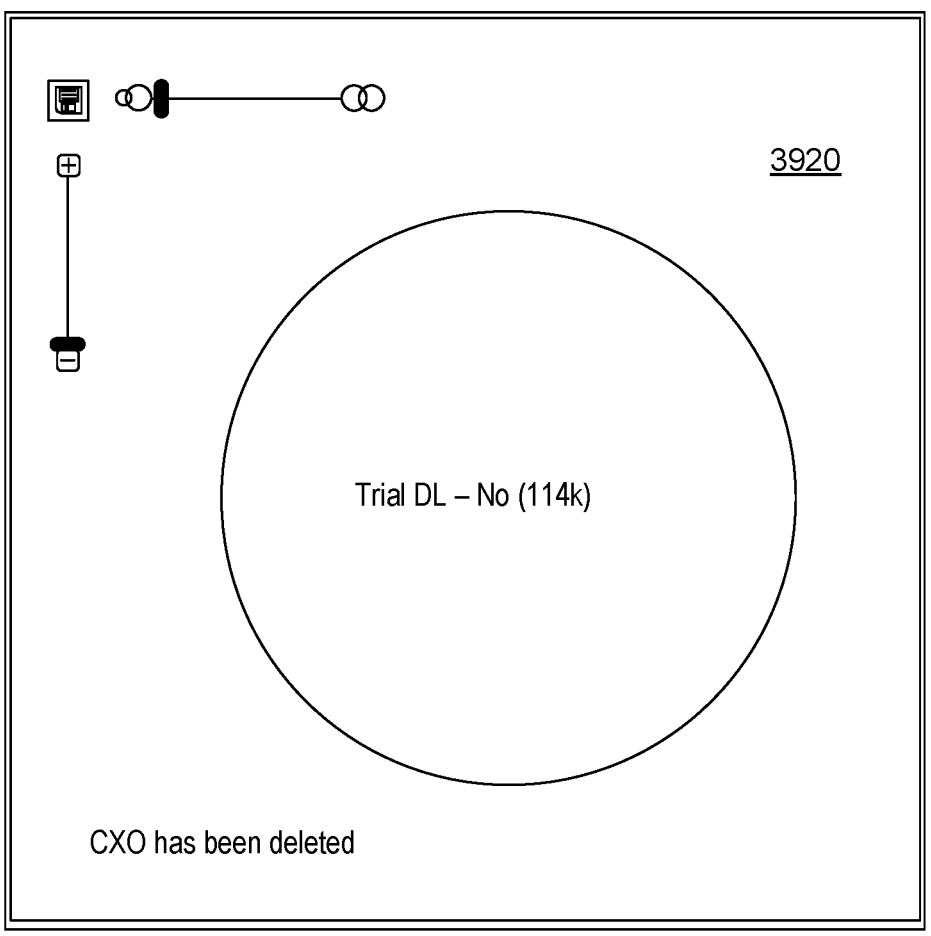
FIG. 39 is a diagram of an example of a graphical user interface.

FIG. 39 shows an example of a canvas 3920 that includes a circle that represents a set, labeled Trial DL-No with 114,000 members. In the example of FIG. 39, text is rendered that indicates (e.g., confirms) that a set has been deleted.

As mentioned, a workspace can provide for outputting information. For example, consider an export drop zone as being an area of a workspace of a graphical user interface. In such an example, this type of export area can provide an ability to export a segment selected on a canvas. As an example, an export drop zone can include various options, which may correspond to one or more external systems, applications, etc. (e.g., ELOQUA® application, one or more CRM systems, EXCEL® application, etc.).

Figure 40:
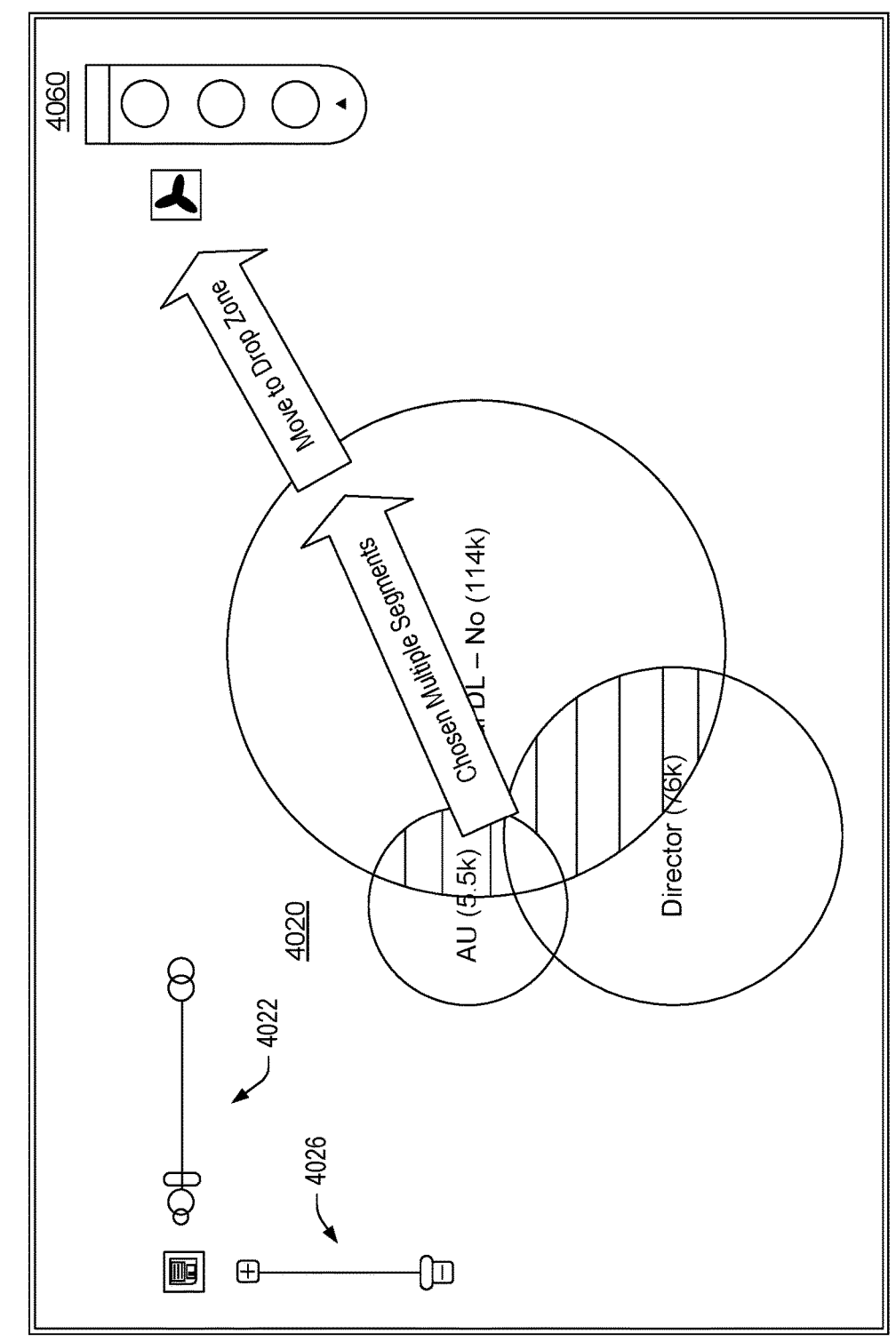
FIG. 40 is a diagram of an example of a graphical user interface.

FIG. 40 shows an example of a GUI 4010 that includes a canvas 4020, a scale control 4022, a zoom control 4026 and a drop zone control 4060. As an example, the drop zone control 4060 can be selectable to drop down. For example, the three icons of the drop zone control 4060 may "roll-up" and "roll-down" upon selection of a base portion of the drop zone control 4060 (e.g., a head portion). In such an example, the drop zone control 4060 minimizes its area in the GUI 4010. Such an approach can be in accord with principles such as LEAN where just the right of amount of information is rendered to a GUI so as to allow for interactions of tasks of a workflow without distracting from those tasks. In such an example, when a workflow calls for exporting information, the drop zone control 4060 can be selected to roll-down the various options for export (e.g., one or more options).

As shown in the example of FIG. 40, a user can select a segment or multiple segments for dragging and dropping onto one of the export options of the drop zone control 4060. As mentioned, such an approach may automatically trigger formatting of information (e.g., as to file format, etc.) so as to be compatible with a CRM system, etc.

Figure 41:
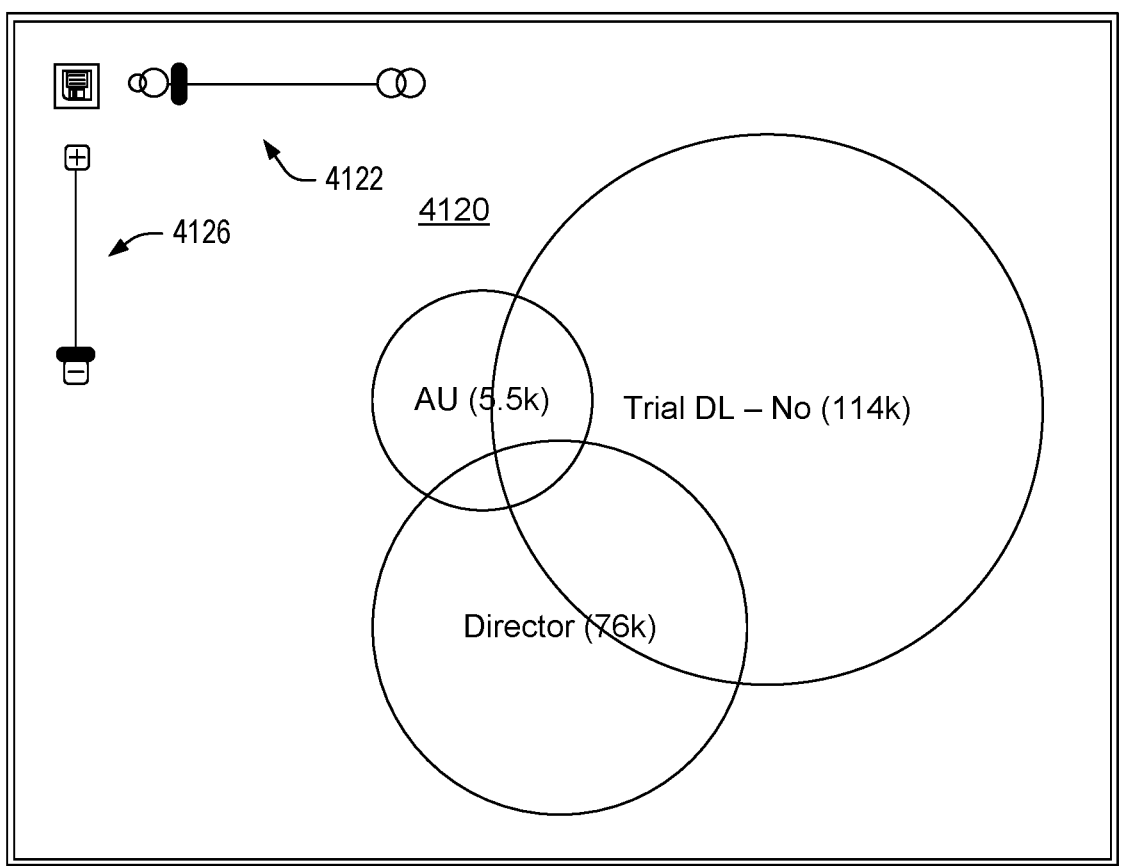
FIG. 41 is a diagram of an example of a graphical user interface.

FIG. 41 shows an example of a GUI 4110 that includes a canvas, a scale control 4122 and a zoom control 4126. In the example of FIG. 41, three circles are shown, with sets AU, Director and Trial DL-No.

Figure 42:
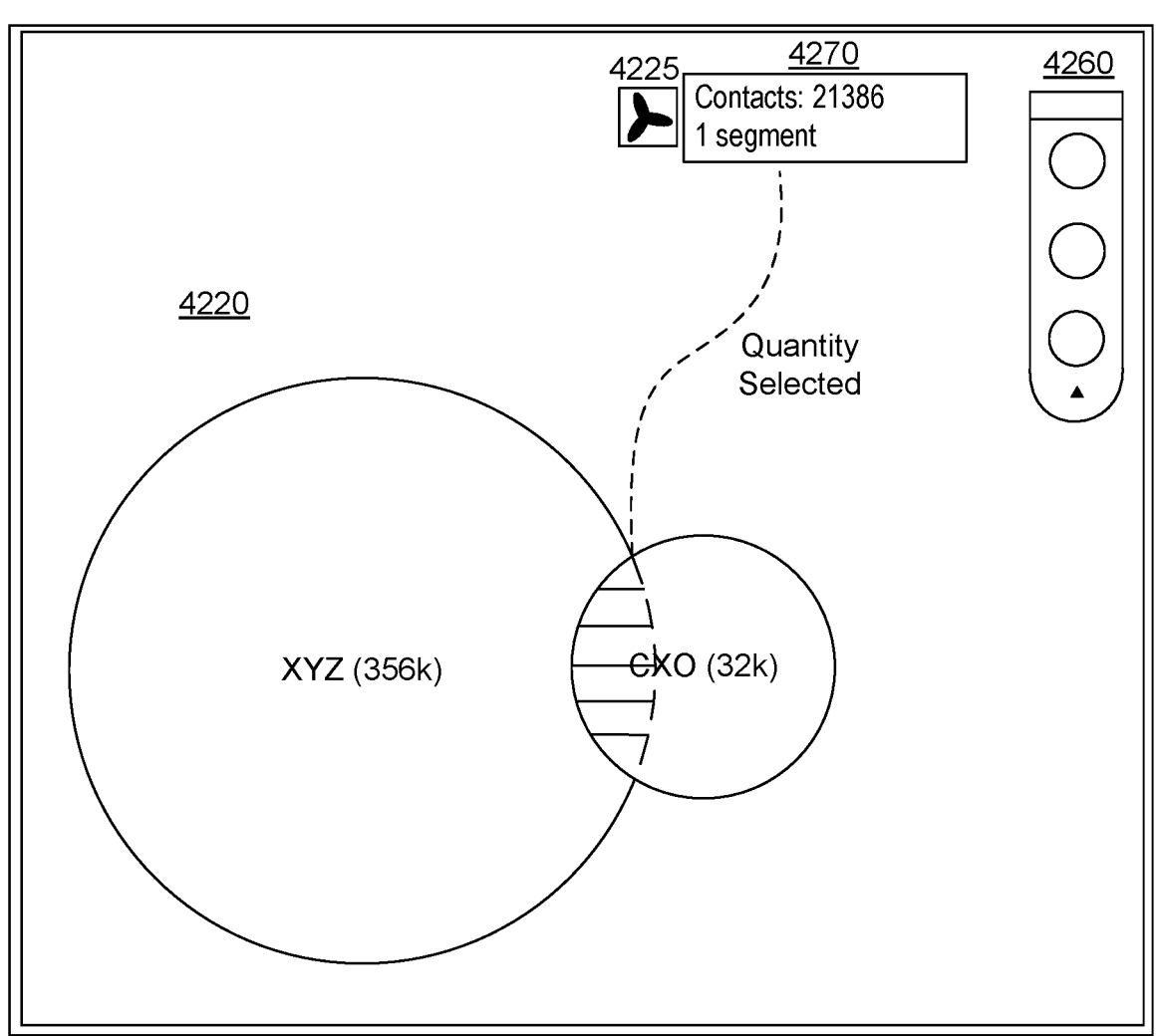
FIG. 42 is a diagram of an example of a graphical user interface.

FIG. 42 shows an example of a GUI 4210 that includes a canvas 4220 and a drop zone control 4260. In the example of FIG. 42, a field 4270 is shown that includes information as to a selected segment that is defined by an intersection of two circles. For example, where one circles includes 356,000 members and another circle includes 32,000 members and where 21,386 members are common to both circles (e.g., sets or segments), the field 4270 can display such information as being associated with a single segment (e.g., the intersection) and a graphical icon 4225 (e.g., graphical element) can be movable, for example, to drag and drop that single segment. For example, the graphical icon 4225 can be movable to the drop zone control 4260 (e.g., to export information as to the 21,386 members of the single segment). In the example of FIG. 42, the circles XYZ and CXO are scaled as the circle XYZ is not about ten times the area of the circle CXO. Where scaling is not applied, the size of an overlap can correspond to a number of members that are in the overlapping section (e.g., overlap segment). For example, where scaling is not applied, the size of one circle and the size of another circle depend directly on number of members and overlap therebetween forms an area that corresponds to the number of members therein. Where scaling is applied, there can be a ratio that can be utilized to determine how many members may be in the overlapped area.

Figure 43:
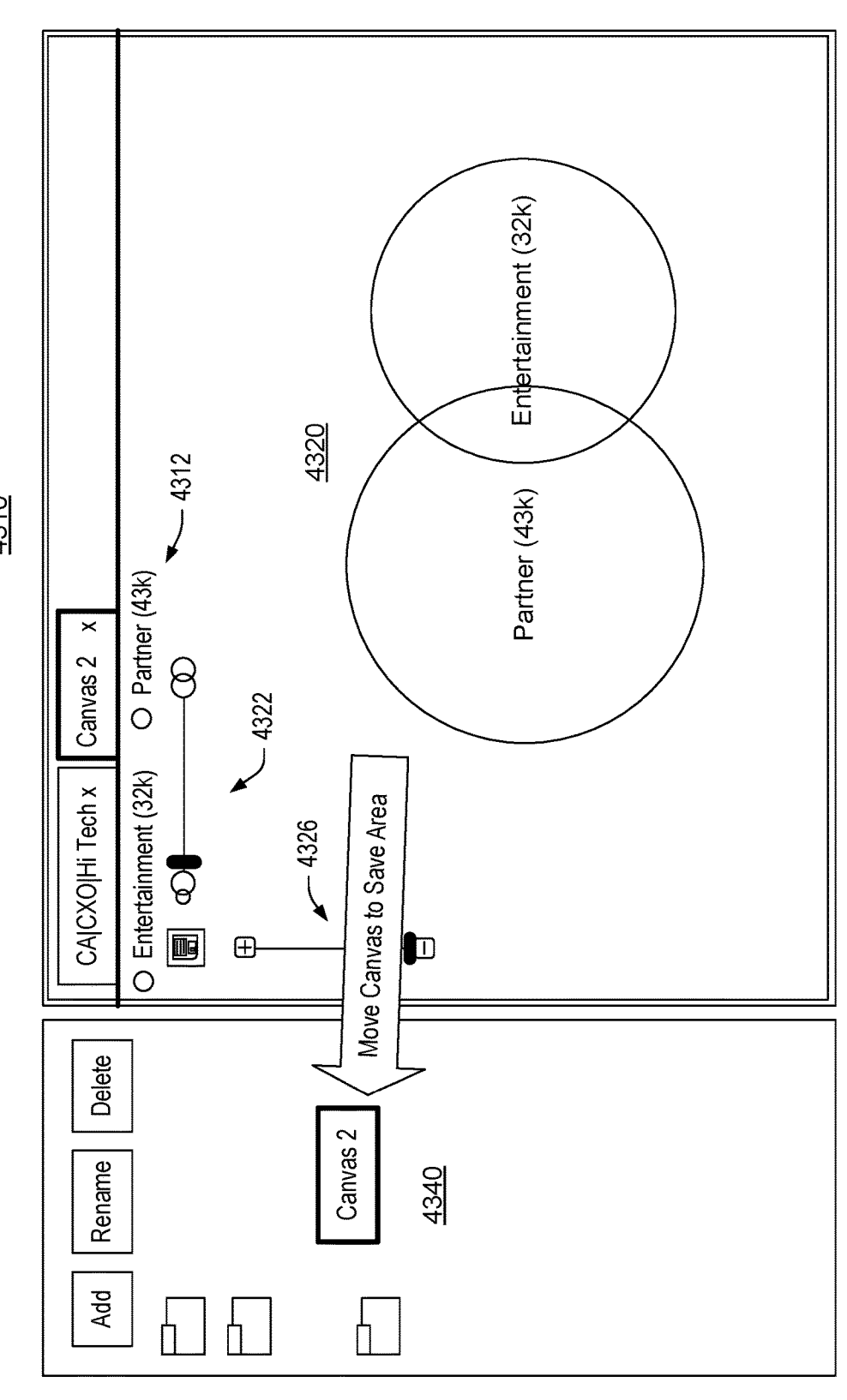
FIG. 43 is a diagram of an example of a graphical user interface.

FIG. 43 shows an example of a GUI 4310 that includes information 4312, a canvas 4320, a scale control 4322, a zoom control 4326 and a workspace area 4340, for example, to save information (e.g., to save information locally in files in folders of a file system, etc.). As an example, the canvas 4320 can be selected and dragged and dropped to the workspace area 4340 to save the canvas 4320 (e.g., information sufficient to recreate the canvas, etc.).

Figure 44:
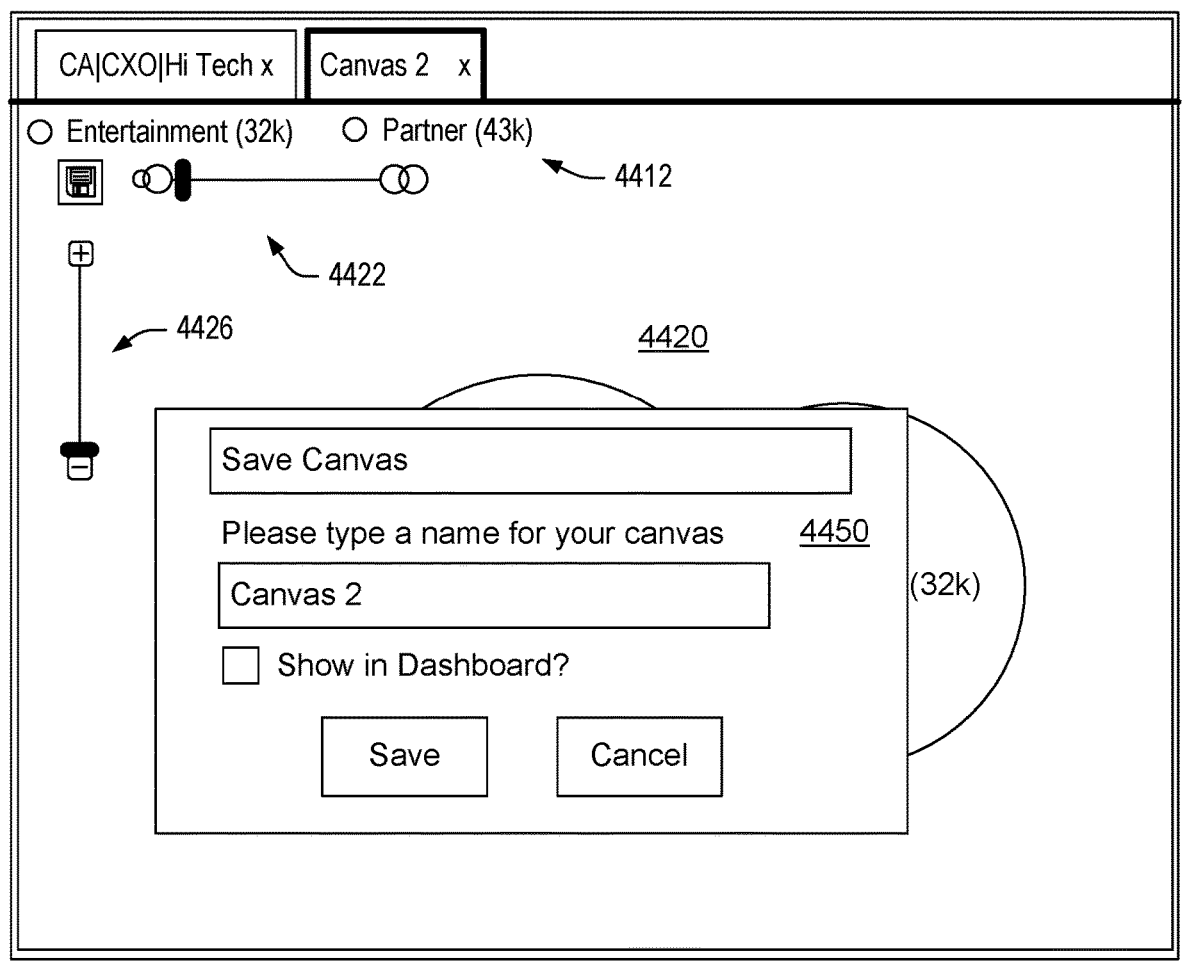
FIG. 44 is a diagram of an example of a graphical user interface.

FIG. 44 shows an example of a GUI 4410 that includes information 4412, a canvas 4420, a scale control 4422, a zoom control 4426 and a pop-up window 4450. In the example of FIG. 44, a name may be entered for the canvas 4420 and a graphical button (e.g., graphical control) may be selected to save the canvas. For example, upon selection of the save button, computer-executable instructions can instruction a computer to save information associated with the canvas 4420 to a file (e.g., a file of a local or a remote file system).

As mentioned, a segment can be a set of records (e.g., contacts, accounts, etc.). As an example, a segment can be generated by selecting a portion of a graphical representation of a GUI. For example, a segment may be selected by selecting a part or an overlap in a Venn diagram rendered to a canvas of a workspace of a GUI.

As an example, a Venn diagram can be created by dragging and dropping criteria into a canvas where, for example, a segment can be defined as group of members of a main set that represents inclusion or exclusion based at least in part on one or more criteria or criteria-portions in a Venn diagram.

As an example, one or more segments can be selected by selecting features of one or more other types of graphics rendered to a GUI. For example, consider states or countries in a map or, for example, sections of a funnel. As mentioned, by saving a segment, it can be regenerated and may be further analyzed, exported, etc.

As an example, a map can represent criteria. As an example, a funnel can represent criteria. As an example, a map can be linked to one or more geographic areas, e.g. countries or states. As an example, a map icon may be dragged onto a canvas where the canvas may be empty. As an example, a funnel icon may be dragged and dropped into a canvas.

As an example, once a funnel is on a canvas, one or more stages of the funnel can be selected. In such an example, as stages are selected, they can be included in a count box (see, e.g., the field 4270 of FIG. 42), which may appear in an upper right hand corner of a canvas. As an example, values of a segment can be dragged to a new canvas, saved area or to one or more export options.

As an example, a funnel can represent different stages of a buying process that customers go through when purchasing products. For example, a sales funnel can be divided into several steps, which can differ depending on a particular sales model. As an example, a last stage of a funnel can be a "customer" or it may be another type of member (e.g., depending upon a sales model it could be "support", "renewal", etc.).

As an example, a funnel can tie to specific stage/status fields. As an example, a field can exist with an overall "process" and be identified as a funnel field, before creation of one or more funnels. As an example, a method can include dragging and dropping a funnel from a funnel stage criterion onto a canvas or, for example, to a plus sign icon to open a funnel in a different canvas. As an example, to select a particular stage in a funnel, a user may touch, click, utter a voice command, make a gesture, etc., for that particular stage. As an example, a graphical user interface can highlight a selected stage of a funnel. For example, upon selection, a selected stage of a funnel may be rendered to a display such that the selected stage appears offset (e.g., slide a little towards the left). As an example, a graphical user interface can render dynamic graphics such as animations. In such an example, instructions may be executed that cause successive renderings of a stage of a funnel over a period of time until the stage is rendered at a particular offset value from a main axis of the funnel. For example, a funnel can include a main axis (e.g., central axis) where a selected stage is shifted to be offset a distance from that axis while remaining in an order of that stage with respect to other stages of the funnel. As an example, multiple stages of a funnel can be selected. As an example, a number in a count box can reflect the total number of records in the selected stages.

Figure 45:
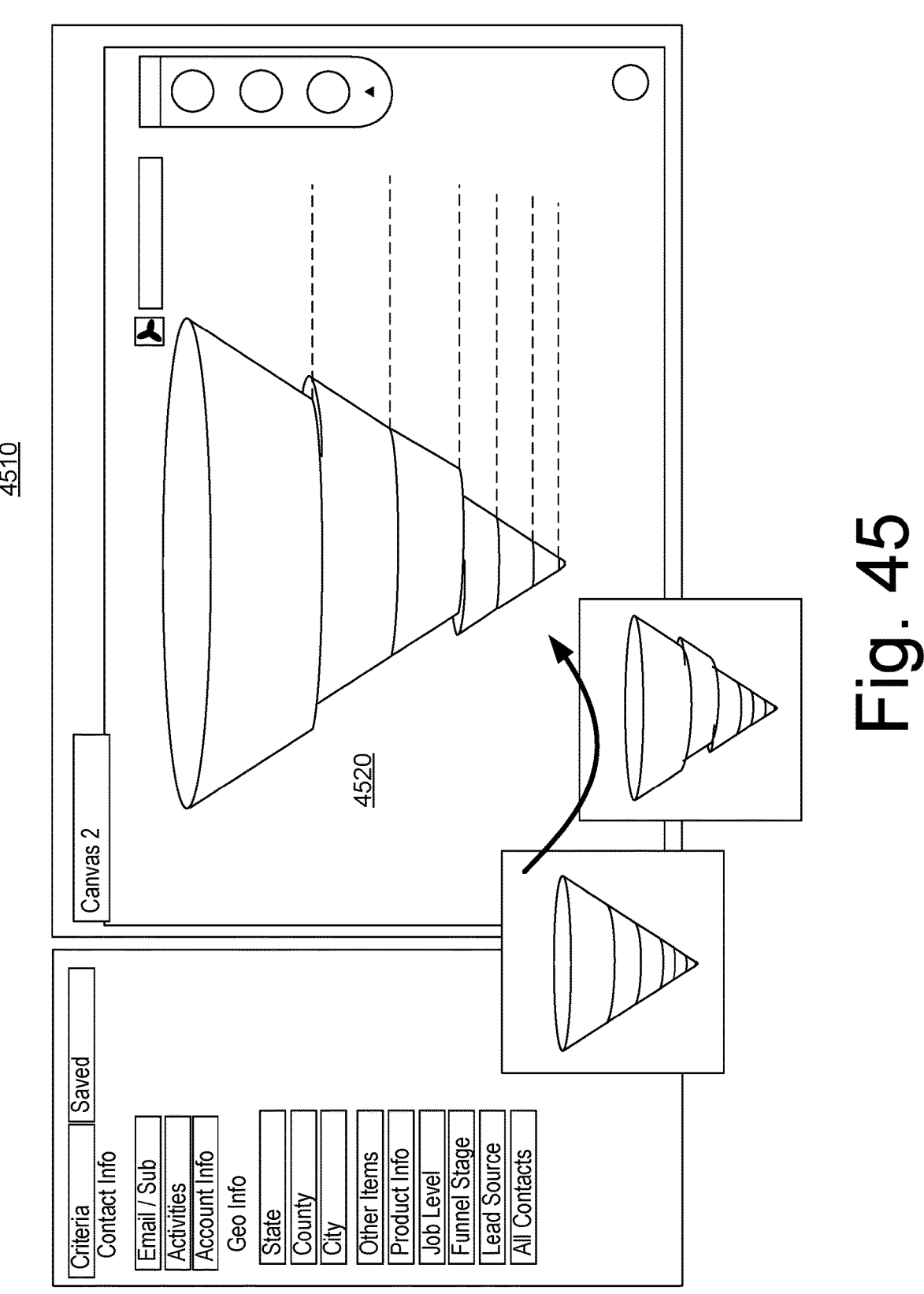
FIG. 45 is a diagram of an example of a graphical user interface.

FIG. 45 shows an example of a GUI 4510 that includes a canvas 4520 where a funnel is shown with two selected stages that are offset from a main axis of the funnel. An arrow represents a progression from a funnel without selected stages to a funnel with a single selected stage to the funnel with two selected stages. As an example, text may be rendered as part of a GUI that indicates a criterion, criteria, etc. as may be associated with a stage or stages of a funnel. As an example, an area of a GUI can include a listing of selectable criteria that may be selected and utilized to define one or more stages of a funnel.

Figure 46:
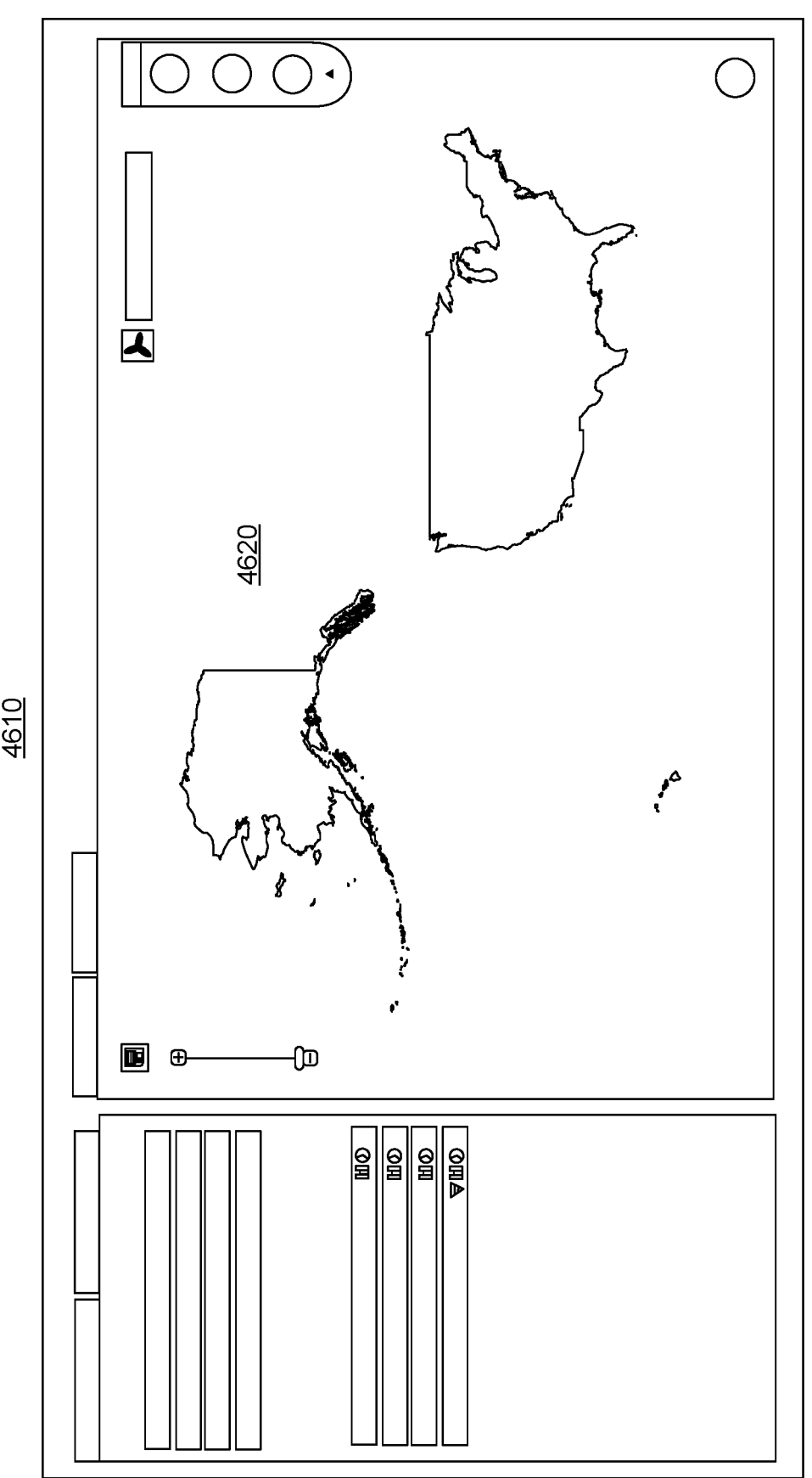
FIG. 46 is a diagram of an example of a graphical user interface.

FIG. 46 shows an example of a GUI 4610 that includes a canvas 4620 that includes a map, which, for example, can be a map of the US. As an example, states in the map may be selected and highlighted where a count box can track a total number of selected members. In such an example, each state may be a segment. As an example, states may be divided into counties or according to one or more other criteria.

As an example, a canvas can include a map that includes countries where individual countries may be selectable. As an example, one or more criteria may be selectable to cause a GUI to render a map where one or more regions of the map are highlighted as corresponding to one or more of the one or more criteria.

Figure 47:
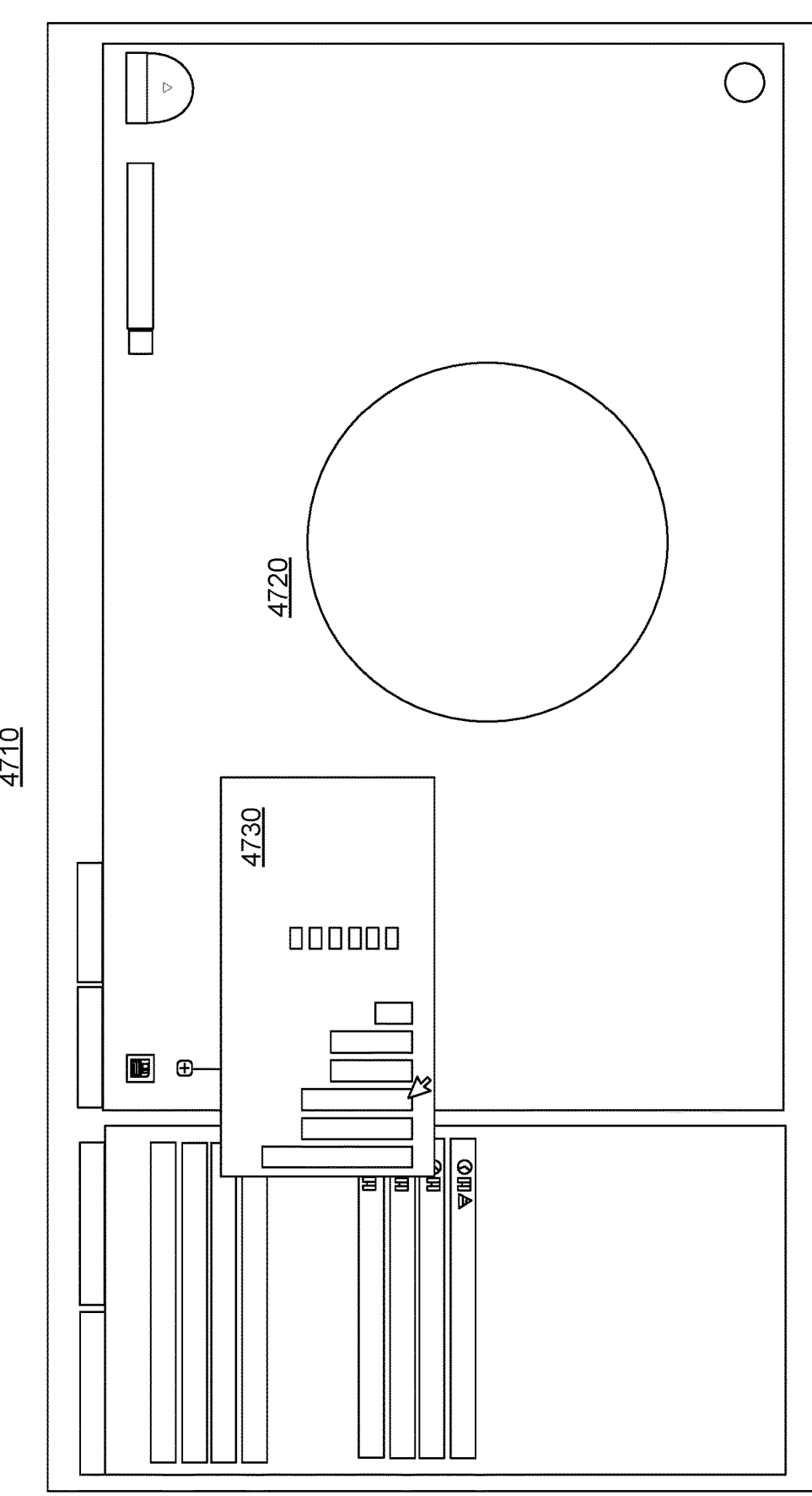
FIG. 47 is a diagram of an example of a graphical user interface.

FIG. 47 shows an example of a GUI 4710 that includes a canvas 4730 and a bar chart graphic 4730. As shown, a bar of the bar chart graphic 4730 can be selected. In the example of FIG. 47, the bar chart graphic (e.g., a collection of graphical elements) can include a legend that can include text where the text can be associated with one or more criteria. As an example, the legend can be color coded and/or coded in one or more other manners (e.g., shading, hatching, etc.).

Figure 48:
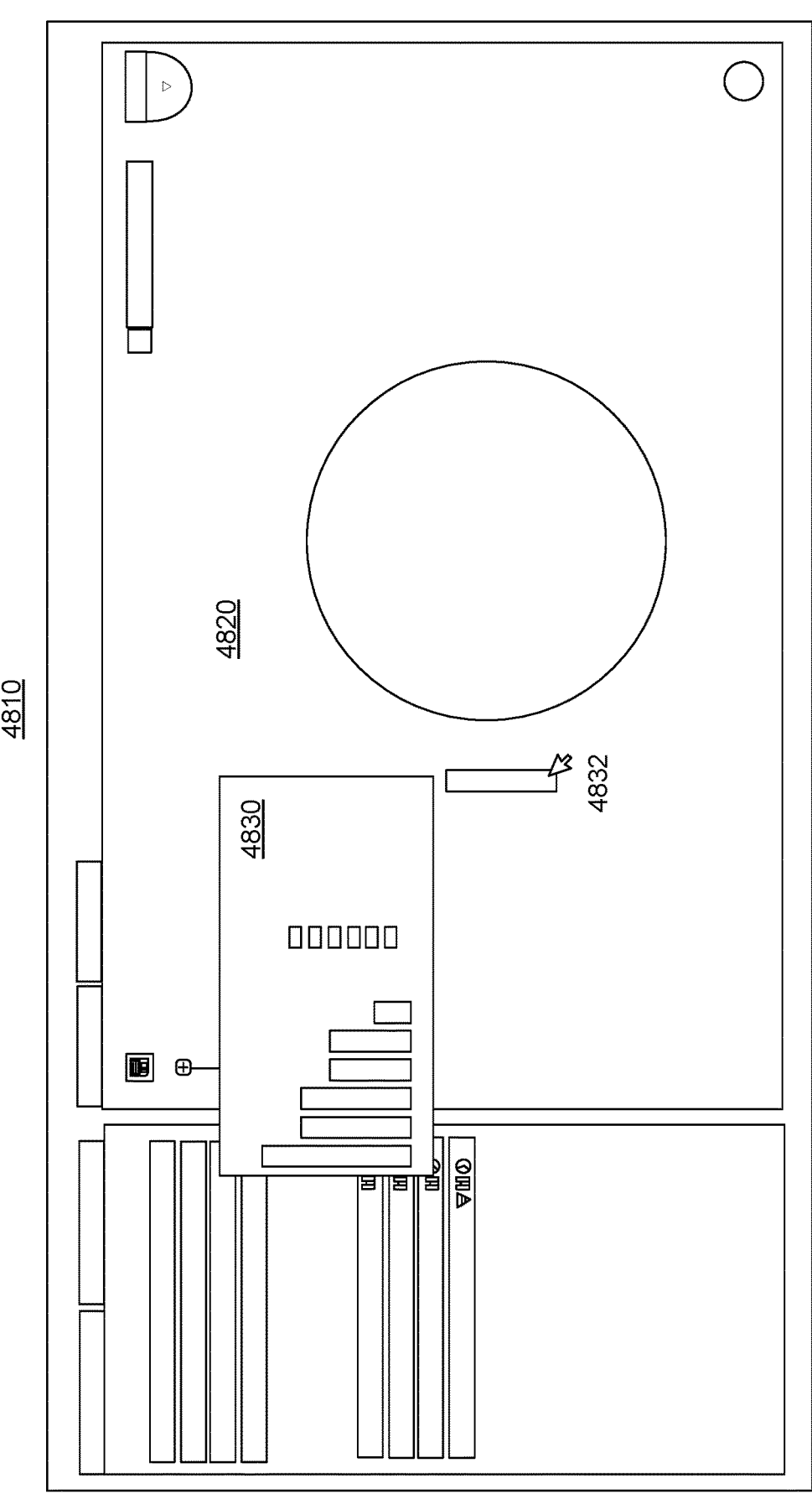
FIG. 48 is a diagram of an example of a graphical user interface.

FIG. 48 shows an example of a GUI 4810 that includes a canvas 4830 and a bar chart graphic 4830. As shown, a bar 4832 of the bar chart graphic 4930 can be selected and moved onto the canvas 4820. As an example, the bar chart graphic 4830 can operate in a manner akin to a pie chart graphic.

Figure 49:
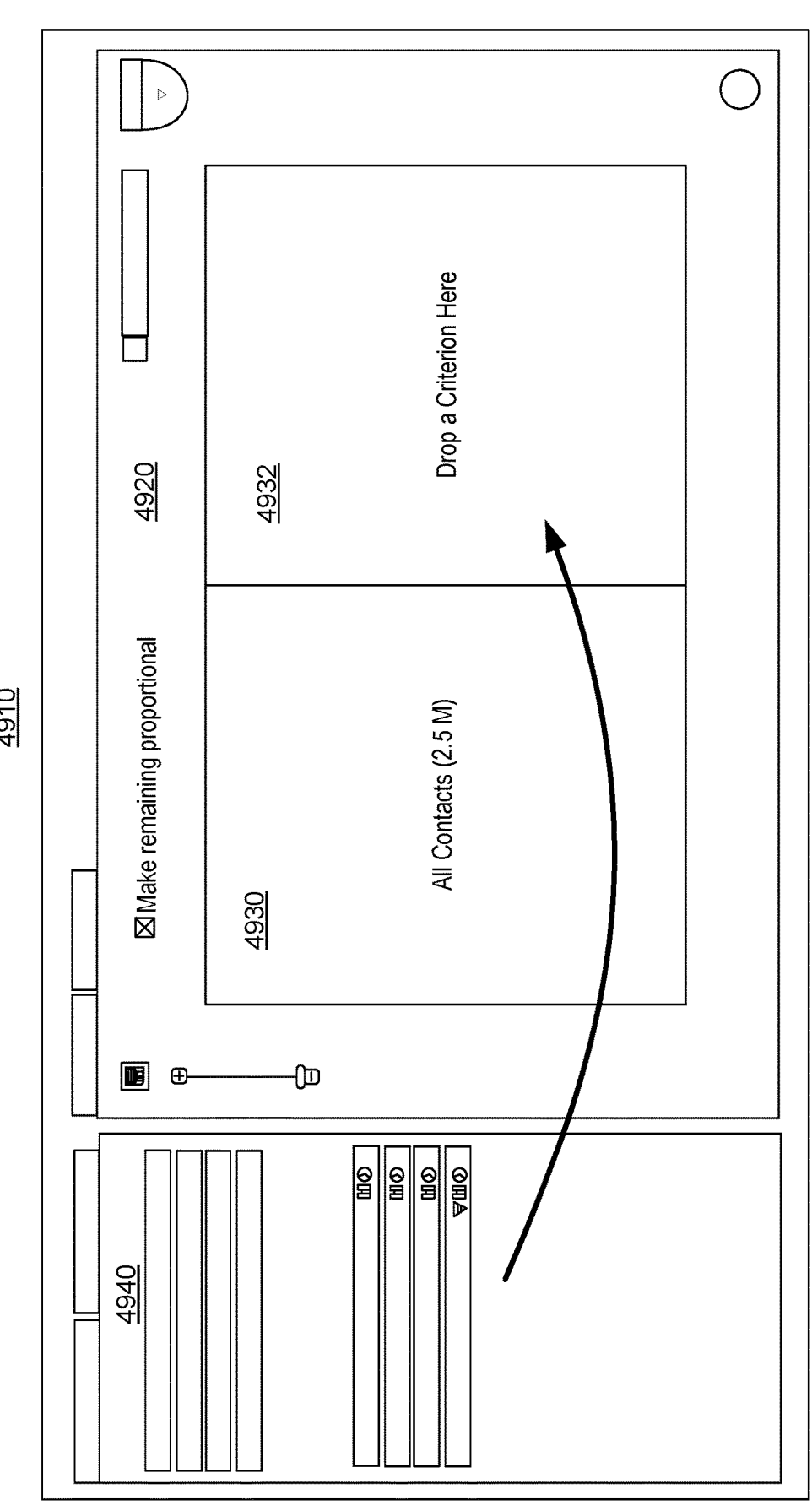
FIG. 49 is a diagram of an example of a graphical user interface.

FIG. 49 shows an example of a GUI 4910 that includes a canvas 4920 and graphical elements 4930 and 4932 of a waterfall approach to analysis and visual representation of information in a GUI rendered to a display. For example, the graphical element 4930 can be a box that represents a set of members of a dataset. In such an example, a criterion may be selected from a criteria area 4940 and dragged and dropped in an area associated with the graphical element 4932. Upon dropping of a criterion in the graphical element 4932, an application can populate the area of the graphical element 4932 according to logic as the criterion is applied to members of the set represented by the graphical element 4930.

Figure 50:
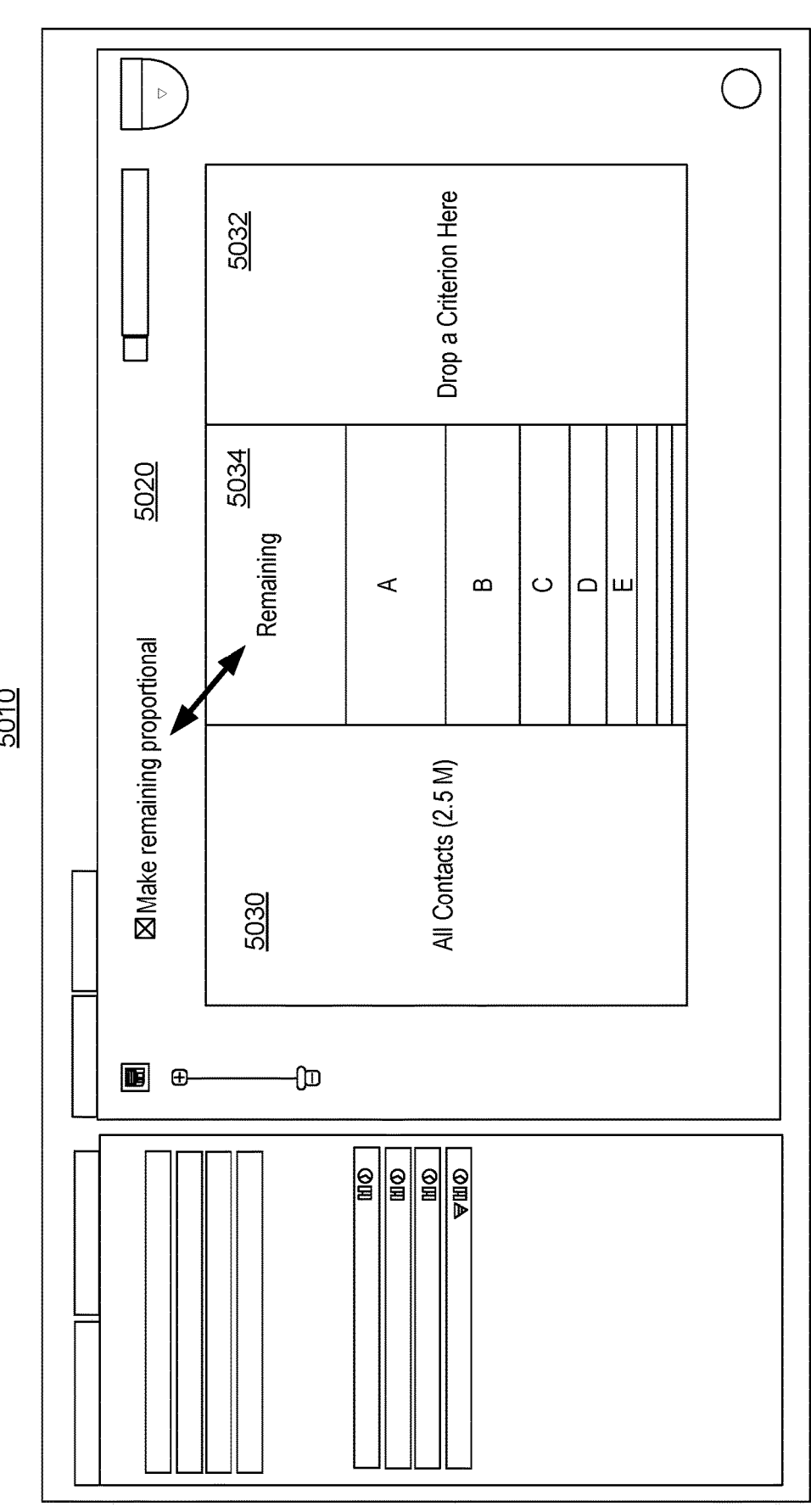
FIG. 50 is a diagram of an example of a graphical user interface.

FIG. 50 shows an example of a GUI 5010 that includes a canvas 5020 that includes graphical elements 5030, 5032 and 5034. In the example of FIG. 50, a feature pertains to proportional representation of members of a set with respect to criteria where the feature (e.g., a graphical control) is selected. For example, where members do not match selected criteria, these may be considered to be remaining members that may be represented in a proportional manner as to area in the graphical element 5032. For example, the area of A, the area of B, etc. can correspond to a number of members therein whereas the area labeled "remaining" can be of an area that corresponds to members that do not fit the categories (e.g., criteria) A, B, C, D, E, etc.

Figure 51:
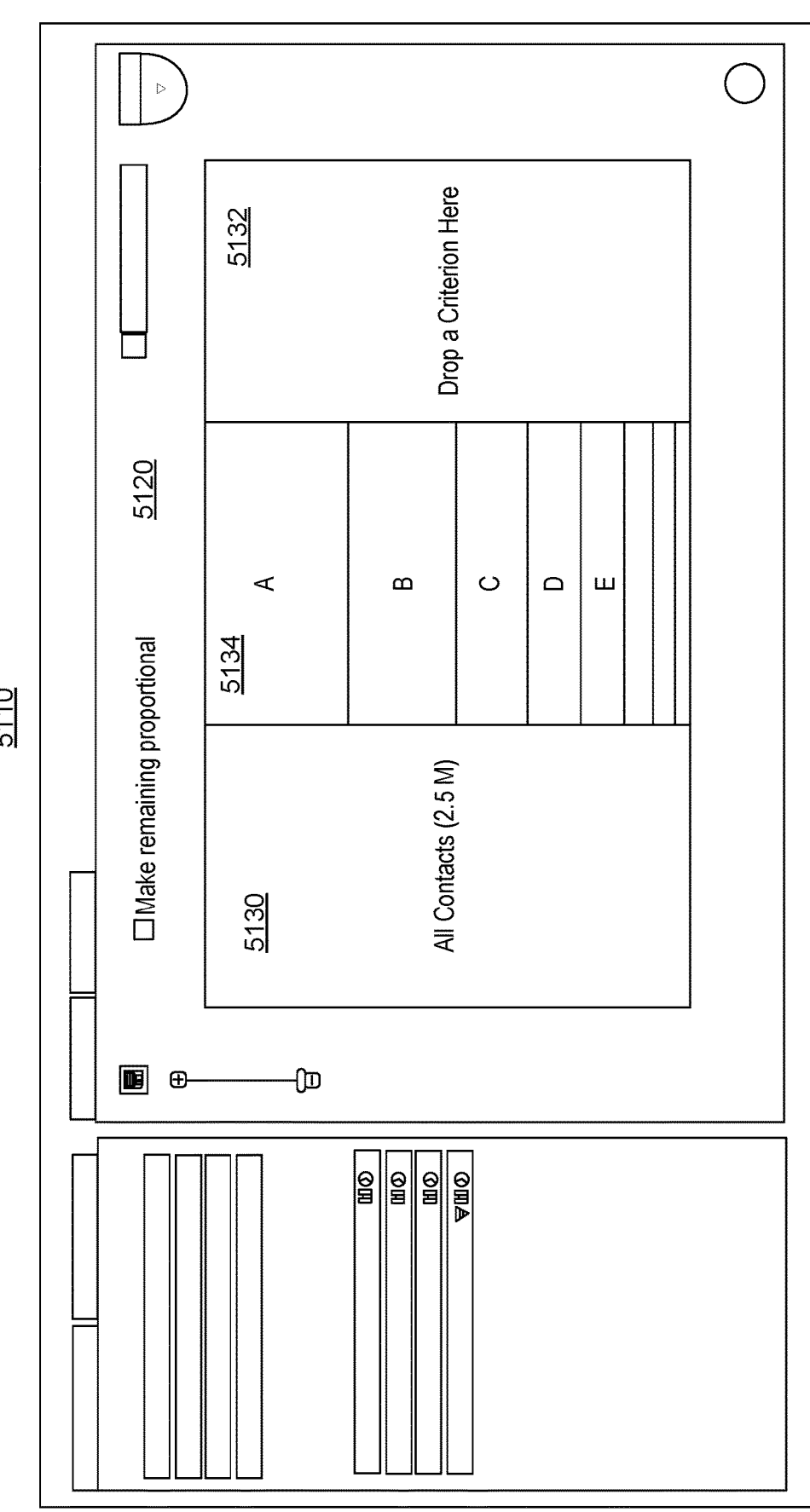
FIG. 51 is a diagram of an example of a graphical user interface.

FIG. 51 shows an example of a GUI 5110 that includes a canvas 5120 that includes graphical elements 5130, 5132 and 5134 and where a feature pertains to proportional representation of members of a set with respect to criteria where the feature (e.g., a graphical control) is not select. In such an example, the box of the graphical element 5134 of the waterfall representations of information in the GUI 5120 shows relevant areas as to categories (e.g., criteria) regardless of a number of non-matching members that make up the "remaining" members (see, e.g., the remaining area of the example of FIG. 50 and compare to the areas 5034 and 5134).

Figure 52:
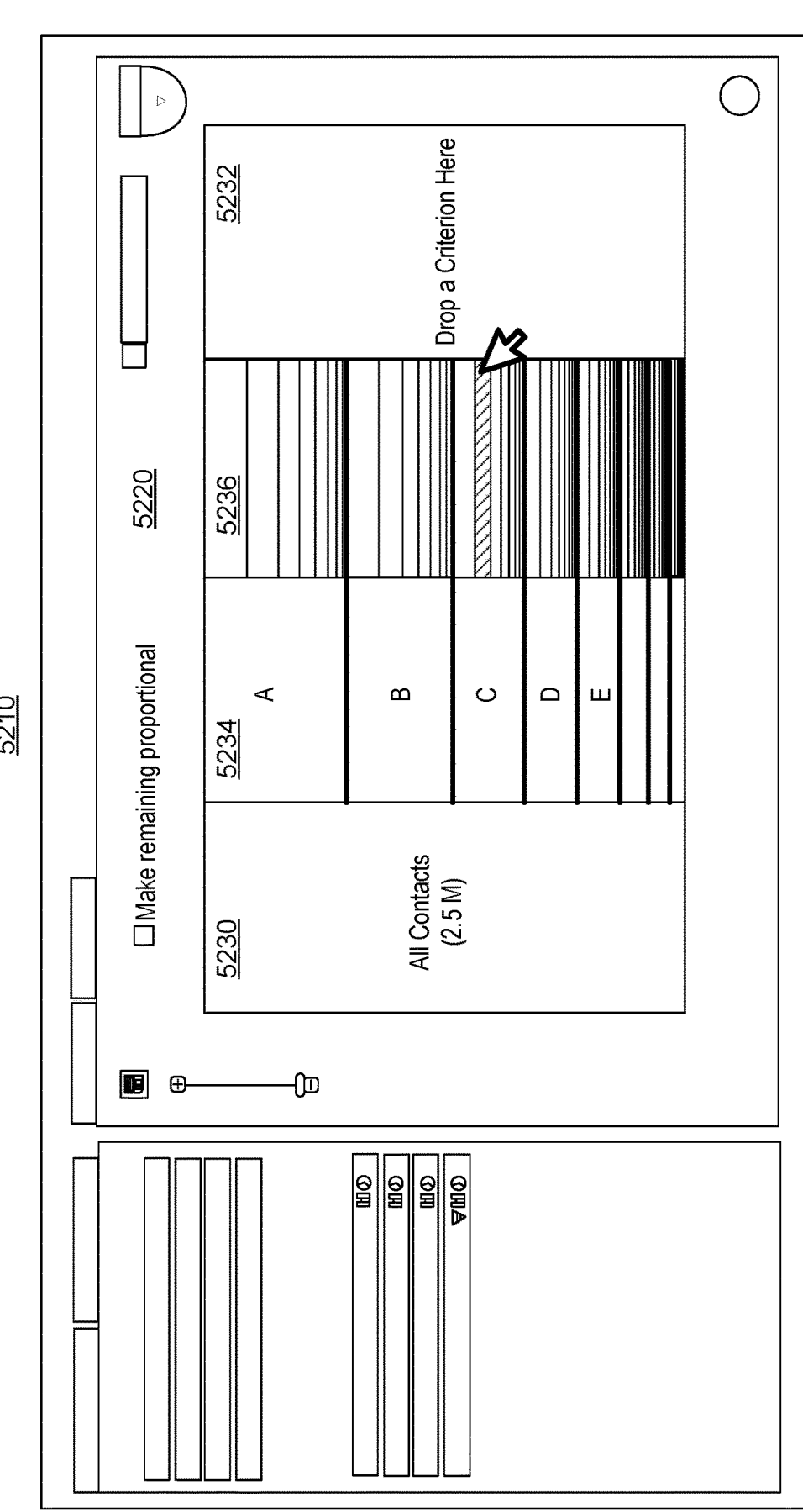
FIG. 52 is a diagram of an example of a graphical user interface.

FIG. 52 shows an example of a GUI 5210 that includes a canvas 5220 that includes a waterfall representation (e.g., graphical elements 5230, 5234 and 5236) of information in relationship to criteria. As shown in the example of FIG. 52, an area in a column may be selected where the area can correspond to a set of a dataset and where the area may be dragged and dropped, for example, optionally in to an area 5232 as a criterion.

As an example, a waterfall representation can provide for finer and finer segmentation of data of a dataset. For example, as finer segmentation occurs, the waterfall representation can include adding columns with horizontal areas (e.g., rows) that can be sized proportionally to a number of members therein that correspond to one or more criteria. In such an example, a user may interact with a GUI of an application to drill down to members of a set that are of interest, for example, for export and/or other analysis.

Figure 53:
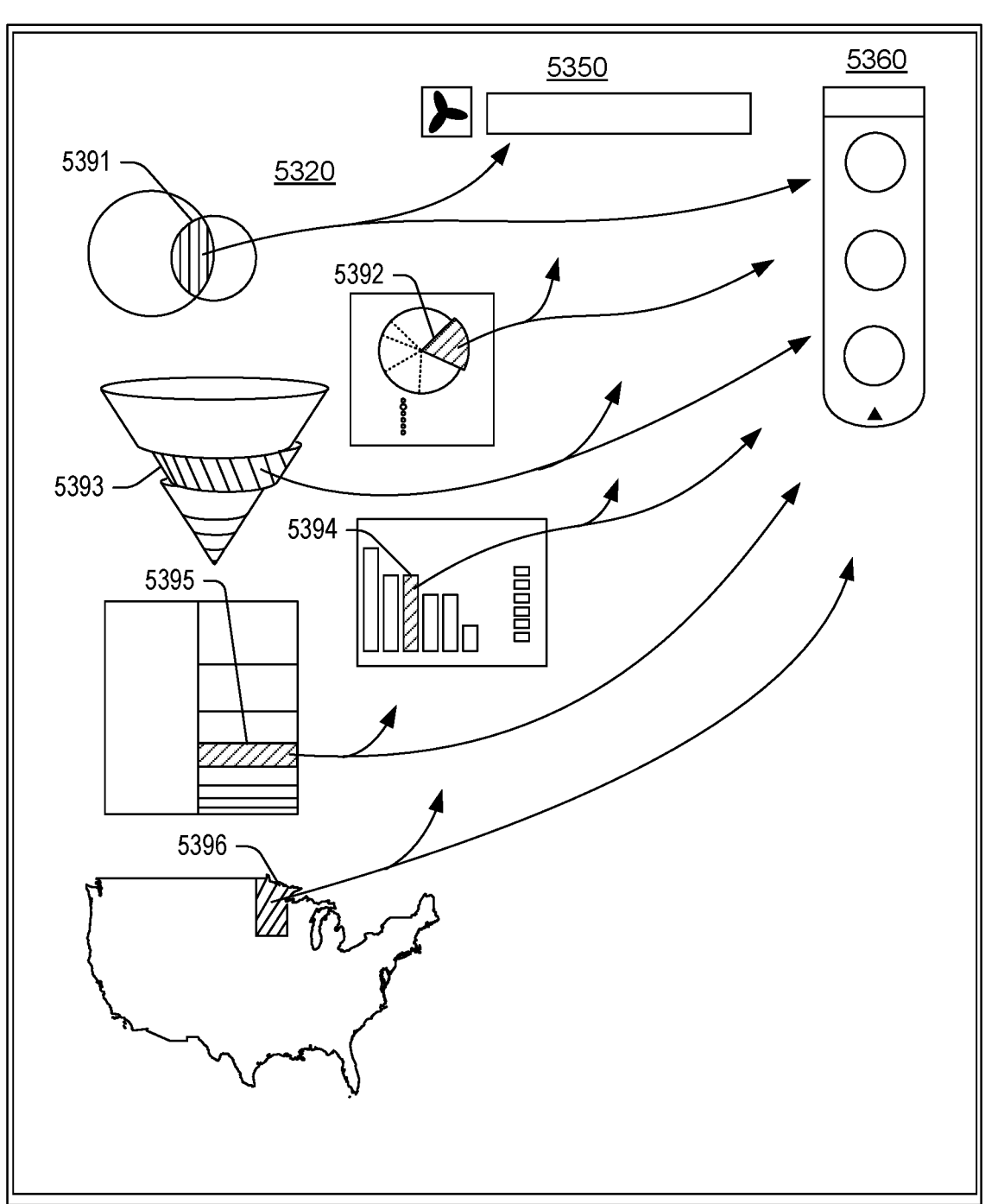
FIG. 53 is a diagram of an example of a graphical user interface.

FIG. 53 shows an example of a GUI 5310 that can be rendered to a display where the GUI 5310 includes various graphical elements for displaying information and/or export of information (e.g., as one or more files, etc.). As an example, the segment 5391 may be selected and/or dragged and dropped to the export panel 5360 where upon selection, the graphical element 5350 shows a number of members of the selected segment 5391. In such a manner, a user may be aware of what is being exported. Such an approach can allow for quality control as to information in exported files. For example, a user may select the segment 5391, view information associated with that segment in the graphical element 5350 and then drag and drop that segment to the export panel 5360 to trigger an application to generate a file that includes information for members of that segment where the file is compatible with a particular one or more of the applications rendered as graphical elements (e.g., icons, etc.) in the export panel 5360. As an example, multiple segments of a diagram can be selected and dragged and dropped or otherwise acted upon. For example, consider selection of two stages of a funnel diagram, two states of a country map, two segments defined by overlapping circles (e.g., partially overlapping), two segments of a waterfall diagram, etc.).

In the example of FIG. 53, other segments (e.g., stages, bars, pie slices, states, rows, etc.) are illustrated as 5392, 5393, 5394, 5395, and 5396. Arrows indicate that dragging and dropping may be performed and that information may be displayed upon selection of the one or more segments.

Figure 54:
FIG. 54 is a diagram of an example of a graphical user interface.

FIG. 54 shows an example of a GUI 5410 that includes a canvas 5420 that shows "histories" in terms of parent and child relationships for logical representations of data. For example, a "current" diagram may appear approximately center in the canvas 5420 where multiple sets are illustrated, for example, as corresponding circles. In such an example, one circle can be a child circle C1, another circle can be a child circle C2 and yet another circle can be a parent circle P3. As shown, representations can be positioned about the central "current" diagram where these representations correspond to "family trees" to illustrate where a child is from or where a parent may be from. Further, relationships may be illustrated for multiple generations. In such an example, a user can view the representations and understand where the circles in the current diagram are from and what they correspond to, for example, as to criteria, etc.

In the example of FIG. 54, dotted lines with arrows are included, which may be optional. For example, labels, coloring, shading, etc. may indicate heritage and/or lines, arrows, etc. As an example, a user may click (e.g., or touch, etc.) one of the generational diagrams, which may optionally be scaled down in size with respect to the current diagram. In such an example, an application may render a GUI with a canvas for the selected one of the generational diagrams. For example, consider the cursor arrow shown in FIG. 54 where upon selection of the corresponding (i.e., pointed to) generational diagram, an application generates or regenerates the diagram and presents it by itself in a canvas (e.g., or optionally with one or more related generational diagrams).

In the example of FIG. 54, a user can readily see a "history" of a current diagram and, for example, information flow: how information of other analyses has flowed into the current analysis. Such an approach may include limiting a number of circles within a single diagram. For example, each diagram in the canvas 5420 may be limited to include three circles. Such a three-circle limitation can be enhanced via use of generational diagrams such as the generational diagram of the canvas 5420. Further, as an example, a human may more readily handle and/or understand logic and logical relationships where a number of sets represented as circles in a Venn diagram is limited to three. For example, a user may understand, first I overlapped criterion x with criterion y, which gave me intersection z; and then, I took intersection z and overlapped it with a set yy that corresponded to a particular criterion, etc. Where such a user wants to "double check" a prior action, the user may select a desired one of the generational diagrams to revisit the corresponding canvas. As an example, ordering of diagrams within a generational diagram may be in one or more forms. For example, a right to left ordering may be rendered to a display, a top to bottom ordering may be rendered to a display, etc. As an example, a family tree type of diagram or other type of genealogical diagram may be implemented where, for example, two or three "parents" may have one or more corresponding "children".

As an example, an application can include an animation mode. For example, consider an animation mode that steps through generational diagrams in a series of frames to illustrate how a current diagram was derived. In such an example, a user may instruct an application to store the animation as a file (e.g., video and/or instructional) such that playback can occur (e.g., for communication to another, etc.). As an example, the animation (e.g., playback file) may be in a format that does not necessarily require an application that generates the animation. For example, an animation may be stored as an animation file for a media player, for a POWER POINT® presentation application player, etc. Such an approach may allow one to understand a series of logical processes undertaken to arrive at a particular set of data (e.g., members of interest). For example, in a sales scenario, such an approach may help a sales representative to understand that a list of contacts for sales calls does not overlap with members according to certain criteria. In such an example, the sales representative may be assured that the list of contacts is complete and that the sales representative should not worry about including others in the list, which may be assigned to a sales representative for another category (e.g., geographical region, job title, etc.).

Figure 55:
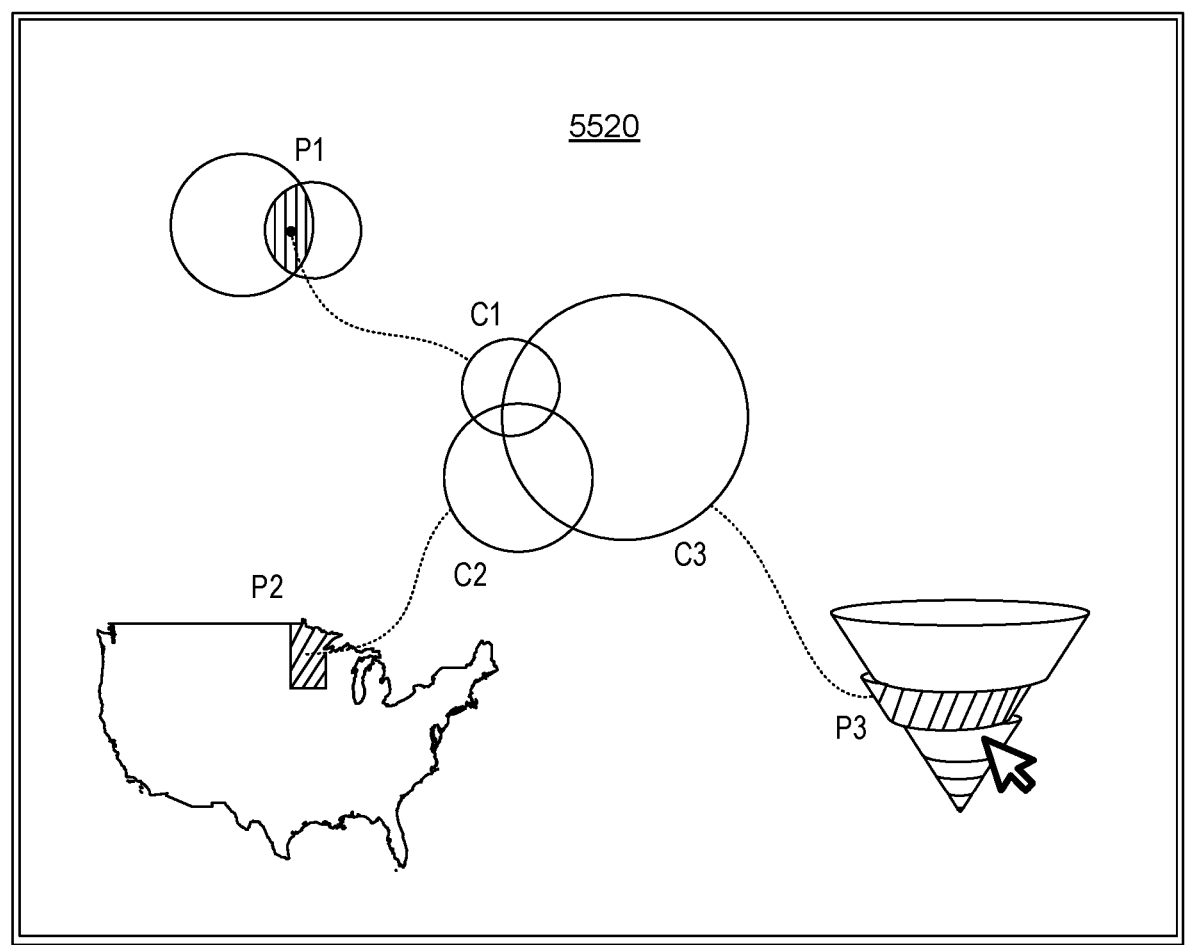
FIG. 55 is a diagram of an example of a graphical user interface.

FIG. 55 shows an example of a GUI 5510 where a generational diagram appears in a canvas 5520 where the generational diagram is heterogeneous, rather than homogeneous. For example, the child C1 is from a Venn diagram, the child C2 is from a map and the child C3 is from a stage of a funnel. As an example, a generational diagram can include a waterfall and/or another type of diagram.

As an example, a generational diagram can include two or three branches from a current diagram where the current diagram is a Venn diagram. For example, if a current Venn diagram includes two circles, the generational diagram can include one or two branches (e.g., for each of the two circles) or, where a current Venn diagram includes three circles, the generational diagram can include one, two or three branches. As an example, a diagram other than a Venn diagram may be a current diagram as part of a generational diagram.

Figure 56:
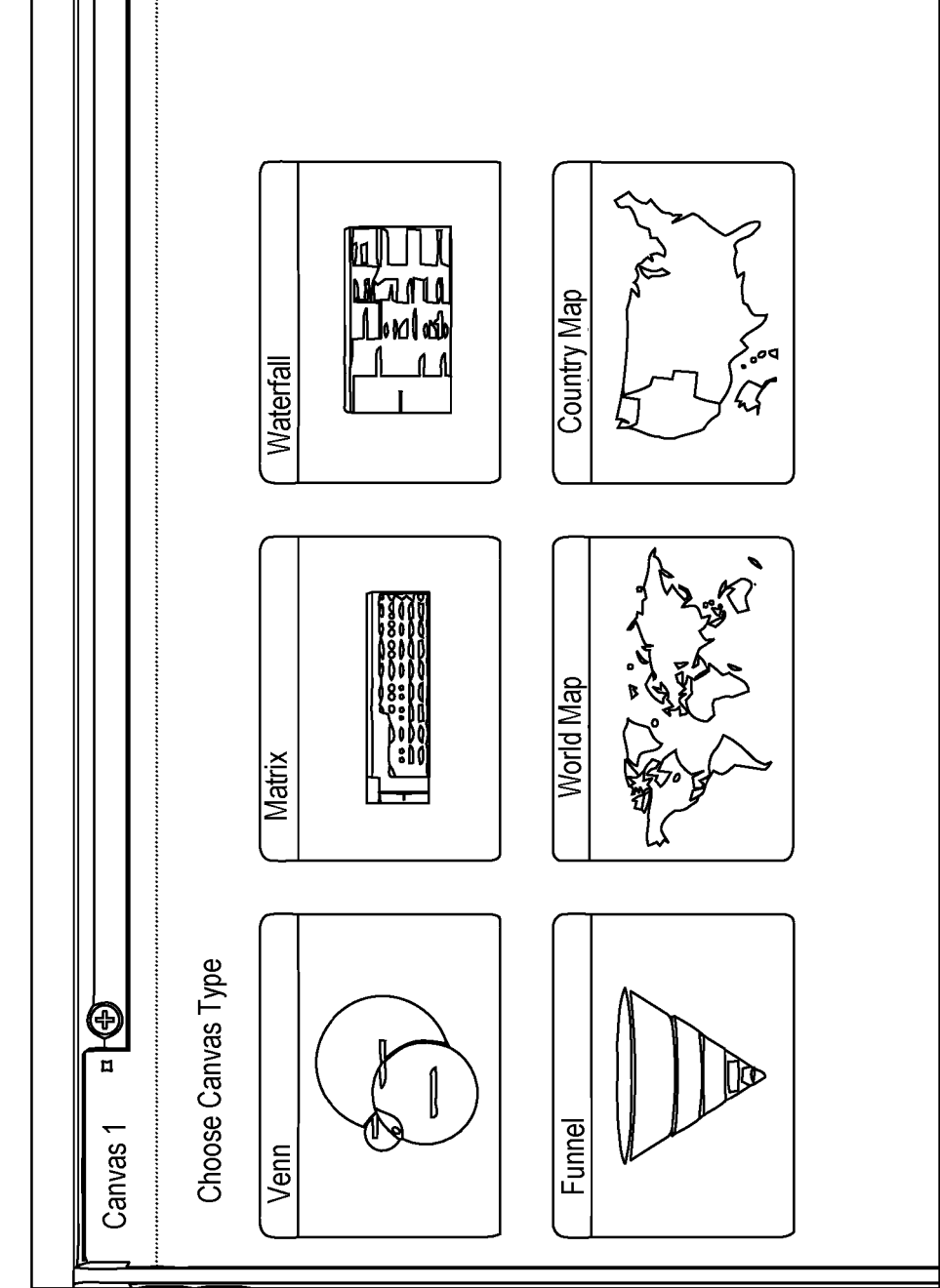
FIG. 56 is a diagram of an example of a graphical user interface.

FIG. 56 shows an example of a GUI 5610 that includes a matrix of canvas types that may be selected for a canvas. In the example, the canvas types correspond to diagrams such as a Venn diagram, a matrix diagram, a waterfall diagram, a funnel diagram, a world map diagram and a country map diagram; noting that one or more other types of diagrams may be included.

Figure 57:
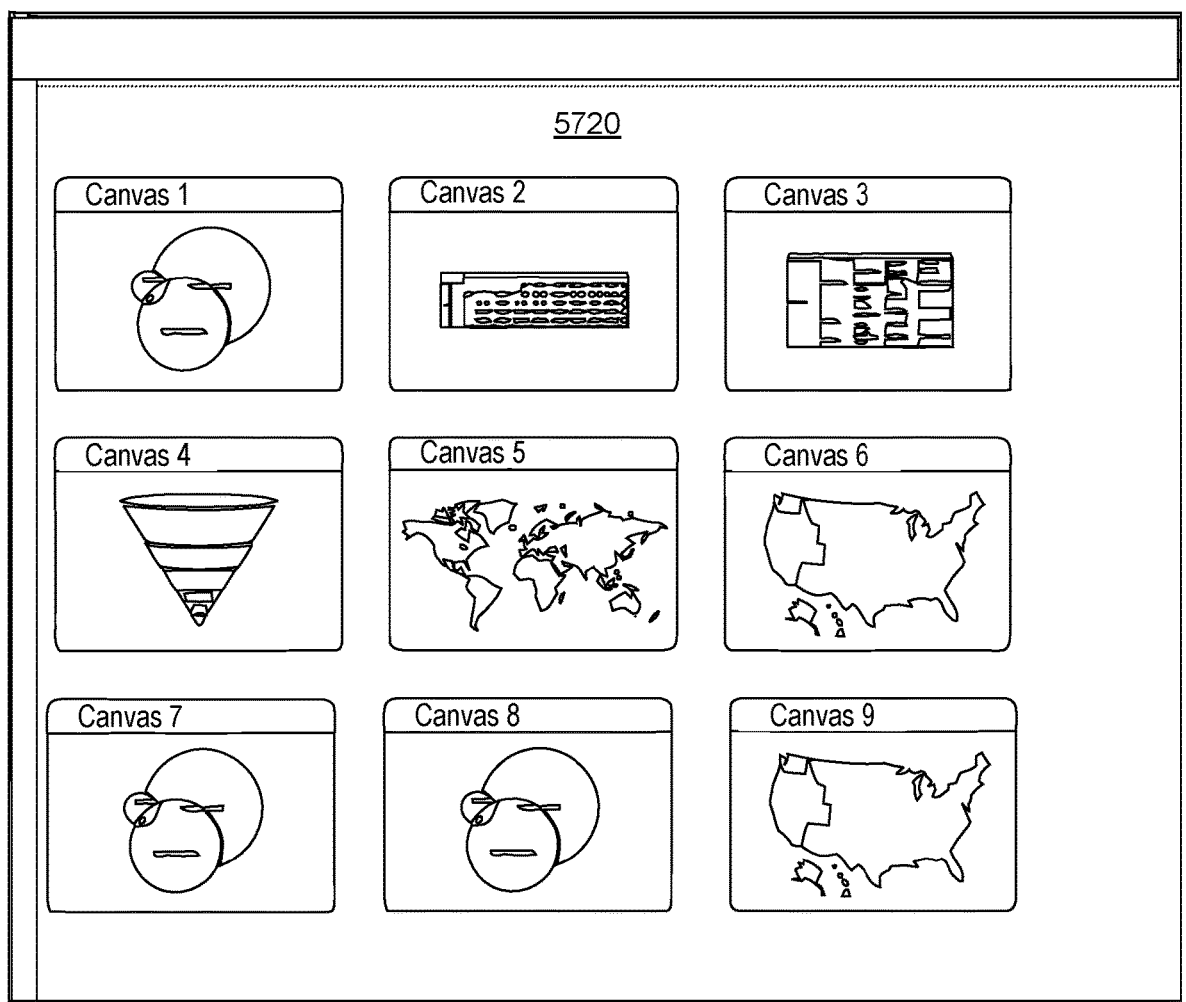
FIG. 57 is a diagram of an example of a graphical user interface.

FIG. 57 shows an example of a GUI 5710 that includes a master canvas 5720 of sub-canvases that may be individually selectable. For example, upon selection of a canvas, which may be represented as a thumbnail (e.g., a thumbnail image of a diagram), the canvas may be generated or regenerated in a GUI rendered to a display.

The example GUI 5710 of FIG. 57 can be a dashboard. For example, such a dashboard can display various representations of canvases that may be saved canvases. For example, a method can include taking a snapshot of a canvas (e.g., a screen shot) or otherwise creating a thumbnail of a canvas and then rendering that snapshot or thumbnail as a mosaic of a dashboard. In such an example, the snapshots or thumbnails of a dashboard may be selectable to cause rendering of a corresponding canvas.

Below various examples of methods, techniques, technologies are described where various figures may be referenced.

Selection Methods on a Quantified Euler Diagram

Ability to Select Single or Multiple Sections on a Quantified Euler Diagram

As an example, where multiple circles overlap (FIG. 1), a user may select a section or a multiple combination of sections as desired (FIG. 10). Upon selection, the section(s) (e.g., segment(s)) so identified via selection can be interactively operated upon, for example, consider operations such as move, delete, transfer, etc. (FIG. 2).

Ability to Select the "Universe" Outside a Quantified Euler Diagram

As an example, a user may select "the universe outside" one or more circles (e.g., as types of closed curves), thereby choosing elements that are not represented by the one or more circles (e.g., as displayed onscreen). In some cases this may not be possible, for example, where the set or sets onscreen represent an entire set or sets of records. In such instances, such functionality may be disabled.

Ability to Select a Circle that is on a Quantified-Euler Diagram

As an example, a user may select an entire circle (FIG. 3), regardless of whether the circle is standalone or overlapped with other circles. For example, a method can include selecting a specified portion of the circle (for example the title, the rim, or within it, depending on implementation), and upon selection, the entire circle is identified and can be worked with.

If quantification determines there is no overlap (FIGS. 23 and 24) no overlap occurs. Overlap quantification may determine that overlap should be large or even that a circle should entirely be located within another circle.

Dragging Methods for a Quantified Euler Diagram

Dragging a New Text Field/Criteria to a Quantified Euler Diagram

As an example, a system may include an ability to drag one or many fields from a list of database fields (e.g., or other representation of elements in a database), onto a workspace (FIGS. 17 and 19) and, for example, have them appear as a quantified circle either singly, or in proportional size and proportional overlap (FIGS. 18 and 20) to one or more other circles/sets that may already be rendered in the workspace.

Dragging a Chart Portion Field/Criteria to a Quantified Euler Diagram

As an example, a system can include an ability to drag a pie slice or bar (e.g., representing an elements or element option in a database), onto a workspace (FIGS. 35 and 36) and have them appear as a quantified circle either singly, or in proportional size and proportional overlap (FIGS. 18 and 20) to one or more other circles/sets already in the workspace.

Transferring a Selection on a Quantified Euler Diagram to Another New or Existing Diagram As an example, a method may include, after selecting a portion of the diagram such as one or many overlaps or circles, receiving an instruction that calls for transfer (e.g., by dragging the item(s) selected) to another Quantified Euler Diagram (FIG. 1) at which point the selected items may be dropped (FIG. 31) and become a new set, for example, in the form of a circle (FIG. 32).

In such an example, if the circle is the first circle on a new Euler Diagram, one or more other new sets or criteria can be dragged over (FIGS. 33 and 34) or added to be combined with it (e.g., compare to a scenario where a source diagram may include a restriction as to a number of fully overlapping circles).

As an example, if selected items are dragged and the new circle-set is dropped on an existing Quantified Euler Diagram, the dropped set can be automatically overlapped with any existing sets already in use.

Selection on a Quantified Euler Diagram can be Saved

As an example, after a portion of a diagram is selected, it can be saved, for example, via dragging (FIG. 43) to a specified area or by a menu option (FIG. 44). In such an example, the selection specified can be stored, for example, consider one or more of the following storage techniques:

a. Stored as filter (FIG. 2): In this approach the underlying combination of criteria, circles, segments, And'd and Or'd together can be saved, for example as a SQL Query or other computing filter mechanism. This saving method can allow for recreation of the segment in the future, optionally with an altered or new dataset and thus altered results.

b. Stored as list: In this approach, the actual list of records returned by the underlying selection query can be saved for future use (FIG. 4). This type of record list can remain the same, for example, regardless of whether the underlying dataset changed.

Transfer of Selected Portion of a Quantified Euler Diagram Directly to an Icon or Drop Zone Representing Another System As an example, after a portion of a diagram is selected it can be (from the user's perspective) directly transferred to another application for use (FIG. 4). In such an example, transfer may be initiated via a drag-drop action (FIG. 40), receipt of a menu item selection, receipt of a double-click, or one or more other approaches.

As explained, a transfer to another application or programmatic system may be via a filter or list. One or more underlying methods for transferring to another system (e.g., application, etc.) may include: Connection via API (Application Programming Interface); File Transfer via CSV, Excel, or other file format; and/or IP Address to IP Address data transfer.

Selections on a Quantified Euler Diagram can be Counted

As an example, after a portion of a diagram is selected it can be counted (FIG. 42), giving a numerical representation of how many records are in the selected segments.

Ability to Combine Circles in a Quantified Euler Diagram to Create a New Set

As an example, if there are two or more circles/sets on a Quantified Euler Diagram (FIG. 11), one can be selected and combined with another either through dragging (FIGS. 12 and 13), double-clicking, menu option or another method. After combination, a new circle/set may be formed (FIG. 14), which, for example, can represent a combination of the queries and record lists that formed the original, pre-merged sets.

a Circle can be Deleted from a Quantified Euler Diagram.

As an example, such that a circle/set can be easily deleted, it may be dragged to a trashcan (e.g., or other graphical user interface icon utility), or selected by menu or other ways for deletion and erasure from the diagram (FIGS. 37, 38 and 39).

An Entire Quantified Euler Diagram to be Saved

As an example, an entire Quantified Euler Diagram can be saved (FIGS. 42 and 43), for example, to allow for later restoration to a screen and usage. As an example, saving may be done by dragging a name or other distinguishing aspect of the Quantified Euler Diagram to a "Save" drop zone and the popup of a dialog requesting the save-name.

As an example, a system may allow for one or more Quantified Euler Diagrams to be stored according to a specification, for example, without or with selections. For example, consider the following: Without Selections: Such that no selections are stored and that upon retrieval the user would start out with the previously existing sets, but no part of them saved; and With Selections: Such that any areas that are selected remain with, and part of the diagram and are restored when the diagram is restored. Note that this is different from the "Selections Can be Saved" mentioned earlier because the selections and the Quantified Euler Diagram are being saved as a unit.

Examples of Visual Enhancement Methods

Scale Ratio: Changing the Degree to (or Scale by) which Two Circles Represent their Quantities on a Quantified Euler Diagram As an example, a Quantified Euler Diagram may involve a combination of large circles and small circles where, for example, each of the circles represents the quantity of records represented by that circle. However, in some scenarios, a circle differential may be too large to work with comfortably (e.g., within a workspace, etc.). As an example, a method can include actuating a graphical control or other type of control by which the proportionality between large circles and small circles can be diminished, for example, until eventually the circles are of equal size (e.g., as a limit, approaching a view that corresponds to a "true" Euler Circle/Venn Diagram (FIGS. 5, 6 and 7)). As to a control, consider one or more of a slider, nob, menu option, numeric entry or other control that may be activated for setting a range of numbers.

Method for Calculating Scale Ratio

As an example, a largest circle may be characterized as "ca". In such an example, by taking the radius (for example in pixels) of the largest circle (ca), and taking the radius of a smaller circle, and then subtracting the smaller radius from the largest radius, as a result, a differential quantity between the two circles may be obtained. In such an example, a method may include dividing that quantity (i.e., the result) by the number of increments in a scale control (e.g., consider 10 or 100, etc.). Such an approach provides an ability to increment the size of the smaller circle by an exact proportion in size between the smaller and the larger circles.

A process, as explained above, may be repeated for one or more additional circles (e.g., smaller than the largest), such that when the scale ratio tool is incremented, circles grow proportionally until the circles grow up to be either the full size (or to a percentage close to that such as 90%) of the largest circle.

Alternative Approach: As an example, rather than circles scaling to the largest circle, a method may provide for selecting one or more of a middle circle or a smaller circle as the "destination" size for other circles.

As an example, instead of using the largest circle as the target some percentage of screen size or available workspace could also be used as the "destination size" for circles. As an example, an edge grab can be utilized for a circle.

Zoom Combined with Scale Ratio for Viewing Quantified Euler Diagram

A combination of a zoom tool with the previously mentioned Scale Ratio tool can allow a user to adjust both tools such that a Quantified Euler Diagram can become visually understandable (FIGS. 7, 8 and 9). For example, a system may include one or more computer-readable media with processor-executable instructions that upon execution can cause the system to adjust a quantified Euler diagram or diagrams to enhance a user's ability to understand content by viewing such a diagram or diagrams on a display or displays.

Methods for Making Visual Decisions

Method for Deciding Selected Area(S) to be Filled in with Lines on a Quantified Euler Diagram As an example, where a location within a Quantified Euler Diagram is clicked or selected, upon return of the xy position of the location, a system may commence an algorithm that act to draw a line, for example, going to the left while continuing checking the xy location to see whether it has reached a line to the left and thus a new segment. In such an example, the process may optionally be repeated one or more times, for example, for multiple lines, incrementing both up and down (again as it increments vertically, watching for lines) until the segment is filled with lines.

As an example, as an alternative method, lines may be drawn by, for example, going vertically or in a dot fill pattern. As an example, a method may include determining a segment area by calculating the radius/areas of circles and thus the circumference and size and area of overlaps, and then filling the area. As an example, a method can include filling an area or areas, for example, by utilizing polygons to fill the area(s) in question.

Method for Deciding Degree/Quantity of Overlap of Two Circles on a Quantified Euler Diagram (or Three Circles with No Common Overlap)

As an example, after retrieving a quantity of records associated with two circles, and also a quantity of records associated with an overlap, a system may then execute one or more algorithms to determine the proportions between the sets, and associate the result with areas of the circles (alternative calculation method may be to use radius, but to make the overlap bigger). As an example, a system may include, for each circle area quantity, conversion of area to radius.

As an example, a method can include taking the radius of two circles and subtracting the distance between the two. Such a method can allow positioning the two circles a proper distance apart for a proportional overlap based on the returned quantity of records within the overlap. As an example, two circles with no records in common may be positioned with no overlap and, in such an example, no distance is subtracted and/or reduced between them. Note that such an approach may be used for three circles (or more) when there is no common overlap, for example, by placing them at points on the big circle that are do not conflicting with any other circles.

Method for Deciding Degree/Quantity of Overlap of Three Circles on a Quantified Euler Diagram As an example, an initial overlap of a blue circle and a yellow circle (e.g., smaller circles) with a red larger circle can be determined by a method as discussed above.

As an example, in a method, a formula may be employed "RadiusYellowCircle-RadiusBlueCircle3-Common area" and then one of the smaller circles (e.g., the yellow circle) moved around the circumference of the larger circle until the resulting distance indicated by the foregoing formula is met. In such an example, while moving the circle, a method may include rendering the circle in a manner that maintains a particular distance (e.g., as based on the yellow circle calculation previously stated) with respect to the red circle. Such a process may continue until the red circle is a predetermined distance from the blue circle, and thus the selected circles, with overlaps, may be, as calculated, and appropriately illustrated. As an example, a circle can be moved around a larger circle at proper distance (see method, above) until a desired overlap is reached yet another circle.

Methods for Deciding which Quantified Euler Diagram Calculation Scenario should be Used:

Depending on a situation, one or more different approaches may be applied when generating a Quantified Euler Diagram (e.g., or a plurality of diagrams). For example, consider one or more of the following approaches:

Example: Where no circles intersect

If small and middle circle do not overlap, keep middle circle away from small circle When small and middle do intersect (and thus where three intersect)

Starts 3rd circle at right far side of 2nd circle

When the two collide, then overlap

When Middle circle overlaps with small circle, but not with largest circle

When small circle overlaps with middle circle but not with the largest circle.

Determining which of the above is appropriate may be decided, for example, by first calculating common areas for circles:

Common Area1: Overlap between Largest and Smallest Circles

Common Area2: Overlap between Middle Circle and Smallest

Common Area3 Overlap between Largest Circle and Middle Circle

Example: Situation Common Area

Action 1: Place the Big Circle in Center

Action 2: Place the Small Circle on the left of the Big one

If Common Area1 is 0 then there will be no overlap between the two circles. Otherwise it will be placed appropriately as per previous method.

Action 3: Place the middle circle according to the following scenarios: (CA=Common Area)

Scenario 1: CA3>0 and CA2=0. Place the middle circle to the right of the big circle and move it to the left the required pixels based on the overlap Scenario 2: CA3=0 and CA2=0. Place the middle circle to the right of the big circle (no overlap)

Scenario 3: CA3=0 and CA2>0. Place the middle circle to the left of the position of the small circle and then move the middle circle a to the right depending on the overlap Scenario 4: CA3>0 and CA2>0. Place the middle circle to the right of the big circle, move it to the right based on the overlap between big and middle then move the middle circle around the circumference of the big circle up to the point that the distance between the center of the middle circle and the small circle minus the overlap between those circle is bigger than the current distance between the centers.

Methods of Avoiding Quantified Euler Diagram Label Collisions

As an example, where two circles are placed in a Quantified Euler Diagram and are to be sized proportionally (or to some degree proportionally based on scale ratio), and in addition the overlaps are to be precisely sized to represent the precise amount to which the sets overlap, a method may aim to avoid that labels (or names given to those circles), overwrite each other. For example, consider one or more of the following approaches: Avoid overwrite by second and third circle labels being consistently sequentially vertically offset by a predetermined amount (FIG. 27); Avoid overwrite by moving both up and down respectively (FIG. 28); Avoid overwrite by moving text right and left or a combination of right/left up/down; and Avoid overwrite by moving entire circle or both circles up/down (e.g., where action may be taken to not misrepresent overlap quantities where appropriate).

Method for Deciding how a Quantified Euler Diagram does not Use More than Available Screen Space As an example, a method can get a maximum available workspace size and divide by a fixed number (e.g., consider a number between about 2 and about 10) and use that as the radius for the largest circle. As an example, a method may include comparing the area of the largest circle with the area of the workspace available and utilize a variety of best fit analysis algorithms.

When Zooming, SVG Size Becomes Bigger than Canvas and Scrollbars Appear

As an example, where a Quantified Euler Diagram becomes larger than a screen space may allow (e.g., due to application zoom or browser zoom), a method may automatically call for rendering of scrollbars to a display, thereby allowing vertical and horizontal movement within the Quantified Euler Diagram (FIG. 30).

Method for Zooming into Focus/Overlap Areas of Quantified Euler Diagram

As an example, when a method includes zooming randomly on a diagram, a place (e.g., consider the center of the diagram) may be determined where the zooming will center around. In such a method, for example, when using a zoom control on a Quantified Euler Diagram, zooming may be automatically centered on where the smallest onscreen overlap occurs, thus directing the users attention and zoomed screen area, to the most likely area of zoomed interest.

Method for Dropping One or Several Sets onto New Tab and Creating New Circle on New Canvas As an example, when a method includes selecting a segment or multiple segments, such a selection may be represented as an array of IDs, each of which represents a circle or an overlap of circles. In such an example, based on a user selection, a decision as to which arrays are included or possibly subtracted may be indicated (e.g., in a network communication to a server, a communication to a database, etc.). As an example, such arrays and their inclusion/exclusion/subtraction status may be transmitted (e.g., to a server, for receipt by the server), which can result in the generation of a SQL Query, which can, in turn, returns a new Array ID. In such an example, the Array ID can then be represented as a circle on a new canvas, handed off to another system, saved, etc.

Method to Drag Text Representing Criteria to Quantified Euler Diagram as Set

As an example, for individual onscreen Criteria, hidden fields may be stored including, for example: 1. Number of records; 2. JQuery Id; 3. Database ID. As an example, during a process of dragging it onto a workspace and creating a circle, the criteria fields/characteristics and IDs may be copied and a new set/array created that is a clone of the original.

Method for Dragging Segment of Pie or Bar of Barchart to Become Circle in a Quantified Euler Diagram Consider a method where, behind each pie slice or bar in a bar chart, an ID is stored and, for example, according to a method retrieved, and copied, creating a circle on screen.

Method for Sending Arrays of Numbers Referring to/Relating to Sets to Server for Translation into SQL Commands As an example, where a circle, segments or saved segments is/are selected, the appropriate ID representing it/them may be placed into an Array of IDs and, for example, passed to a server (e.g., transmitted to a server via a network and received by the server). As an example, one or more arrays of IDs (e.g., for circle, segments and saved segments) may be passed to a server as encoded strings (e.g., transmitted to a server via a network and received by the server) where strings may be encoded via one or more encoding techniques.

As an example, a method can include passing a representation of a segment or circle. For example, a computing device may execute a browser application where the device includes a network interface and where a representation may be transmitted to a network via the network interface. In such an example, a system may include another computing device (e.g., a server, etc.) operatively coupled to the network via an appropriate network interface such that the representation may be received (e.g., directly or indirectly) and appropriately processed, for example, to facilitate one or more additional actions.

Method for Backend Translation of Array Representing Portions of a Quantified Euler Diagram into SQL Sets As an example, stored on a server behind each Criteria ID may be a SQL Statement. For example, when such a server receives a request from a client (e.g., a client computing device) the request can include appropriate criteria available on a workspace (e.g., consider preset criteria or user created "Saved Segments"). In such an example, a looks up of appropriate SQL Statements for the Criteria may occur, which can then be used to generate an appropriate combination of such existing SQL statements into a new one, resulting in a new segment or circle, associated ID, quantities. In such an example, at least a portion of the resulting information may be transmitted to and received by a client (e.g., a client computing device). In such an example, the client may then use at least a portion of the received information for calling for rendering to a display a circle and/or transferring to another system, displaying on a new canvas/workspace, etc.

Method for Using Quantified Euler Diagrams to Create SQL Queries and Turning that Query Back into a Circle/Set As an example, a workflow may implement a combination of methods where, for example, a net effect is that a user of a client device can click on a criterion, segment, or saved segments (or multiples of each) and it is in turn passed to an appropriate server, turned into a SQL Statement and then executed and returned to the client device (e.g., for use as a circle, other item or items, actions, etc.).

Using Combination of Javascript Front End and Ajax Back End to Calculate and Display Quantified Euler Diagrams As an example, an Array ID of one or more selected segments and excluded segments may be transmitted to an appropriate server. In such an example, the server can perform a SQL query where, for example, a count is returned for association with the appropriate circles, segments, for display and other utilization and where such a count may be transmitted from the server, directly or indirectly, to a client device or client devices (e.g., where implemented in a collaborative environment).

Use of Quantified Euler Diagrams in Combination with Cloud, Multitenant Technologies As an example, various methods, techniques, approaches, etc. may be implemented in a cloud multitenant environment such that a client device may include a browser application and/or other application that can process JavaScript and/or other programming language (e.g., optionally browser-based). In such an example, a server may be operatively coupled to one or more client devices via one or more networks (e.g., wired and/or wireless) and may respond to one or more queries as generated by one or more client devices. As an example, an implementation of a server or servers (e.g., a rack, a server farm, etc.) may service multiple tenants (users and/or companies).

As an example, various methods, techniques, approaches, etc., may be implemented in a single user environment, a client/server environment, as an App on a mobile pad or phone device, etc. As an example, a client may include an operating system that can establish an operating system environment in which one or more applications may be instantiated. As an example, consider an iOS® environment, an ANDROID® environment, etc. As an example, a network may be a cellular network. As an example, a device may include a touchscreen where input may be received via interaction with a finger, a stylus, etc. As an example, a device may include a plurality of network interfaces for transmission and/or receipt of information.

Method for Deleting Circles from Quantified Euler Diagram

As an example, where a circle is dropped on a trash icon (e.g., as a graphical control) or otherwise selected for removal from a canvas, a single ID representing that circle may be removed from an array of criteria sets representing circles that are current in the workspace and, visually, the associated circle may be removed. For example, the circle may be removed via a contraction graphical effect that shows the circle being "sucked" into a trash icon or other graphical control. As an example, where a method includes removing a circle, the method may include performing calculations for one or more remaining circles (e.g., as to sizes and overlaps).

Method for Dragging Multiple Segments to Drop Zone

As an example, a method can include identifying a specific ID and then associating it with a system or action represented in a drop zone.

Method for Using Color Transparency/Opacities to Create Multiple Colors in a Quantified Euler Diagram As an example, circle colors may be specifically selected for a specified opacity and so that when they overlap with other circles, the visual effect of a mix of colors is achieved for overlaps. As an example, as to "overlap" of objects rendered to a display, a buffer approach may be implemented, a screen door approach may be implemented, etc.

As an example, a method may include one or more visibility parameters. As an example, a parameter may be a transparency parameter, a translucency parameter, a screen door parameter, an alpha-compositing parameter, etc. As an example, a parameter may be part of a graphics processing algorithm, which may be associated with a graphics processing unit (e.g., a GPU) or other circuitry that can render information to a display.

As an example, a framework such as the OpenGL (Open Graphics Library) framework may be implemented for rendering information to a display. Such a framework includes an application programming interface (API) for rendering 2D and 3D vector graphics where, for example, the API may interact with a graphics processing unit (GPU).

In the OpenGL framework, a transparent material shows objects behind it as unobscured and does not reflect light off its surface. Clear glass may be considered to be a nearly transparent material. Although glass allows most light to pass through unobscured, in reality it also reflects some light. A perfectly transparent material is completely invisible (e.g., consider a transparency level of 100% transparent, etc.). In the OpenGL framework, a translucent material shows objects behind it, but those objects are obscured by the translucent material. In addition, a translucent material reflects some of the light that hits it, making the material visible. Physical examples of translucent materials include sheer cloth, thin plastic, and smoked glass.

Transparent and translucent may be used synonymously to the extent that they characterize a graphic such as, for example, two or more closed curves that may include at least one overlap. Materials that are neither transparent nor translucent are opaque (e.g., consider a transparency level of 0% transparent, etc.).

As an example, a technique such as blending may be implemented for combining color (e.g., or grayscale) already in a frame buffer with a color (e.g., or grayscale) of an incoming primitive. The result of this combination may then be stored back in the frame buffer. As an example, blending may be used to simulate translucent materials. One example is rendering the smoked glass windshield of a car. The driver and interior are still visible, but they are obscured by the dark color of the smoked glass.

As an example, a technique that implements a blend feature of a framework may be used to create a transparency (e.g., with appropriate ordering of data to be rendered).

As an example, a technique referred to as a "screen door" technique may be implemented to create a transparent effect for a diagram, etc. rendered to a display.

In the OpenGL framework, blending may be implemented as follows:

glEnable (GL_BLEND);
    glBlendFunc    (GL_SRC_ALPHA,    GL_ONE_MI-
        NUS_SRC_ALPHA);

In such an example, after blending is enabled, an incoming primitive color can be blended with a color already stored in the frame buffer. In the foregoing example, the glBlendFunc( ) controls how such blending occurs. As an example, a technique can modify an incoming color by its associated alpha value and can modify the destination color by one minus the incoming alpha value. The sum of these two colors can then be written back into the frame buffer.

As an example, in the OpenGL framework, a primitive's opacity is specified using glColor4*( ) where, for example, RGB specifies the color, and the alpha parameter specifies the opacity. When a depth buffer is implemented, rendering order can be a factor that can control at least in part how information appears on a display. For example, with depth buffering enabled, fully opaque primitives can be rendered first, followed by partially opaque primitives, for example, in a back-to-front order.

As to a screen door technique, in the OpenGL frame work, such a technique can include specifying a polygon stipple pattern with glPolygonStipple( ) and by rendering the transparent primitive with polygon stippling enabled (glEnable (GL_POLYGON_STIPPLE)). In such an example, the number of bits set in the stipple pattern determines the amount of translucency and opacity; setting more bits result in a more opaque object, and setting fewer bits results in a more translucent object. A screen door transparency technique may be order independent (e.g., primitives do not necessarily need to be rendered in back-to-front order).

Method for Determining Whether 4 or More Circles can Display Accurately on a Quantified Euler Diagram (Number of Sets)

As an example, where 4 circles overlap with each other (4 circles overlap with 4 circles) there may be too many circles for the circles (with overlaps) to display in two dimensions. As an example, an option may exist to render a large number of circles (e.g., a chain of circles) to a display. As an example, if more than three circles can be displayed in a workspace, this condition may be determined by looking at the maximum number of overlaps between any 4 circles and determining if it is 2 less than the maximum. In such an example, a determination as to displayability may be made.

Method for Showing Representation of Segment Shape to Represent Legend in Outside As an example, where circles overlap, the resulting segment characteristics can include: A specific shape (resulting from the size or degree of overlap) or location within a circle; A specific angle (resulting from the positions of the surrounding circles); A specific color (resulting from the overlap color generated). Such characteristics may be utilized in a "legend" so that a person can easily and visually associate a list of segments, with the segments displayed in the source Quantified Euler Diagram.

Method for Dragging Portions of a Selected Quantified Euler Diagram and Representing that Selection by the Shape of the Selection During Drag Process.

As an example, a method may include utilizing the unique characteristics of a segment or multiple segments, when a segment is dragged, what segments are being dragged can more easily be remembered and associated with its originating location/segment(s) by dragging a visual representation of the source segments.

Method for Setting Quantified Euler Diagram Circle or Segment to "Not" a Set.

As an example, a segment may be selected for inclusion in a set and, for example, via a identified type of selection (menu, special mouse control, right mouse click, etc.), such a type of selection could make the selection "negative" or identify that a set is to be specifically excluded. As an example, a resulting "negatively selected" set may be highlighted with red lines, surrounded by a red outline, or some other indicator that it has been set for specific exclusion from the results.

Use of Funnel Diagram to Interact with Quantified Euler Diagram

As an example, a funnel or pipe can be displayed on canvas, with areas of the funnel or pipe showing the record quantity for each area (see, e.g., FIG. 45). A funnel may be used to show marketing and sales cycle stages or other sequential representations. Then, utilizing one or more methods, at least a portion of a canvas can be saved; or a funnel section (or multiple funnel sections) can be selected, dragged to create new circles in Quantified Euler Diagrams, dragged to become lists in other systems, or saved as segments for future use.

Use of Map to Interact with Quantified Euler Diagram

As an example, a map (for a region, such as one or more of a state, a country, a world, etc.) may be displayed on a canvas, for example, with areas of the showing record quantity for that area (see, e.g., FIG. 46). As an example, at least a portion of a canvas can be saved; or an area (or multiple areas) can be selected, dragged to create new circles in Quantified Euler Diagrams, dragged to become lists in other systems, or saved as segments for future use.

Figure 58:
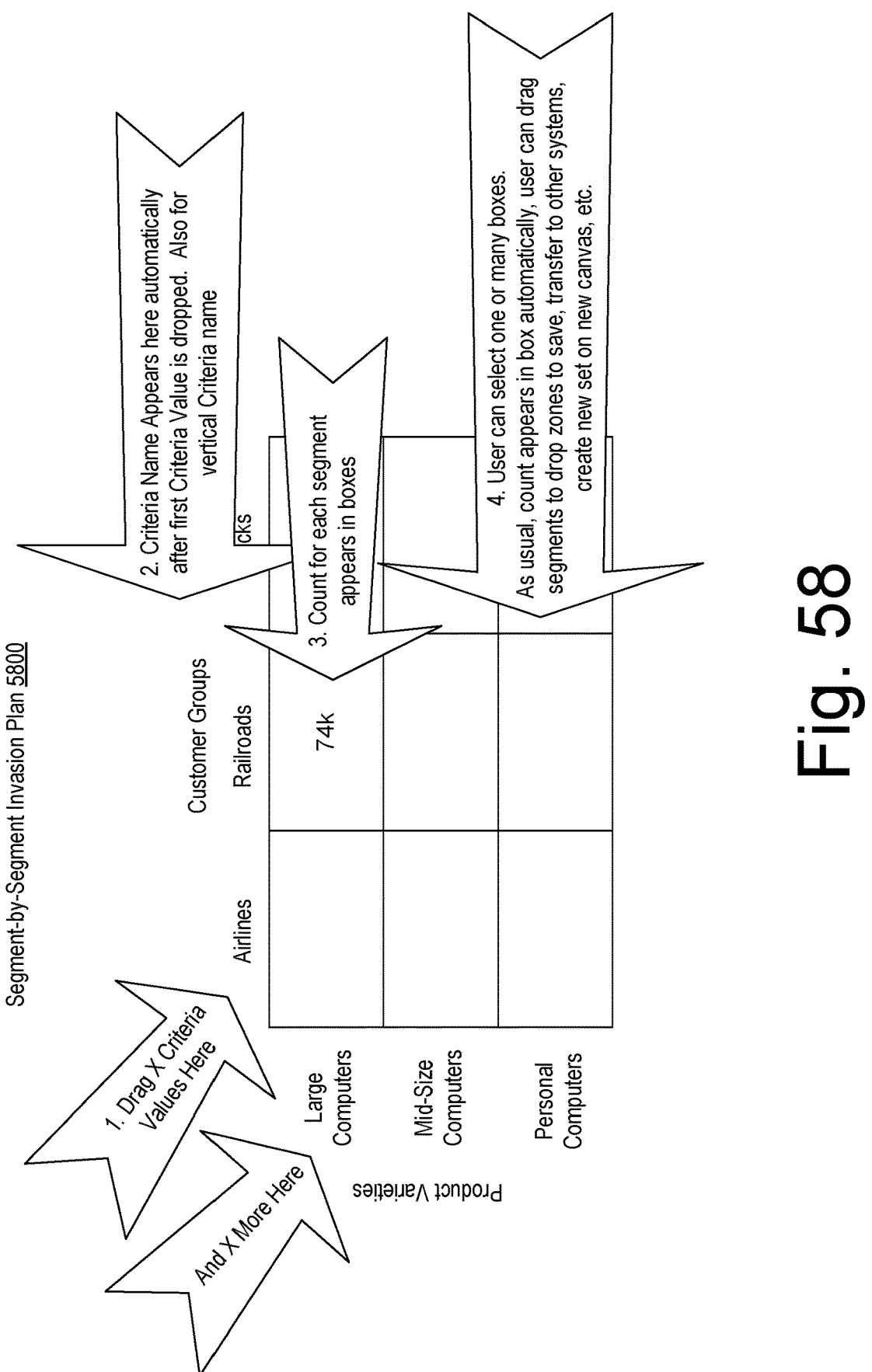
FIG. 58 is a diagram of an example of a graphical user interface.

Use of Criteria Cross Comparison Chart to Interact with Quantified Euler Diagram As an example, by combining selected Criteria values from one Criterion for the X axis and one Criterion for the Y axis, a user may see a matrix of quantities regarding the combination of the sets of both criteria (see, e.g., FIG. 58). The boxes that cross-correlate each two unique Criteria values can have a quantity stored within it representing the record quantity for that box. Then, as an example, at least a portion of a canvas may be saved; or a box (or multiple boxes) can be selected, dragged to create new circles in Quantified Euler Diagrams, dragged to become lists in other systems, or saved as segments for future use.

As an example, an icon may be rendered as a diagram such as a Venn diagram, an Euler diagram or a quantified Euler diagram. As an example, a quantified Euler diagram may be rendered to a display. In such an example, the quantified Euler diagram can include overlapping shapes where one or more components of which may be sized and/or sizable, selectable, draggable, savable, etc. As an example, a closed curve may optionally be rendered as a closed three-dimensional shape. For example, consider rendering a circle as a sphere (e.g., or a cylinder, etc.), an ellipse as an ellipsoid, etc. As an example, a "virtual reality" environment established by one or more devices may be generated where information is rendered to the environment as, for example, one or more quantified Euler diagrams (e.g., multidimensional diagrams). As an example, time may be a dimension in addition to one or more spatial dimensions.

As an example, for three-dimensional representations, spheres (e.g., or other shaped objects) may be sized relative to set size and one or more spheres may penetrate one or more other spheres, for example, to overlap where, as an example, a precise quantity and degree to which the sets in question overlapped may be represented (e.g., via size, etc.). In a three-dimensional environment, an object can provide a three-dimensional surface that may be overlapped by one or more other objects from one or more directions (e.g., more directions than in a two-dimensional scenario).

Utilization of Shapes

As an example, a shape that represents a set may be, for example, a two-dimensional shape or a three-dimensional shape. As an example, consider a circle, an ellipse, a square, a triangle, an oval, as well as, for example, other polygons and amorphous shapes.

FIG. 58 shows an example of a segment-by-segment invasion plan 5800. For example, a chart can be generated and rendered to a display. In such an example, various actions can be taken to populate portions of the chart, define portions of the chart, enlarge the chart, shrink the chart, etc. As an example, the text "customer groups" can be dragged and dropped, where corresponding titles fill in the matrix across one dimension. Next, a method can include loading up "product varieties", which can then trigger filling in of numbers in the matrix, as appropriate. As an example, levels may be utilized such a main level and sub-level of dragging and dropping (e.g., drag "customer groups" or drag "airlines", "railroads", etc.).

FIG. 59 shows examples of graphical user interfaces 5910 and 5930 where various types of criteria can be rendered to a display as graphical elements that are selectable and, for example, draggable and droppable. As an example, a graphical element can be selected and dragged to a canvas to trigger an analysis by an application where the application generates information to render a logical representation of data at least in part corresponding to a criterion represented by the graphical element.

In the example of FIG. 59, information can be rendered with a criterion such that a user may know how many members of a dataset meet that criterion. In such an example, a user may begin to assess how to logically handle the dataset. For example, a user may make a decision based on the criterion itself and/or based on the number of members. As an example, rather than a number of members, a percentage or a fraction may be rendered adjacent a text description of a criterion.

As shown in FIG. 59, the example graphical user interfaces 5910 and 5930 include examples of menu items. For example, the GUI 5910 can include criteria associated with a dataset and the GUI 5930 can include criteria associated with another dataset. As an example, criteria may be defined for analyzing one or more datasets.

Figure 60:
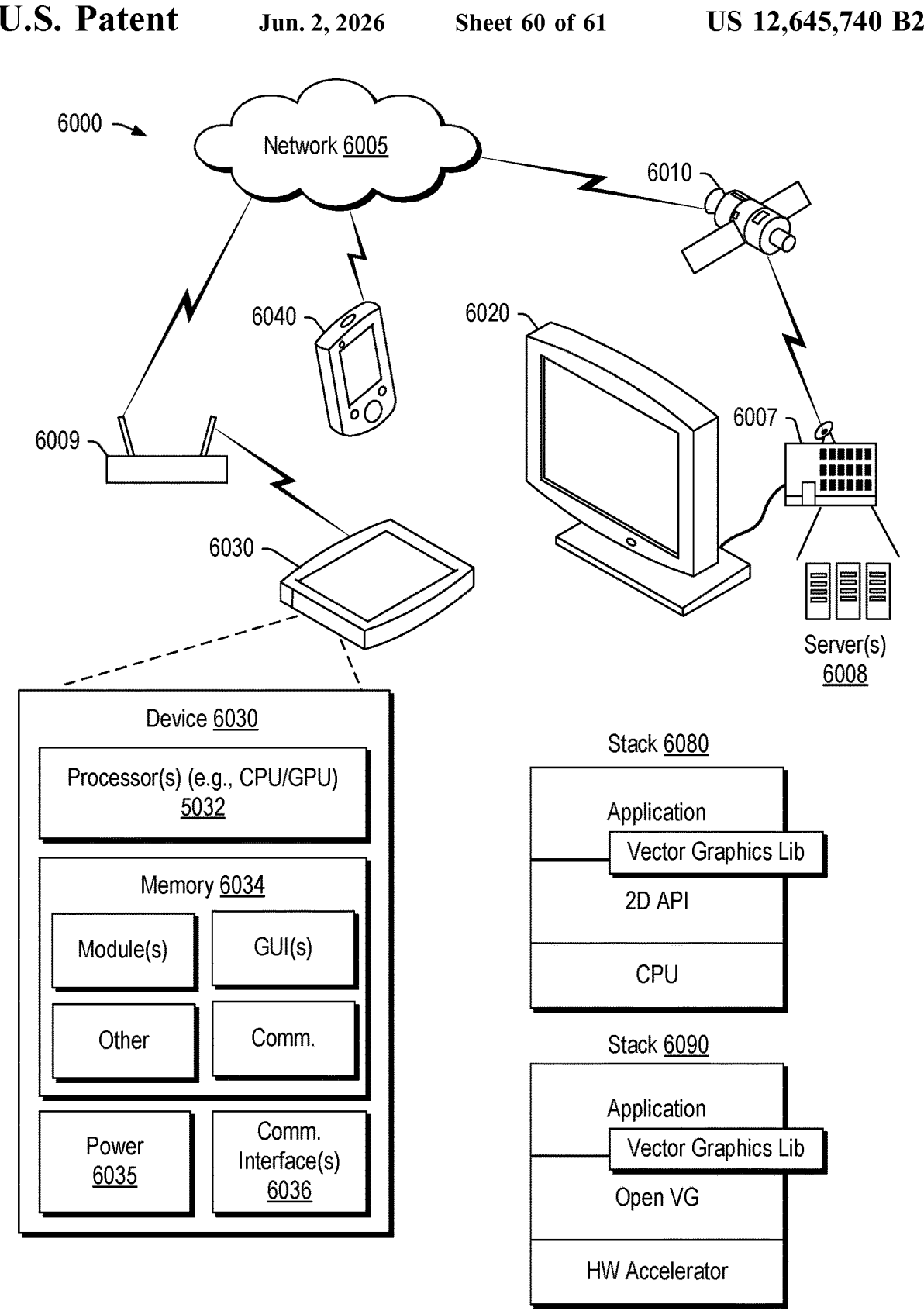
FIG. 60 is a diagram of an example of a system.

FIG. 60 shows an example of a system 6000 that includes one or more networks 6005 and various equipment 6007, 6009, 6010, 6020, 6030 and 6040 that may be configured with interfaces to transmit and/or receive information via the one or more networks 6005. As an example, the equipment 6030 may be a device that includes one or more processors 6032, memory 6034 operatively coupled to the one or more processors 6032, a power supply and/or power source 6035 and one or more communication interfaces 6036.

As shown in FIG. 60, the device 6030 may include one or more stored modules, one or more stored graphical user interfaces, stored communication information and other stored information. As an example, one or more modules may be for implementation of an application, which may be a user application that may be set based on role of a user. As an example, a module may be a web-browser module that can access the Internet. As an example, an application may be implemented at least in part via a web-browser. FIG. 60 also shows architectures for implementation of vector graphics, for example, by an application. For example, a stack 6080 and a stack 6090 are illustrated where one approach can include a multidimensional API (e.g., 2D or 3D) and a CPU and where another approach can include the Open VG with a HW accelerator. As an example, a device, a system, etc., can include multiple cores, which may be CPU and/or GPU cores.

Figure 61:
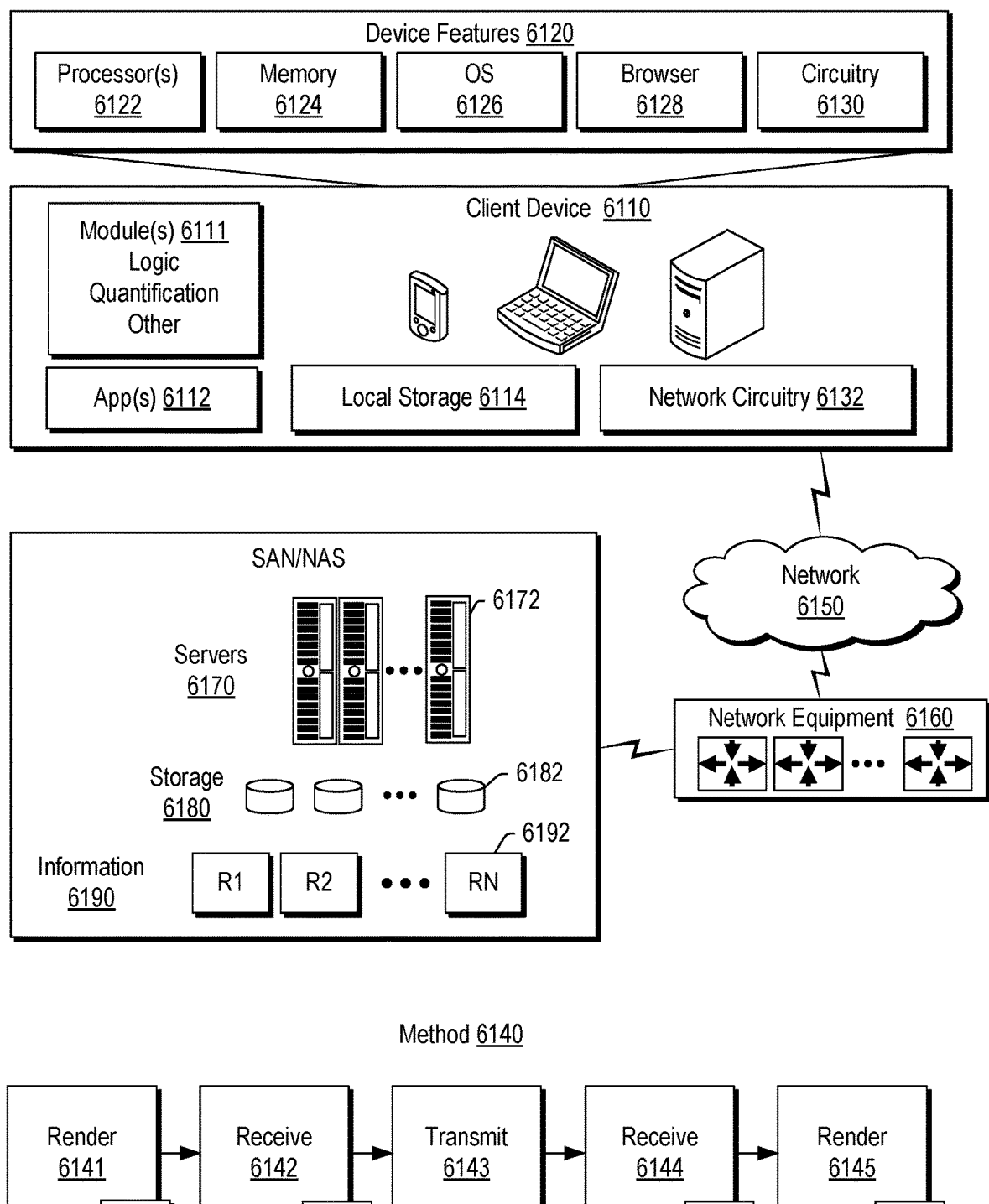
FIG. 61 is a diagram of an example of a system.

FIG. 61 shows an example of a system 6100 that includes a client device 6110 and servers 6170, for example, operatively coupled via one or more networks 6150. As shown, the client device 6110 includes local storage 6114 and network circuitry 6132 as well as device features 6120. The device features 6120 include one or more processors 6122, memory 6124, operating system instructions 6126, a browser application 6128 and other circuitry 6130. The device 6110 may include one or more modules 6111 (e.g., logic, quantification, graphics, etc.), one or more applications 6112 (e.g., or apps, etc.), local storage 6114 and network circuitry 6132 (e.g., one or more network interfaces, which may be wired, wireless, etc.). The client device 6110 can include one or more types of input mechanisms that can be, for example, operatively coupled to one or more processors (e.g., CPUs, GPUs, etc.). As an example, an input mechanism can be a touchscreen, an input mechanism can be a keyboard, an input mechanism can be a mouse, an input mechanism can be a microphone, an input mechanism can be a spatially aware mechanism that can detect hand or other gestures in space, an input mechanism can be a touch pad, an input mechanism can be a stylus, etc.

As shown, the client device 6110 is configured to establish a connection to the network 6150. The network 6150 may be the Internet, an Intranet, a local area network (LAN), a wide area network (WAN) or other network. In the example of FIG. 61, network equipment 6160 and servers 6170 are accessible via the network 6150. For example, the network equipment 6160 may include one or more routers that route network communications to one or more of the servers 6170. While this example refers to routers, the network equipment 6160 may include any of a variety of network equipment such as load balancers, intermediate servers, firewalls, etc. As shown in FIG. 61, the servers 6170 can access storage 6180, which stores information 6190 such as record R1, R2, to RN and, optionally, other information (e.g., consider a SAN, a NAS or other storage architecture). As an example, a server may include one or more modules that include instructions that can be executable to instruct the server to perform one or more actions, optionally in response to receipt of information from the client device 6110. For example, consider SQL types of instructions, commands, etc., which may be related to logic, quantification, etc. (e.g., as may be related to one or more quantified Euler diagrams, etc.).

To associate a user of the client device 6110 with a particular account (e.g., a server-based account), the client device 6110 may send identifying information, which may be a credential or credentials. For example, identification credentials can be a user name and a password. Other examples of credentials include cryptography credentials such as a machine-readable cryptographic key. Such a key may be self-issued or issued by an authentication party, which may be a trusted third party. Various types of cryptographic credentials are designed to expire according to one or more criteria (e.g., time, number of uses, etc.). In the system 6100 of FIG. 61, an authentication server may perform authentication (e.g., to establish a network connection) while another server accesses information associated with an account. After authentication, a server may send information.

The client device 6110 may be configured to present one or more graphical user interfaces (GUI) that can include one or more user selectable controls, for example, to cause the client device 6110 to interact with one or more servers. As an example, a GUI may include one or more quantified Euler diagrams where information associated therewith may optionally be accessed, stored, etc. in one or more storage devices such as those of the storage 6180 (e.g., as associate with the servers 6170).

FIG. 61 also shows an example of a method 6140 that includes a render block 6141 for rendering a first closed curve to a display where the first closed curve represents a number of members of a dataset according to a first criterion; a reception block 6142 for receiving a selection for a second criterion for the dataset; a transmission block 6143 for transmitting at least the second criterion via a network interface; a reception block 6144 for, responsive to transmitting, via the network interface, receiving information as to at least the second criterion and the dataset; and a render block 6145 for rendering to the display, based at least in part on the information, a second closed curve that represents a number of members of the dataset according to the second criterion wherein the closed curves overlap to an extent that depends on a number of common members thereof. In such an example, the display can show a Quantified Euler Diagram. In such an example, the method can include zooming and/or scaling the diagram. As shown in the example of FIG. 61, the method 6140 can include one or more loops. For example, consider a criterion selection loop that may exist between the block 6141 and the block 6145; noting that one or more branches may branch of such a loop, for example, to store information, to export information, to select a different type of diagram, etc.

The method 6140 is shown in FIG. 61 in association with various computer-readable media (CRM) blocks (e.g., processor-readable media blocks). Such blocks generally include instructions suitable for execution by one or more processors (or cores) to instruct a computing device or system to perform one or more actions. While various blocks are shown, a single medium may be configured with instructions to allow for, at least in part, performance of various actions of the method 6140. As an example, a computer-readable medium (CRM) may be a computer-readable storage medium that is non-transitory and not a signal or a carrier wave. As an example, the CRM blocks may be provided as one or more modules, for example, such as the one or more modules and/or instructions.

As an example, a device can include a processor; memory operatively coupled to the processor; a display operatively coupled to the processor; a logic module stored in the memory that includes processor-executable instructions that overlap a plurality of closed curves and determine a conclusion based on the overlap; a quantification module stored in the memory that includes processor-executable instructions that quantify a number of members of the overlap of the plurality of closed curves; and a graphics module stored in the memory that includes processor-executable instructions that render the plurality of closed curves to the display and that render the overlap to the display with a size based at least in part on the number of members of the overlap. Such a device may include a graphics module that includes instructions that render the plurality of closed curves to the display with respective sizes based at least in part on a respective number of members in each of the plurality of closed curves.

As an example, a logic module can include a syllogistic logic module. As an example, closed curves can include circles. As an example, a device can include an input mechanism and an interaction module stored in memory that includes processor-executable instructions that respond to receipt of input via the input mechanism. For example, the interaction module may respond to receipt of input to drag and drop one or more closed curves. As an example, a device can include a network interface where an interaction module responds to receipt of input via the input mechanism to transmit at least one parameter associated with at least one closed curve to a network address via the network interface.

As an example, a server can include a network interface; a processor; memory operatively coupled to the processor; and a query module stored in the memory that includes processor-executable instructions that formulate a query based on information received via the network interface where the information received via the network interface specifies one or more parameters of a quantified Euler diagram.

As an example, one or more computer-readable media that include processor-executable instructions where the instructions include instructions: to overlap a plurality of closed curves and to determine a conclusion based on the overlap; to quantify a number of members of the overlap of the plurality of closed curves; and to render the plurality of closed curves to a display and to render the overlap to the display with a size based at least in part on the number of members of the overlap.

As an example, a method can include rendering a first closed curve to a display where the first closed curve represents a number of members of a dataset according to a first criterion; receiving a selection for a second criterion for the dataset; transmitting at least the second criterion via a network interface; responsive to the transmitting, via the network interface, receiving information as to at least the second criterion and the dataset; and rendering to the display, based at least in part on the information, a second closed curve that represents a number of members of the dataset according to the second criterion where the first and second closed curves overlap to an extent that depends on a number of common members thereof. In such an example, the first closed curve and the second closed curve can form a quantified Euler diagram. In such an example, the first closed curve can be a first circle and the second closed curve can be a second circle.

As an example, a method can include receiving a scaling instruction and, in response to the scaling instruction, scaling an area of a first closed curve and/or a second closed curve to adjust an area ratio thereof. As an example, such a method can include scaling where more than two closed curves are rendered to a display (e.g., in a canvas area of a graphical user interface).

As an example, a method can include receiving a selection instruction that selects a segment defined by a first closed curve and a second closed curve where the segment corresponds to a number of members of the dataset. In such an example, the method can include exporting a file that includes information for the number of members in the segment. In such an example, the method can include, for example, formatting the information to a format associated with an application and exporting the file with a file extension that is associated with the application (e.g., a spreadsheet application, customer relations management application, etc.).

As an example, a method can include rendering a graphical user interface to a display wherein a first closed curve is rendered in a canvas area of the graphical user interface and where a selection for a second criterion corresponds to a different area of the graphical user interface that includes selectable criteria (e.g., as graphical elements of the GUI, etc.). In such an example, the method can include rendering an export control graphic in the graphical user interface that can include, for example, icons that correspond to different applications.

As an example, a method can include transmitting at least one criterion and, in response, receiving information as to the at least one criterion. For example, consider receiving information as to at least a second criterion and a dataset where the information includes a number of members of the dataset that meet the second criterion and optionally a number of members of the dataset that meet the first criterion and the second criterion. In such an example, an application executing on a computer may render a diagram to a canvas area of a graphical user interface using closed curves where the closed curves overlap to an extent that depends on at least a portion of the information received. Such a diagram may be, for example, a quantified Euler diagram.

As an example, a first closed curve and a second closed curve can overlap to an extent that defines at least three selectable segments as may be rendered to a display where each of the segments includes a number of members of a dataset. In such an example, a method can include receiving a selection as to at least one of the selectable segments and rendering a corresponding number to the display that represents a number of members of the dataset in the at least one of the selectable segments. For example, consider a field window that can display a number that corresponds to the number of members in one or more selected segments. As an example, an icon may be draggable and droppable that represents the one or more selected segments (e.g., via an input mechanism of a computer, etc.).

As an example, a method can include transmitting at least one criterion via a network interface where such transmitting includes transmitting information sufficient to form a database query to a database that stores the dataset. For example, consider a SQL query that can be implemented to determine how many members of a dataset meet the at least one criterion. As an example, where information as to two or more criteria are transmitted, one or more queries may be performed that can return information as to the criteria individually and/or collectively (e.g., logically).

As an example, a method can include performing at least one of rendering a funnel diagram to the display where the funnel diagram includes stages where each of the stages corresponds to a criterion, rendering a map diagram to the display where the map includes geographical regions that correspond to criteria, rendering a waterfall diagram to the display where the waterfall diagram includes columns and rows that correspond to criteria, rendering a matrix diagram to a display where the matrix diagram includes columns and rows that correspond to criteria, rendering a pie chart diagram to the display where slices of the pie chart diagram correspond to criteria, and rendering a bar chart diagram to the display wherein bars of the bar chart diagram correspond to criteria.

As an example, a computer can include a processor; memory operatively coupled to the processor; a display operatively coupled to the processor; an input mechanism operatively coupled to the processor; a network interface operatively coupled to the processor; processor-executable instructions stored in the memory and executable by the processor to instruct the computer to render a graphical user interface to the display wherein the graphical user interface comprises a canvas area and a criteria area; render a first closed curve to the canvas area wherein the first closed curve represents a number of members of a dataset according to a first criterion; receive a selection in the criteria area via the input mechanism for a second criterion for the dataset; transmit at least the second criterion via the network interface; receive information as to at least the second criterion and the dataset via the network interface; and render to the canvas, based at least in part on the information, a second closed curve that represents a number of members of the dataset according to the second criterion wherein the first and second closed curves overlap to an extent that depends on a number of common members thereof.

As an example, a computer can include processor-executable instructions stored in memory and executable by a processor to instruct the computer to, at least one of, render a funnel diagram to the display wherein the funnel diagram comprises stages wherein each of the stages corresponds to a criterion, render a map diagram to the display wherein the map comprises geographical regions that correspond to criteria, render a waterfall diagram to the display wherein the waterfall diagram comprises columns and rows that correspond to criteria, render a matrix diagram to a display wherein the matrix diagram comprises columns and rows that correspond to criteria, render a pie chart diagram to the display wherein slices of the pie chart diagram correspond to criteria, and render a bar chart diagram to the display wherein bars of the bar chart diagram correspond to criteria.

As an example, a message may be transmitted to a server via a network interface where the message results in a plurality of messages being formed. For example, a message may be split into a plurality of queries that can be performed individually optionally via one or more servers, one or more virtual machines implemented by one or more servers, etc. As an example, where a waterfall diagram is being interacted with, one or more messages may be generated and transmitted that can result in more than about 10 queries or, for example, more than 100 queries. Parallelization can allow for reduction in delay (e.g., latency) on a user end (e.g., client in a client-server arrangement, etc.). As an example, a query can return information as to a criterion or criteria where information as to logic may be included, for example, as to logical sets that can be members of a dataset (e.g., or datasets) that overlap (e.g., member of set A and member of set B, etc.). As an example, information returned can include numbers and, for example, names. For example, numbers can be associated with names (e.g., a number with a criterion name, numbers with criteria names, etc.). As an example, a client side application can render one or more diagrams based at least in part on received one or more numbers and/or one or more names.

As an example, a computing device may include a browser application. As an example, a computing device may be configured to execute script, for example, a browser application may include a module that can execute script.

As an example of script, consider JavaScript, which may be defined as a dynamic computer programming language. As an example, a browser application may allow client-side scripts to interact with a user, control the browser, communicate asynchronously, and/or alter document content that is displayed.

As an example, JavaScript may be used in server-side network programming with one or more runtime environments (e.g., Node.js, creation of desktop and mobile applications, etc.). JavaScript may be classified as a prototype-based scripting language with dynamic typing and first-class functions. Such a mix of features can make it a multi-paradigm language, supporting object-oriented, imperative, and functional programming styles.

As an example, a run-time environment may be implemented in one or more forms, for example, consider a browser application implemented run-time environment that can provide objects and methods by which scripts can interact with the environment (e.g., consider a webpage DOM). A run-time environment can provide the ability to include/import scripts (e.g., HTML <script> elements).

As an example, a computing device may include an "engine". For example, consider the JavaScript engine, which is a virtual machine that can interpret and execute JavaScript.

As an example, a system may include a WebGL (Web Graphics Library of Khronos Group), for example, as a JavaScript API for rendering interactive 3D computer graphics and 2D graphics within one or more types of compatible web browsers (e.g., optionally without the use of plug-ins). As an example, WebGL elements may be mixed with other HTML elements and composited with other parts of a page or page background. WebGL programs can include control code written in JavaScript and shader code that can be executed on a GPU (Graphics Processing Unit).

An Appendix A of the US Provisional Application having Ser. No. 62/140,085 is incorporated by reference herein, which is a Khronos Group Reference Guide for WebGL, specifically, the Appendix A includes the WebGL 1.0 API Quick Reference Card.

As an example, a system may implement vector graphics. For example, a system may include vector graphics processing circuitry (e.g., CPU-based, GPU-based, etc.). In such an example, geometrical primitives such as points, lines, curves, shapes, polygons, etc. may be rendered to one or more displays. Vector graphics are based on vectors (e.g., paths), which lead through locations called control points or nodes. Each of these points has a definite position on the x and y axes of the work plane and determines the direction of the path; further, each path may be assigned a characteristic or characteristics (e.g., consider properties such as stroke color, shape, thickness, fill, etc.). A characteristic of vector graphics is that magnification can occur without loss of quality; in comparison to pixel-based graphics. As an example, a system may include circuitry for three-dimensional graphics (e.g., consider OpenGL, etc.).

As an example, a system may implement a framework for vector graphics. For example, consider the OpenVG framework (Khronos Group) that includes an application programming interface (API) for hardware-accelerated 2D vector graphics. The OpenVG framework can be implemented for one or more types of platforms (e.g., mobile phones, gaming & media consoles, consumer electronic devices, computers, etc.). As an example, a system may include a GPU or GPUs. As an example, a system may accelerate certain types of operations (e.g., consider FLASH™ (Adobe) and mobile profile of SVG sequences).

An Appendix B of the US Provisional Application having Ser. No. 62/140,085 is incorporated by reference herein and is a Khronos Group Reference Guide for OpenVG, specifically, the Appendix B includes the OpenVG 1.1 API Quick Reference Card.

As an example, an API may provide for coordinate systems and transformations (e.g., image drawing uses a 3×3 perspective transformation matrix); viewport clipping, scissoring and alpha masking; paths; images; image filters; paint (gradient and pattern); blending, etc. As an example, a library may include geometric primitives, image warping, etc.

As an example, in OpenGL, a circle may be drawn as follows:

```
glBegin(GL_POINTS);
    for(int i=0;i<1000;++i)
    {
    glVertex3f(cos          (2*3.14159*i/1000.0),          sin
        (2*3.14159*i/1000.0),0);
    }
    glEnd( );
```

As an example, in OpenGL, a circle may be drawn as follows:

```
typedef struct
{
float x;
float y;
}CIRCLE;
CIRCLE circle;
void createcircle (int k, int r, int h) {
    glBegin(GL_LINES);
    for (int i=0; i<180; i++)
    {
    circle.x=r*cos (i)−h;
    circle.y=r*sin (i)+k;
    glVertex3f(circle.x+k,circle.y−h,0);
    circle.x=r*cos (i+0.1)−h;
    circle.y=r*sin (i+0.1)+k;
    glVertex3f(circle.x+k,circle.y−h,0);
    }
    glEnd( );
}
```

As an example, in OpenGL, a circle may be drawn as follows:

```
class circle{
public: float x,y,rot;
public:
void createcircle (int k, int r, int h);
};
void circle: createcircle (int k, int r, int h) {
    glBegin(GL_LINES);
        for (int i=0; i<180; i++)
        {
        x=r*cos (i)−h;
        y=r*sin (i)+k;
        glVertex3f(x+k,y−h,0);
        x=r*cos (i+0.1)−h;
        y=r*sin (i+0.1)+k;
        glVertex3f(x+k,y−h,0);
        }
        glEnd( );
}
```

Although various examples of methods, devices, systems, designs, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, designs, etc.

What is claimed is:

1. A computing system comprising:

a processor;

memory accessible to the processor;

processor-executable instructions stored in the memory and executable to instruct the computing system to:

access a first set of a first number of data members according to a first criterion and a second set of a second number of data members according to a second criterion;

render a graphical user interface to a display wherein the graphical user interface comprises a canvas area;

render to the canvas area a first closed curve wherein the first closed curve represents the first set and a second closed curve wherein the second closed curve represents the second set;

render a scale control adjustable to scale relative size of the first closed curve and the second closed curve;

render a zoom control adjustable to scale the first closed curve and the second closed curve with respect to the canvas area; and access a third set of a third number of data members according to a third criterion and render to the canvas area a third closed curve wherein the third closed curve represents the third set, and wherein the scale control, applied to the first closed curve, the second closed curve, and the third closed curve, depends on a largest of the first closed curve, the second closed curve and the third closed curve to scale sizes of the two smaller of the first closed curve, the second closed curve and the third closed curve.

2. The computing system of claim 1, wherein the scale control increments or decrements a size of a smaller of the first closed curve and the second closed curve by a proportion in size between the first closed curve and the second closed curve.

3. The computing system of claim 2, wherein the proportion is an exact proportion computed by a first radius of the first closed curve and a second radius of the second closed curve.

4. The computing system of claim 2, wherein an increment depends on a difference between a first radius of the first closed curve and a second radius of the second closed curve.

5. The computing system of claim 4, wherein the increment depends on a total number of increments.

6. The computing system of claim 5, wherein the increment depends on the difference divided by the total number of increments.

7. The computing system of claim 1, wherein the first closed curve comprises a first radius and the second closed curve comprises a second radius.

8. The computing system of claim 1, comprising processor-executable instructions stored in the memory and executable to instruct the computing system to perform a determination as to a largest of the first closed curve and the second closed curve.

9. The computing system of claim 8, wherein the determination utilizes pixels.

10. The computing system of claim 9, wherein the determination utilizes pixels to determine a first radius of the first closed curve and a second radius of the second closed curve and to determine which of the first radius and the second radius is larger and which of the first radius and the second radius is smaller.

11. The computing system of claim 10, comprising processor-executable instructions stored in the memory and executable to instruct the computing system to compute a differential quantity by subtracting the first radius from the second radius.

12. The computing system of claim 11, wherein the scale control utilizes the differential quantity and a total number of increments of the scale control to increment or decrement the size of the smaller of the first radius and the second radius responsive to receipt of an adjustment instruction via the scale control.

13. The computing system of claim 1, wherein the scale control scales a smaller of the first and second closed curves to a maximum size that is a percentage of a larger of the first and second closed curves.

14. The computing system of claim 13, wherein the percentage is 100 percent.

15. The computing system of claim 13, wherein the percentage is less than 100 percent.

* * * * *